United States Patent
Yang et al.

(10) Patent No.: US 10,545,029 B2
(45) Date of Patent: Jan. 28, 2020

(54) LANE NETWORK CONSTRUCTION USING HIGH DEFINITION MAPS FOR AUTONOMOUS VEHICLES

(71) Applicant: DeepMap Inc., Palo Alto, CA (US)

(72) Inventors: Lin Yang, San Carlos, CA (US); Ming Cui, San Jose, CA (US)

(73) Assignee: DeepMap Inc., Palo Alto, CA (US)

( * ) Notice: Subject to any disclaimer, the term of this patent is extended or adjusted under 35 U.S.C. 154(b) by 205 days.

(21) Appl. No.: 15/859,202

(22) Filed: Dec. 29, 2017

(65) Prior Publication Data

US 2018/0189578 A1  Jul. 5, 2018

Related U.S. Application Data

(60) Provisional application No. 62/441,065, filed on Dec. 30, 2016, provisional application No. 62/441,080, filed on Dec. 30, 2016.

(51) Int. Cl.
*G06K 9/00* (2006.01)
*G01C 21/36* (2006.01)
(Continued)

(52) U.S. Cl.
CPC ......... *G01C 21/3638* (2013.01); *B60W 40/04* (2013.01); *G01C 21/3635* (2013.01);
(Continued)

(58) Field of Classification Search
CPC ................ G06F 16/29; G06K 9/00798; G06K 9/00818; G06K 9/44; G06K 9/4638;
(Continued)

(56) References Cited

U.S. PATENT DOCUMENTS 5,208,750 A * 5/1993 Kurami ................ G05D 1/0251
701/28
8,996,226 B1 * 3/2015 Chatham ............ G08G 1/09626
701/25
(Continued)

OTHER PUBLICATIONS

PCT Invitation to Pay Additional Fees, PCT Application No. PCT/US17/69128, dated Mar. 22, 2018, 2 pages.
(Continued)

*Primary Examiner* — Mekonen T Bekele
(74) *Attorney, Agent, or Firm* — Fenwick & West LLP

(57) ABSTRACT

An HD map system represents landmarks on a high definition map for autonomous vehicle navigation, including describing spatial location of lanes of a road and semantic information about each lane, and along with traffic signs and landmarks. The system generates lane lines designating lanes of roads based on, for example, mapping of camera image pixels with high probability of being on lane lines into a three-dimensional space, and locating/connecting center lines of the lane lines. The system builds a large connected network of lane elements and their connections as a lane element graph. The system also represents traffic signs based on camera images and detection and ranging sensor depth maps. These landmarks are used in building a high definition map that allows autonomous vehicles to safely navigate through their environments.

20 Claims, 51 Drawing Sheets

(51) Int. Cl.
*G06T 17/05* (2011.01)
*B60W 40/04* (2006.01)
*G05D 1/00* (2006.01)

(52) U.S. Cl.
CPC ....... *G05D 1/0088* (2013.01); *G06K 9/00798* (2013.01); *G06K 9/00818* (2013.01); *G06T 17/05* (2013.01); *B60W 2420/42* (2013.01); *B60W 2420/52* (2013.01)

(58) Field of Classification Search
CPC . G06T 7/70; G06T 2207/30256; G06T 17/00; G06T 17/05; B60W 40/04; B60W 2420/42; B60W 2420/52; G01C 21/32; G01C 21/3635; G01C 21/3638; G05D 1/0088
See application file for complete search history.

(56) References Cited

U.S. PATENT DOCUMENTS

| | | | |
|---|---|---|---|
| 9,574,897 B2* | 2/2017 | Strassenburg-Kleciak | G01C 21/3635 |
| 10,008,110 B1* | 6/2018 | Herlocker | G08G 1/0129 |
| 10,026,222 B1* | 7/2018 | Morrison | G06T 7/13 |
| 2002/0081000 A1* | 6/2002 | Ham | G06K 9/00798 382/104 |
| 2007/0229311 A1* | 10/2007 | Bowman | G01C 21/367 340/995.14 |
| 2009/0027651 A1 | 1/2009 | Pack et al. | |
| 2011/0109618 A1 | 5/2011 | Nowak et al. | |
| 2015/0138310 A1 | 5/2015 | Fan et al. | |
| 2015/0354976 A1 | 12/2015 | Ferencz et al. | |
| 2015/0367778 A1* | 12/2015 | Vladimerou | G06K 9/00798 348/148 |
| 2016/0217611 A1 | 7/2016 | Pylvaenaeinen et al. | |
| 2018/0188059 A1* | 7/2018 | Wheeler | G01C 21/3635 |
| 2018/0237007 A1* | 8/2018 | Adam | B60W 30/12 |

OTHER PUBLICATIONS

PCT International Search Report and Written Opinion, PCT Application No. PCT/US17/69128, dated May 14, 2018, 19 pages.
Li et al., "Lidar-Incorporated Traffic Sign Detection from Video Log Images of Mobile Mapping System," The International Archives of the Photogrammetry, Remote Sensing and Spatial Information Sciences, vol. XLI-B1, 2016 XXIII ISPRS Congress, Jul. 12-19, 2016, pages, [Online] [Retrieved on Apr. 30, 2018] Retrieved from the Internet<URL:https://www.int.arch-photogramm-remci-sens-spatial-inf-sci.net/XLIB1/661/2016/isprs-archives-XLI-B1-2016.pdf>.
Miah, M.B.A., "A Real Time Road Sign Recognition Using Neural Network," International Journal of Computer Applications (0975-8887) vol. 114, No. 13, Mar. 2015 [Online] [Retrieved on Apr. 30, 2018] Retrieved from the Internet<URL: https://pdfs.semanticscholar.org/80b2/b921ad100f510c0f3b0cc64136b2a909d44e.pdf>.
Chen, C. et al., "City-scale Map Creation and Updating Using GPS Collections," KDD'16, ACM, Aug. 13-17, 2016, 10 pages.
Huang, H. et al., "$L_1$-Medial Skeleton of Point Cloud," ACM Transactions, 2013, 8 pages.

* cited by examiner

900

```
┌─────────────────────────────────────────────────────────────────────┐
│  Receive an image with a traffic sign capture by a camera mounted on a vehicle  │
│                                  910                                │
└─────────────────────────────────────────────────────────────────────┘
                                    │
                                    ▼
┌─────────────────────────────────────────────────────────────────────┐
│         Identify a portion of the image corresponding to the traffic sign       │
│                                  920                                │
└─────────────────────────────────────────────────────────────────────┘
                                    │
                                    ▼
┌─────────────────────────────────────────────────────────────────────┐
│  Receive a depth map including the traffic sign captured by a detection and    │
│                            ranging sensor                           │
│                                  930                                │
└─────────────────────────────────────────────────────────────────────┘
                                    │
                                    ▼
┌─────────────────────────────────────────────────────────────────────┐
│           Construct a 3D map by mapping the depth map into 3D space            │
│                                  940                                │
└─────────────────────────────────────────────────────────────────────┘
                                    │
                                    ▼
┌─────────────────────────────────────────────────────────────────────┐
│        Identify a subset of at least three points in the depth map             │
│                     corresponding to the traffic sign                          │
│                                  950                                │
└─────────────────────────────────────────────────────────────────────┘
                                    │
                                    ▼
┌─────────────────────────────────────────────────────────────────────┐
│            Fit a plane in the 3D map based at least in part on the subset      │
│                                  960                                │
└─────────────────────────────────────────────────────────────────────┘
                                    │
                                    ▼
┌─────────────────────────────────────────────────────────────────────┐
│     Project the identified portion of the image onto the fitted plane in the 3D map │
│                                  970                                │
└─────────────────────────────────────────────────────────────────────┘
```

FIG. 9

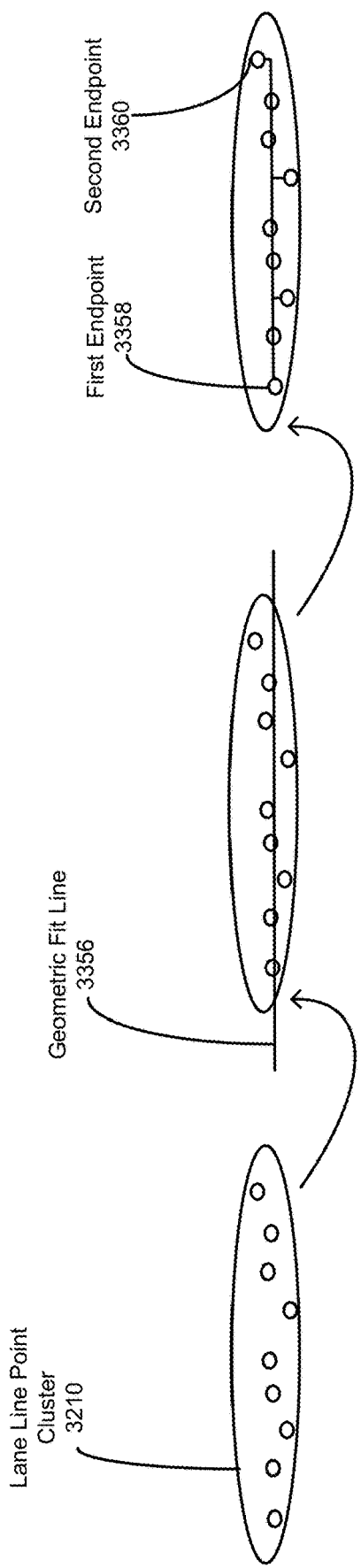
FIG. 33E
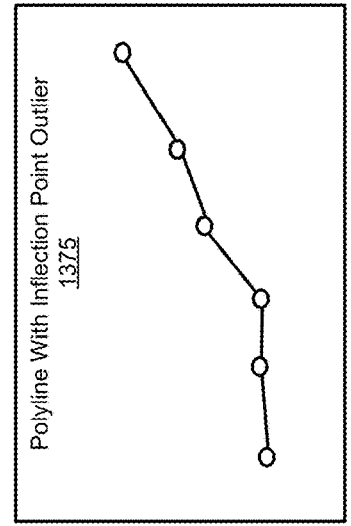
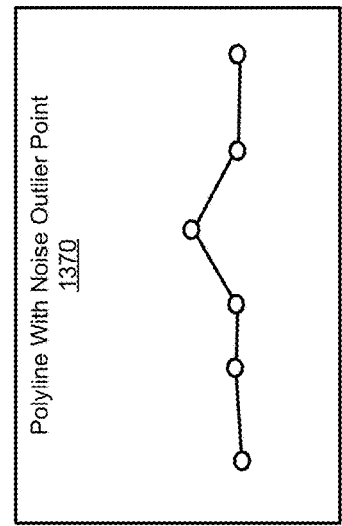
FIG. 33F

3602

For each lane line, for each head and tail control point of a lane line, cast a ray perpendicular to a line segment of the lane line from an origin (head or tail control point of the lane line)
3702

Compute intersections of ray to other lane lines and navigable boundaries
3704

Responsive to an intersection being within a threshold distance of a head or tail control point of an intersected lane line, snap the intersection to the head or tail control point of the intersected lane line
3706

Identify qualified intersections for each ray
3708

Sort qualified intersections from ascending distance to the origin
3710

Iterate through the sorted intersections starting from the origin of the ray and connect intersections that are within a threshold distance to a previous intersection.
3712

Sort the candidate lane cuts
3714

Select final lane cuts from the sorted candidate lane cuts
3716

FIG. 37

LANE NETWORK CONSTRUCTION USING HIGH DEFINITION MAPS FOR AUTONOMOUS VEHICLES

CROSS REFERENCE TO RELATED APPLICATIONS

This application claims the benefit of U.S. Provisional Application No. 62/441,065 filed on Dec. 30, 2016 and U.S. Provisional Application No. 62/441,080 filed on Dec. 30, 2016, each of which is incorporated by reference in its entirety.

BACKGROUND

This disclosure relates generally to maps for autonomous vehicles, and more particularly to providing high definition maps with high precision and up-to-date map data to autonomous vehicles for safe navigation.

Autonomous vehicles, also known as self-driving cars, driverless cars, auto, or robotic cars, drive from a source location to a destination location without requiring a human driver to control and navigate the vehicle. Automation of driving is difficult due to several reasons. For example, autonomous vehicles use sensors to make driving decisions on the fly, but vehicle sensors cannot observe everything all the time. Vehicle sensors can be obscured by corners, rolling hills, and other vehicles. Vehicles sensors may not observe certain things early enough to make decisions. In addition, lanes and signs may be missing on the road or knocked over or hidden by bushes, and therefore not detectable by sensors. Furthermore, road signs for rights of way may not be readily visible for determining from where vehicles could be coming, or for swerving or moving out of a lane in an emergency or when there is a stopped obstacle that must be passed.

Autonomous vehicles can use map data to figure out some of the above information instead of relying on sensor data. However conventional maps have several drawbacks that make them difficult to use for an autonomous vehicle. For example maps do not provide the level of accuracy required for safe navigation (e.g., 10 cm or less). GPS systems provide accuracies of approximately 3-5 meters, but have large error conditions resulting in an accuracy of over 100 meters. This makes it challenging to accurately determine the location of the vehicle.

Furthermore, conventional maps are created by survey teams that use drivers with specially outfitted cars with high resolution sensors that drive around a geographic region and take measurements. The measurements are taken back and a team of map editors assembles the map from the measurements. This process is expensive and time consuming (e.g., taking possibly months to complete a map). Therefore, maps assembled using such techniques do not have fresh data. For example, roads are updated/modified on a frequent basis roughly 5-10% per year. But survey cars are expensive and limited in number, so cannot capture most of these updates. For example, a survey fleet may include a thousand cars. For even a single state in the United States, a thousand cars would not be able to keep the map up-to-date on a regular basis to allow safe self-driving. As a result, conventional techniques of maintaining maps are unable to provide the right data that is sufficiently accurate and up-to-date for safe navigation of autonomous vehicles.

SUMMARY

A vehicle computing system generates a high definition (HD) map to allow an autonomous vehicle to safely navigate the road. In generating this map, the system provides a road network graph to help the autonomous vehicle do localization, routing, and planning. The system builds a large connected network of lane elements (lane element graph) to allow navigation of vehicles through a mapped area such that the vehicle can plan a legal path between a source and a destination. The system forms a complete connected graph of lane elements, and associates semantic rules and relationships from other map entities (such as signs and lane lines) to the lane elements. As one example, the navigable road surface area can be divided into lane elements that together fully cover the navigable surface with no gaps between them. The lane elements are topologically connected, and each lane element has knowledge of (or stores information about) its successor elements, predecessor elements, and left/right neighbor elements. All lane elements together form a graph that can be used to do routing/planning for an autonomous vehicle. A lane element graph is generated by identifying lane cuts representing a change in the road, breaking lane cuts into lane cut segments where each lane cut segment cuts across a single lane, determining boundaries of a lane element for each lane cut segment, and identify successor lane elements for each lane element. A lane cut goes through the width of the road, cutting it into adjacent segments. Lane cuts and lane lines together define the boundary of lane elements. Lane cuts occur where there is a topographic change in the road (e.g., an intersection, split, or merge of lanes) or a semantic change in the lane (e.g., a change in speed limit). Each lane element may be associated with the traffic restrictions that apply to it, such as speed limit, speed bumps, traffic signs/signals, etc. The lane element graph created is used in an HD map for use in driving by one or more autonomous vehicles.

In an embodiment, the vehicle computing system receives, from an imaging system mounted on a vehicle, a plurality of image frames. Each image frame is associated with a local area surrounding the vehicle at a particular point in time. The system generates a lane element graph including lane elements and connections between lane elements. Each lane element is a portion of a lane with associated traffic restrictions. Generation of the lane element graph includes identifying lane cuts from lane lines and navigable boundaries. The lane lines and navigable boundaries are based at least in part from the plurality of image frames and lane cuts occur at changes in roads (e.g., a physical change or changes associated with a feature, such as a traffic sign). The system breaks the lane cuts into lane cut segments, with each lane cut segment cutting across a single lane. For each lane cut segment, the system determines boundaries of a lane element. The boundaries of the lane element include at least the lane cut segment as a bottom edge of the lane element, a right and left edge of the lane element, and a top edge of the lane element. For each lane element, the system also identifies successor lane elements. The system then generates a high definition map of the local area including the lane element graph based on the plurality of image frames. The high definition map can be used for navigating one or more autonomous vehicles.

BRIEF DESCRIPTION OF THE DRAWINGS

FIG. 9 illustrates a flowchart describing a method of storing a traffic sign in a 3D map, according to one or more embodiments.

FIG. 33C-33H show different steps of the process for analyzing lane line centers and generating center-line polylines, according to an embodiment.

FIG. 37 is a flowchart illustrating an embodiment of a process for identifying lane cuts.

Figure 1:
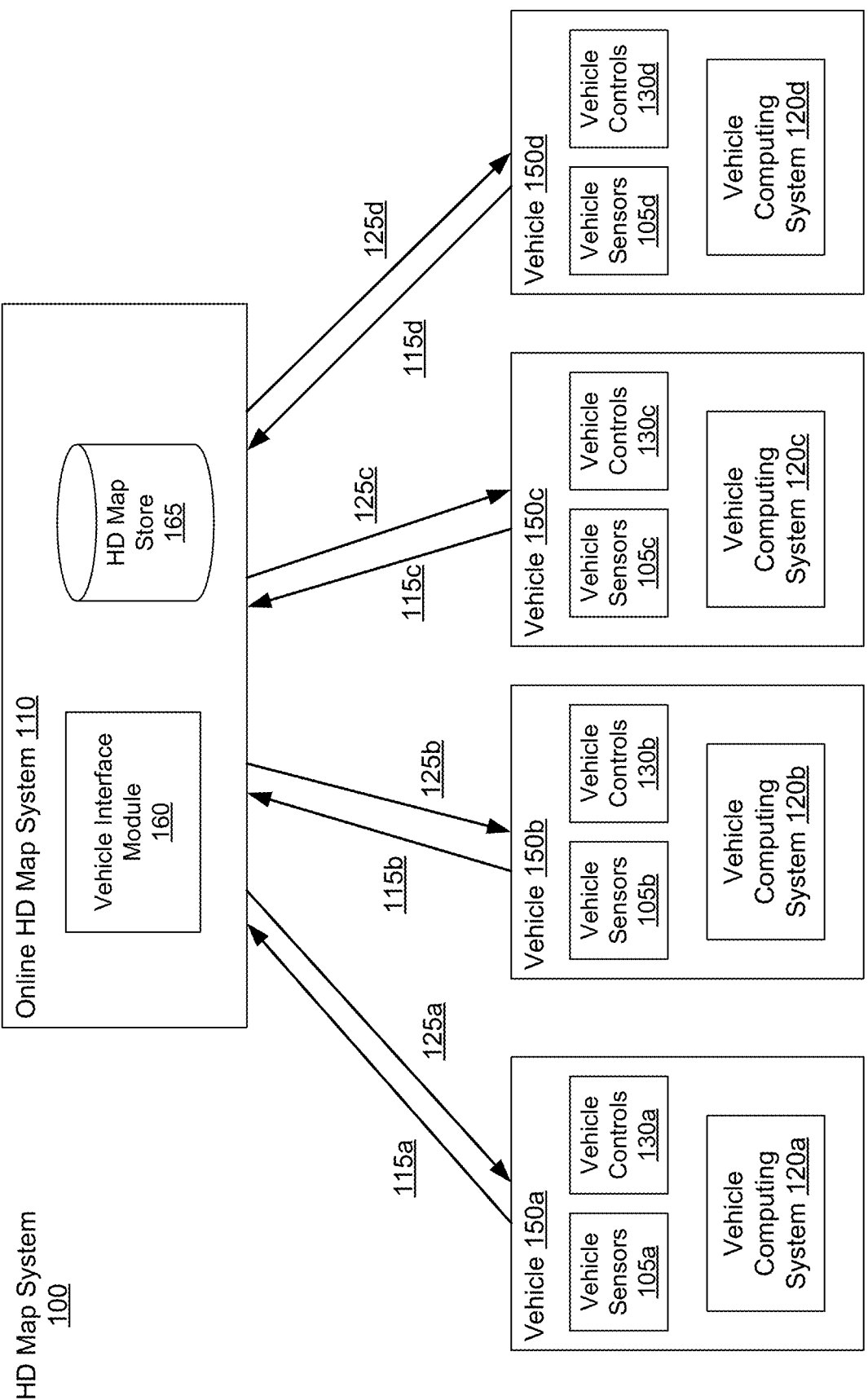
FIG. 1 shows the overall system environment of an HD map system interacting with multiple vehicle computing systems, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments of the invention maintain high definition (HD) maps containing up to date information using high precision. The HD maps may be used by autonomous vehicles to safely navigate to their destinations without human input or with limited human input. An autonomous vehicle is a vehicle capable of sensing its environment and navigating without human input. Autonomous vehicles may also be referred to herein as "driverless car," "self-driving car," or "robotic car." An HD map refers to a map storing data with very high precision, typically 5-10 cm. Embodiments generate HD maps containing spatial geometric information about the roads on which an autonomous vehicle can travel. Accordingly, the generated HD maps include the information necessary for an autonomous vehicle navigating safely without human intervention. Instead of collecting data for the HD maps using an expensive and time consuming mapping fleet process including vehicles outfitted with high resolution sensors, embodiments of the invention use data from the lower resolution sensors of the self-driving vehicles themselves as they drive around through their environments. The vehicles may have no prior map data for these routes or even for the region. Embodiments of the invention provide location as a service (LaaS) such that autonomous vehicles of different manufacturers can each have access to the most up-to-date map information created via these embodiments of invention.

Embodiments of the invention generate and maintain high definition (HD) maps that are accurate and include the most updated road conditions for safe navigation. For example, the HD maps provide the current location of the autonomous vehicle relative to the lanes of the road precisely enough to allow the autonomous vehicle to drive safely in the lane.

More specifically, embodiments generate lane segments which are aggregated into complete lane lines, characterizing the direction and properties of a lane line. The generated lane lines are used in the HD maps to determine a route from a source location to a destination location.

HD maps store a very large amount of information, and therefore face challenges in managing the information. For example, an HD map for a large geographic region may not fit on the local storage of a vehicle. Embodiments of the invention provide the necessary portion of an HD map to an autonomous vehicle that allows the vehicle to determine its current location in the HD map, determine the features on the road relative to the vehicle's position, determine if it is safe to move the vehicle based on physical constraints and legal constraints, etc. Examples of physical constraints include physical obstacles, such as walls, and examples of legal constraints include legally allowed direction of travel for a lane, speed limits, yields, stops.

Embodiments of the invention allow safe navigation for an autonomous vehicle by providing low latency, for example, 10-20 milliseconds or less for providing a response to a request; high accuracy in terms of location, i.e., accuracy within 10 cm or less; freshness of data by ensuring that the map is updated to reflect changes on the road within a reasonable time frame; and storage efficiency by minimizing the storage needed for the HD Map.

FIG. 1 shows the overall system environment of an HD map system interacting with multiple vehicles, according to an embodiment. The HD map system 100 includes an online HD map system 110 that interacts with a plurality of vehicles 150. The vehicles 150 may be autonomous vehicles but are not required to be. The online HD map system 110 receives sensor data captured by sensors of the vehicles, and combines the data received from the vehicles 150 to generate and maintain HD maps. The online HD map system 110 sends HD map data to the vehicles for use in driving the vehicles. In an embodiment, the online HD map system 110 is implemented as a distributed computing system, for example, a cloud based service that allows clients such as vehicle computing systems 120 to make requests for information and services. For example, a vehicle computing system 120 may make a request for HD map data for driving along a route and the online HD map system 110 provides the requested HD map data.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4A:
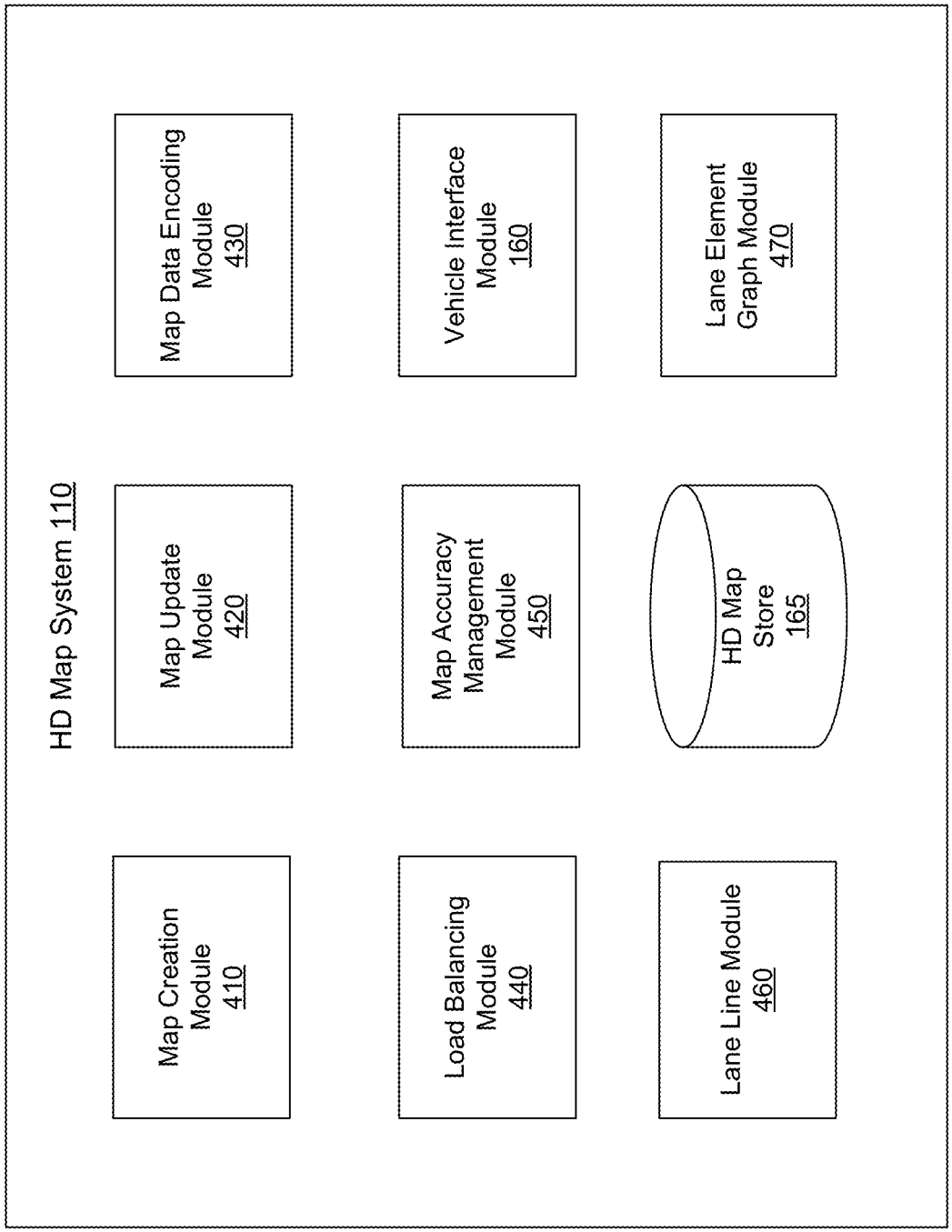
FIG. 4A shows the system architecture of an HD map system including a lane element graph module, according to an embodiment.

The online HD map system 110 comprises a vehicle interface module 160 and an HD map store 165. The online HD map system 110 interacts with the vehicle computing system 120 of various vehicles 150 using the vehicle interface module 160. The online HD map system 110 stores map information for various geographical regions in the HD map store 165. The online HD map system 110 may include other modules than those shown in FIG. 1, for example, various other modules as illustrated in FIG. 4A and further described herein.

The online HD map system 110 receives 115 data collected by sensors of a plurality of vehicles 150, for example, hundreds or thousands of cars. The vehicles provide sensor data captured while driving along various routes and send it to the online HD map system 110. The online HD map system 110 uses the data received from the vehicles 150 to create and update HD maps describing the regions in which the vehicles 150 are driving. The online HD map system 110 builds high definition maps based on the collective information received from the vehicles 150 and stores the HD map information in the HD map store 165.

The online HD map system 110 sends 125 HD maps to individual vehicles 150 as required by the vehicles 150. For example, if an autonomous vehicle needs to drive along a route, the vehicle computing system 120 of the autonomous vehicle provides information describing the route being traveled to the online HD map system 110. In response, the online HD map system 110 provides the required HD maps for driving along the route.

In an embodiment, the online HD map system 110 sends portions of the HD map data to the vehicles in a compressed format so that the data transmitted consumes less bandwidth. The online HD map system 110 receives from various vehicles, information describing the data that is stored at the local HD map store 275 of the vehicle. If the online HD map system 110 determines that the vehicle does not have certain portion of the HD map stored locally in the local HD map store 275, the online HD map system 110 sends that portion of the HD map to the vehicle. If the online HD map system 110 determines that the vehicle did previously receive that particular portion of the HD map but the corresponding data was updated by the online HD map system 110 since the vehicle last received the data, the online HD map system 110 sends an update for that portion of the HD map stored at the vehicle. This allows the online HD map system 110 to minimize the amount of data that is communicated with the vehicle and also to keep the HD map data stored locally in the vehicle updated on a regular basis.

A vehicle 150 includes vehicle sensors 105, vehicle controls 130, and a vehicle computing system 120. The vehicle sensors 105 allow the vehicle 150 to detect the surroundings of the vehicle as well as information describing the current state of the vehicle, for example, information describing the location and motion parameters of the vehicle. The vehicle sensors 105 comprise a camera, a light detection and ranging sensor (LIDAR), a global positioning system (GPS) navigation system, an inertial measurement unit (IMU), and others. The vehicle has one or more cameras that capture images of the surroundings of the vehicle. A LIDAR surveys the surroundings of the vehicle by measuring distance to a target by illuminating that target with a laser light pulses, and measuring the reflected pulses. The GPS navigation system determines the position of the vehicle based on signals from satellites. An IMU is an electronic device that measures and reports motion data of the vehicle such as velocity, acceleration, direction of movement, speed, angular rate, and so on using a combination of accelerometers and gyroscopes or other measuring instruments.

The vehicle controls 130 control the physical movement of the vehicle, for example, acceleration, direction change, starting, stopping, and so on. The vehicle controls 130 include the machinery for controlling the accelerator, brakes, steering wheel, and so on. The vehicle computing system 120 continuously provides control signals to the vehicle controls 130, thereby causing an autonomous vehicle to drive along a selected route.

The vehicle computing system 120 performs various tasks including processing data collected by the sensors as well as map data received from the online HD map system 110. The vehicle computing system 120 also processes data for sending to the online HD map system 110. Details of the vehicle computing system are illustrated in FIG. 2 and further described in connection with FIG. 2.

The interactions between the vehicle computing systems 120 and the online HD map system 110 are typically performed via a network, for example, via the Internet. The network enables communications between the vehicle computing systems 120 and the online HD map system 110. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
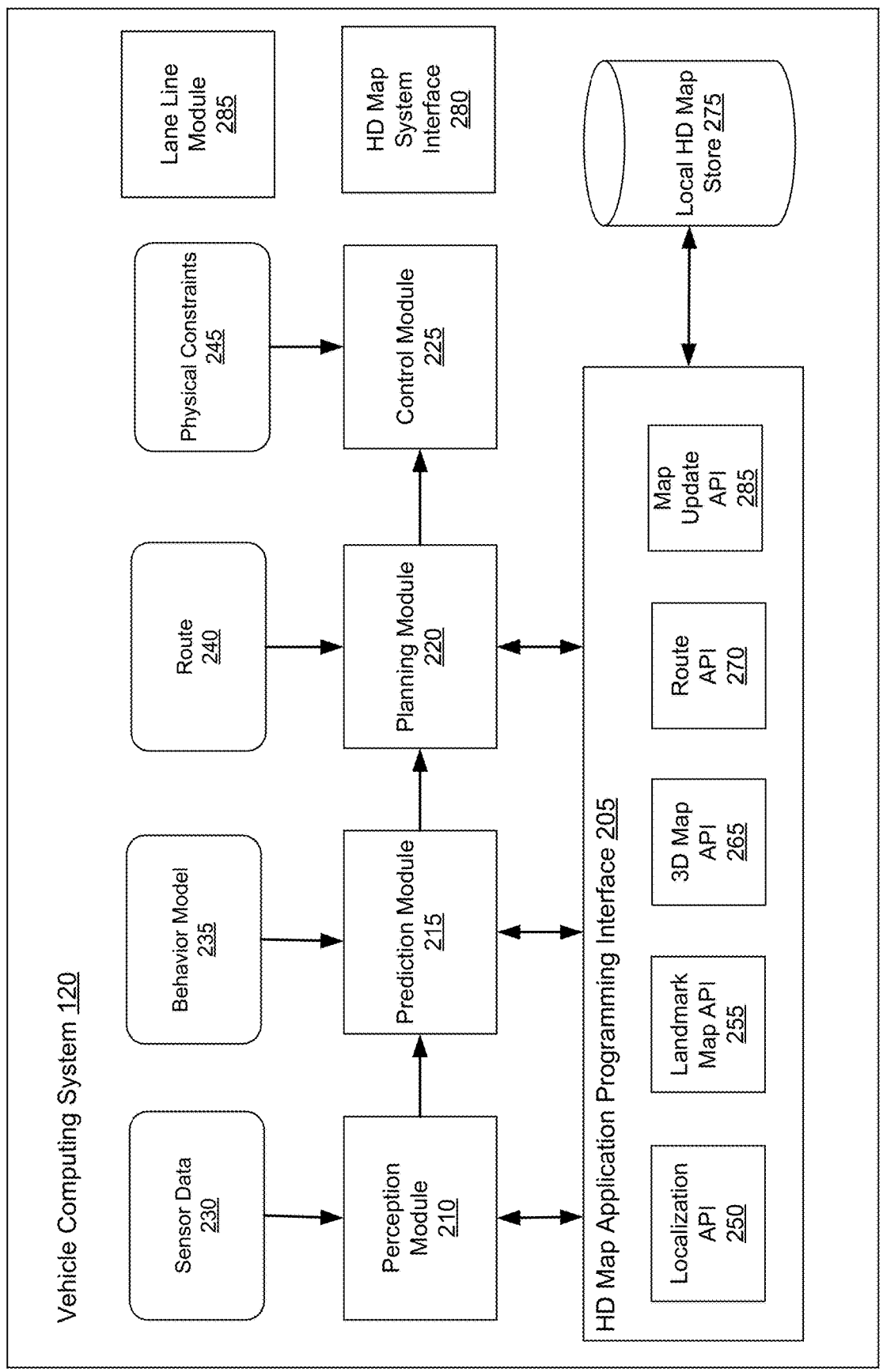
FIG. 2 shows the system architecture of a vehicle computing system, according to an embodiment.

FIG. 2 shows the system architecture of a vehicle computing system, according to an embodiment. The vehicle computing system 120 comprises a perception module 210, prediction module 215, planning module 220, a control module 225, a local HD map store 275, an HD map system interface 280, and an HD map application programming interface (API) 205. The various modules of the vehicle computing system 120 process various type of data including sensor data 230, a behavior model 235, routes 240, and physical constraints 245. In other embodiments, the vehicle computing system 120 may have more or fewer modules. Functionality described as being implemented by a particular module may be implemented by other modules.

The perception module 210 receives sensor data 230 from the sensors 105 of the vehicle 150. This includes data collected by cameras of the car, LIDAR, IMU, GPS navigation system, and so on. The perception module 210 uses the sensor data to determine what objects are around the vehicle, the details of the road on which the vehicle is travelling, and so on. The perception module 210 processes the sensor data 230 to populate data structures storing the sensor data and provides the information to the prediction module 215.

The prediction module 215 interprets the data provided by the perception module using behavior models of the objects perceived to determine whether an object is moving or likely to move. For example, the prediction module 215 may determine that objects representing road signs are not likely to move, whereas objects identified as vehicles, people, and so on, are either moving or likely to move. The prediction module 215 uses the behavior models 235 of various types of objects to determine whether they are likely to move. The prediction module 215 provides the predictions of various objects to the planning module 200 to plan the subsequent actions that the vehicle needs to take next.

The planning module 200 receives the information describing the surroundings of the vehicle from the prediction module 215, the route 240 that determines the destination of the vehicle, and the path that the vehicle should take to get to the destination. The planning module 200 uses the information from the prediction module 215 and the route 240 to plan a sequence of actions that the vehicle needs to take within a short time interval, for example, within the next few seconds. In an embodiment, the planning module 200 specifies the sequence of actions as one or more points representing nearby locations that the vehicle needs to drive through next. The planning module 200 provides the details of the plan comprising the sequence of actions to be taken by the vehicle to the control module 225. The plan may determine the subsequent action of the vehicle, for example, whether the vehicle performs a lane change, a turn, acceleration by increasing the speed or slowing down, and so on.

The control module 225 determines the control signals for sending to the controls 130 of the vehicle based on the plan received from the planning module 200. For example, if the vehicle is currently at point A and the plan specifies that the vehicle should next go to a nearby point B, the control module 225 determines the control signals for the controls 130 that would cause the vehicle to go from point A to point B in a safe and smooth way, for example, without taking any sharp turns or a zig zag path from point A to point B. The path taken by the vehicle to go from point A to point B may depend on the current speed and direction of the vehicle as well as the location of point B with respect to point A. For example, if the current speed of the vehicle is high, the vehicle may take a wider turn compared to a vehicle driving slowly.

The control module 225 also receives physical constraints 245 as input. These include the physical capabilities of that specific vehicle. For example, a car having a particular make and model may be able to safely make certain types of vehicle movements such as acceleration, and turns that another car with a different make and model may not be able to make safely. The control module 225 incorporates these physical constraints in determining the control signals. The control module 225 sends the control signals to the vehicle controls 130 that cause the vehicle to execute the specified sequence of actions causing the vehicle to move as planned. The above steps are constantly repeated every few seconds causing the vehicle to drive safely along the route that was planned for the vehicle.

The various modules of the vehicle computing system 120 including the perception module 210, prediction module 215, and planning module 220 receive map information to perform their respective computation. The vehicle 100 stores the HD map data in the local HD map store 275. The modules of the vehicle computing system 120 interact with the map data using the HD map API 205 that provides a set of application programming interfaces (APIs) that can be invoked by a module for accessing the map information. The HD map system interface 280 allows the vehicle computing system 120 to interact with the online HD map system 110 via a network (not shown in the Figures). The local HD map store 275 stores map data in a format specified by the HD Map system 110. The HD map API 205 is capable of processing the map data format as provided by the HD Map system 110. The HD Map API 205 provides the vehicle computing system 120 with an interface for interacting with the HD map data. The HD map API 205 includes several APIs including the localization API 250, the landmark map API 255, the route API 265, the 3D map API 270, the map update API 285, and so on.

The localization APIs 250 determine the current location of the vehicle, for example, when the vehicle starts and as the vehicle moves along a route. The localization APIs 250 include a localize API that determines an accurate location of the vehicle within the HD Map. The vehicle computing system 120 can use the location as an accurate relative positioning for making other queries, for example, feature queries, navigable space queries, and occupancy map queries further described herein. The localize API receives inputs comprising one or more of, location provided by GPS, vehicle motion data provided by IMU, LIDAR scanner data, and camera images. The localize API returns an accurate location of the vehicle as latitude and longitude coordinates. The coordinates returned by the localize API are more accurate compared to the GPS coordinates used as input, for example, the output of the localize API may have precision range from 5-10 cm. In one embodiment, the vehicle computing system 120 invokes the localize API to determine location of the vehicle periodically based on the LIDAR using scanner data, for example, at a frequency of 10 Hz. The vehicle computing system 120 may invoke the localize API to determine the vehicle location at a higher rate (e.g., 60 Hz) if GPS/IMU data is available at that rate. The vehicle computing system 120 stores as internal state, location history records to improve accuracy of subsequent localize calls. The location history record stores history of location from the point-in-time, when the car was turned off/stopped. The localization APIs 250 include a localize-route API generates an accurate route specifying lanes based on the HD map. The localize-route API takes as input a route from a source to destination via a third party maps and generates a high precision routes represented as a connected graph of navigable lanes along the input routes based on HD maps.

The landmark map API 255 provides the geometric and semantic description of the world around the vehicle, for example, description of various portions of lanes that the vehicle is currently travelling on. The landmark map APIs 255 comprise APIs that allow queries based on landmark maps, for example, fetch-lanes API and fetch-features API. The fetch-lanes API provide lane information relative to the vehicle and the fetch-features API. The fetch-lanes API receives as input a location, for example, the location of the vehicle specified using latitude and longitude of the vehicle and returns lane information relative to the input location. The fetch-lanes API may specify a distance parameters indicating the distance relative to the input location for which the lane information is retrieved. The fetch-features API receives information identifying one or more lane elements and returns landmark features relative to the specified lane elements. The landmark features include, for each landmark, a spatial description that is specific to the type of landmark.

The 3D map API 265 provides efficient access to the spatial 3-dimensional (3D) representation of the road and various physical objects around the road as stored in the local HD map store 275. The 3D map APIs 365 include a fetch-navigable-surfaces API and a fetch-occupancy-grid API. The fetch-navigable-surfaces API receives as input, identifiers for one or more lane elements and returns navigable boundaries for the specified lane elements. The fetch-occupancy-grid API receives a location as input, for example, a latitude and longitude of the vehicle, and returns information describing occupancy for the surface of the road and all objects available in the HD map near the location. The information describing occupancy includes a hierarchical volumetric grid of all positions considered occupied in the map. The occupancy grid includes information at a high resolution near the navigable areas, for example, at curbs and bumps, and relatively low resolution in less significant areas, for example, trees and walls beyond a curb. The fetch-occupancy-grid API is useful for detecting obstacles and for changing direction if necessary.

The 3D map APIs also include map update APIs, for example, download-map-updates API and upload-map-updates API. The download-map-updates API receives as input a planned route identifier and downloads map updates for data relevant to all planned routes or for a specific planned route. The upload-map-updates API uploads data collected by the vehicle computing system 120 to the online HD map system 110. This allows the online HD map system 110 to keep the HD map data stored in the online HD map system 110 up to date based on changes in map data observed by sensors of vehicles driving along various routes.

The route API 270 returns route information including full route between a source and destination and portions of route as the vehicle travels along the route. The 3D map API 365 allows querying the HD Map. The route APIs 270 include add-planned-routes API and get-planned-route API. The add-planned-routes API provides information describing planned routes to the online HD map system 110 so that information describing relevant HD maps can be downloaded by the vehicle computing system 120 and kept up to date. The add-planned-routes API receives as input, a route specified using polylines expressed in terms of latitudes and longitudes and also a time-to-live (TTL) parameter specifying a time period after which the route data can be deleted. Accordingly, the add-planned-routes API allows the vehicle to indicate the route the vehicle is planning on taking in the near future as an autonomous trip. The add-planned-route API aligns the route to the HD map, records the route and its TTL value, and makes sure that the HD map data for the route stored in the vehicle computing system 120 is up to date. The get-planned-routes API returns a list of planned routes and provides information describing a route identified by a route identifier.

The map update API 285 manages operations related to update of map data, both for the local HD map store 275 and for the HD map store 165 stored in the online HD map system 110. Accordingly, modules in the vehicle computing system 120 invoke the map update API 285 for downloading data from the online HD map system 110 to the vehicle computing system 120 for storing in the local HD map store 275 as necessary. The map update API 285 also allows the vehicle computing system 120 to determine whether the information monitored by the vehicle sensors 105 indicates a discrepancy in the map information provided by the online HD map system 110 and uploads data to the online HD map system 110 that may result in the online HD map system 110 updating the map data stored in the HD map store 165 that is provided to other vehicles 150.

FIG. 4A illustrates the various layers of instructions in the HD Map API of a vehicle computing system, according to an embodiment. Different manufacturer of vehicles have different instructions for receiving information from vehicle sensors 105 and for controlling the vehicle controls 130. Furthermore, different vendors provide different computer platforms with autonomous driving capabilities, for example, collection and analysis of vehicle sensor data.

Examples of computer platform for autonomous vehicles include platforms provided vendors, such as NVIDIA, QUALCOMM, and INTEL. These platforms provide functionality for use by autonomous vehicle manufacturers in manufacture of autonomous vehicles. A vehicle manufacturer can use any one or several computer platforms for autonomous vehicles. The online HD map system 110 provides a library for processing HD maps based on instructions specific to the manufacturer of the vehicle and instructions specific to a vendor specific platform of the vehicle. The library provides access to the HD map data and allows the vehicle to interact with the online HD map system 110.

Figure 3:
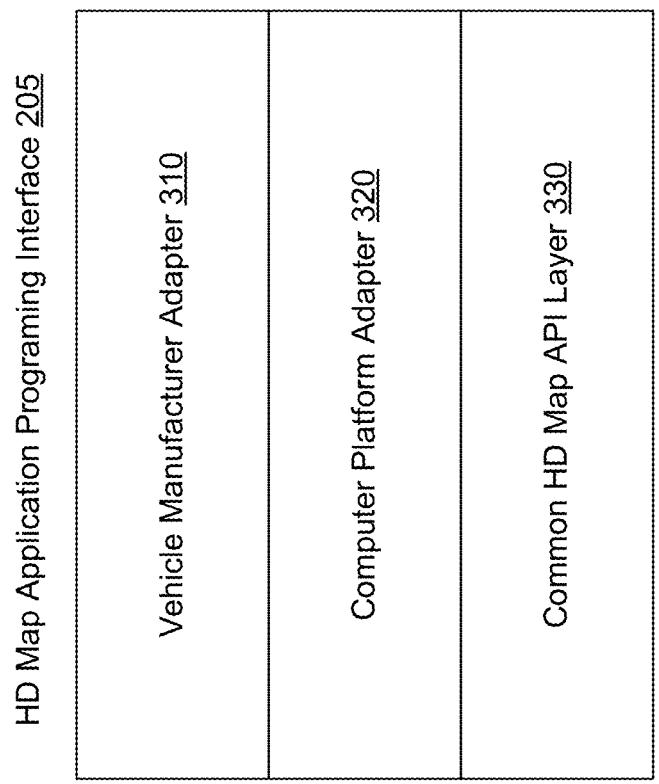
FIG. 3 illustrates the various layers of instructions in the HD Map API of a vehicle computing system, according to an embodiment.

As shown in FIG. 3, in an embodiment, the HD map API is implemented as a library that includes a vehicle manufacturer adapter 310, a computer platform adapter 320, and a common HD map API layer 330. The common HD map API layer comprises generic instructions that can be used across a plurality of vehicle computer platforms and vehicle manufacturers. The computer platform adapter 320 include instructions that are specific to each computer platform. For example, the common HD Map API layer 330 may invoke the computer platform adapter 320 to receive data from sensors supported by a specific computer platform. The vehicle manufacturer adapter 310 comprises instructions specific to a vehicle manufacturer. For example, the common HD map API layer 330 may invoke functionality provided by the vehicle manufacturer adapter 310 to send specific control instructions to the vehicle controls 130.

The online HD map system 110 stores computer platform adapters 320 for a plurality of computer platforms and vehicle manufacturer adapters 310 for a plurality of vehicle manufacturers. The online HD map system 110 determines the particular vehicle manufacturer and the particular computer platform for a specific autonomous vehicle. The online HD map system 110 selects the vehicle manufacturer adapter 310 for the particular vehicle manufacturer and the computer platform adapter 320 the particular computer platform of that specific vehicle. The online HD map system 110 sends instructions of the selected vehicle manufacturer adapter 310 and the selected computer platform adapter 320 to the vehicle computing system 120 of that specific autonomous vehicle. The vehicle computing system 120 of that specific autonomous vehicle installs the received vehicle manufacturer adapter 310 and the computer platform adapter 320. The vehicle computing system 120 periodically checks if the online HD map system 110 has an update to the installed vehicle manufacturer adapter 310 and the computer platform adapter 320. If a more recent update is available compared to the version installed on the vehicle, the vehicle computing system 120 requests and receives the latest update and installs it.

HD Map System Architecture

FIG. 4A shows the system architecture of an HD map system, according to an embodiment. The online HD map system 110 comprises a map creation module 410, a map update module 420, a map data encoding module 430, a load balancing module 440, a map accuracy management module 450, a vehicle interface module 160, a lane line module 460, a lane element graph module 470, and a HD map store 165. Other embodiments of online HD map system 110 may include more or fewer modules than shown in FIG. 4A. Functionality indicated as being performed by a particular module may be implemented by other modules. In an embodiment, the online HD map system 110 may be a distributed system comprising a plurality of processors.

The map creation module 410 creates the map from map data collected from several vehicles that are driving along various routes. Map data may comprise traffic signs to be stored in the map as will be described further in FIGS. 9 & 10. The map update module 420 updates previously computed map data by receiving more recent information from vehicles that recently traveled along routes on which map information changed. For example, if certain road signs have changed or lane information has changed as a result of construction in a region, the map update module 420 updates the maps accordingly. The map data encoding module 430 encodes map data to be able to store the data efficiently as well as send the required map data to vehicles 150 efficiently. The load balancing module 440 balances load across vehicles to ensure that requests to receive data from vehicles are uniformly distributed across different vehicles. The map accuracy management module 450 maintains high accuracy of the map data using various techniques even though the information received from individual vehicles may not have high accuracy.

Figure 28A:
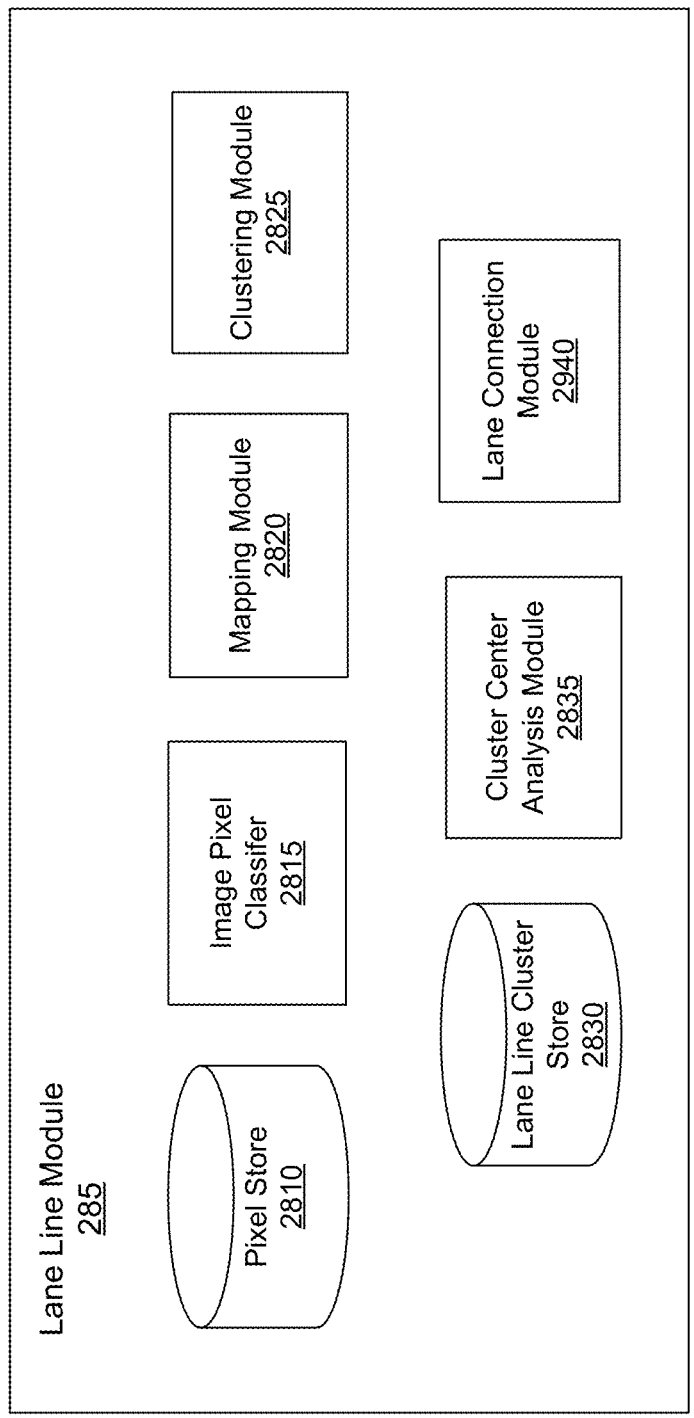
FIG. 28A shows the system architecture of a lane line module, according to an embodiment.

The lane element graph module 470 generates lane element graphs (i.e., a connected network of lane elements) to allow navigation of autonomous vehicles through a mapped area. Details of the lane line module 460 are shown in FIG. 28 and described in connection with FIG. 28A. The functionalities of the modules presented in FIG. 4B are further described below in reference to FIG. 9A-14C.

Figure 4B:
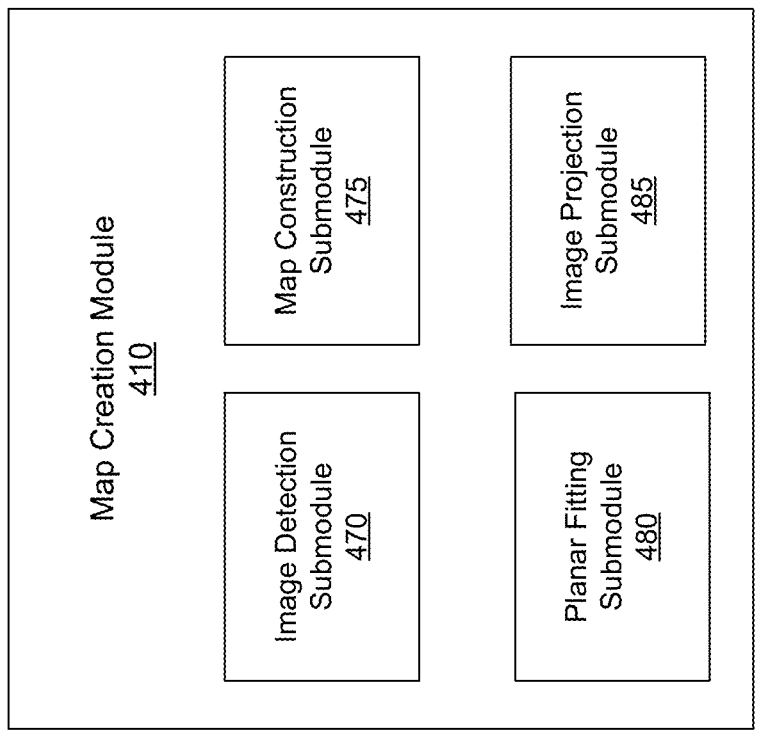
FIG. 4B shows a module architecture of the map creation module of FIG. 4A, according to an embodiment.

FIG. 4B shows a module architecture of the map creation module 410 of FIG. 4A, according to an embodiment. The map creation module 410 creates the map from map data collected from several vehicles. In one or more embodiments, the map creation module 410 comprises an image detection submodule 470, a 3D map construction submodule 475, a planar fitting submodule 480, and an image projection submodule 485, which are utilized to store traffic signs in the map. In other embodiments, the map creation module 410 of FIG. 4A comprises additional or fewer submodules for the purpose of creating the map. Upon creating the map, the map creation module 410 transmits the map to be stored by the HD map store 165 of FIG. 1 (not shown in FIG. 4B).

The image detection submodule 470 identifies a traffic sign in an image. The image detection submodule 470 receives at least one image from at least one camera (e.g., vehicle sensor 105 of FIG. 1) mounted on at least one vehicle (e.g., vehicle 150 of FIG. 1). The one image contains the traffic sign. The image detection submodule 470 receives the image and identifies the portion of the image corresponding to the traffic sign. In additional embodiments, the image detection submodule 470 applies one or more models for classifying the traffic sign with a plurality of attributes. Attributes may include type of sign, text on the traffic sign, color of the traffic sign, limitations of the traffic sign, etc. The classified attributes may be stored in the map describing the identified traffic sign. Further discussion of possible methods by which the image detection submodule 470 identifies the traffic sign and its attributes are provided in conjunction with FIG. 9.

The map construction submodule 475 constructs the map from a depth map. The map construction submodule 475 receives at least one depth map from at least one detection and ranging sensor (e.g., vehicle sensor 105 of FIG. 1) mounted on at least one vehicle (e.g., vehicle 150 of FIG. 1). The depth map contains a plurality of points displayed in two-dimensions wherein each point describes a distance of an exterior surface of a physical object from the detection and ranging sensor. The map construction submodule 475 translates each point into a position vector of the exterior surface of the physical object. The map construction submodule 475 translates a point's position in the depth map into a direction of the position vector from the detection and ranging sensor. The map construction submodule 475 translates the point's distance into the magnitude of the position vector from the detection and ranging sensor. In some embodiments, the map construction submodule 475 receives multiple depth maps and combines all translated position vectors to construct the map in three dimensions. For example, the map construction submodule 475 receives multiple LIDAR scans and then merges the multiple LIDAR scans into a point cloud that is a 3D mapping of all translated position vectors from the multiple LIDAR scans. In some instances, the map construction submodule 475 merges multiple LIDAR scans taken in quick succession and/or taken from relatively proximal positions. Further discussion of possible methods by which the map construction submodule 475 creates the map are provided in conjunction with FIG. 9, with examples to follow The planar fitting submodule 480 fits a plane corresponding to the traffic sign in the map. The planar fitting submodule 480 utilizes at least one depth map containing the traffic sign to identify a subset of at least three points corresponding to the traffic sign. In some embodiments, the planar fitting submodule 480 utilizes a depth map which the map construction module 475 utilizes to construct the map. The planar fitting submodule 480 utilizes the identified subset of at least three points and likewise identifies the corresponding position vectors in the map. The planar fitting submodule 480 fits a plane in the map based in part on the position vectors in the map, the plane corresponding to a spatial position of the traffic sign in the map. Further discussion of possible methods by which the planar fitting submodule 480 fits the plane corresponding to the traffic sign in the map are provided in conjunction with FIG. 9.

The image projection submodule 485 projects the portion of the image of the traffic sign in the map. The image projection submodule 485 takes the identified portion of the image corresponding to the traffic sign from the image detection submodule 470. The image projection submodule 485 processes the portion of the image corresponding to the traffic sign. Processing of the portion of the image corresponding to the traffic sign may comprise editing the portion of the image, adjusting dimensions of the portion of the image, improving resolution of the portion of the image, some other image-processing process, or some combination thereof. The image projection submodule 485 projects the processed portion of the image in the map by placing the processed portion of the image on the fitted plane in the map corresponding to the traffic sign. Further discussion of possible methods by which the image projection submodule 485 projects the portion of the image of the traffic sign in the map are provided in conjunction with FIG. 9.

Figure 5:
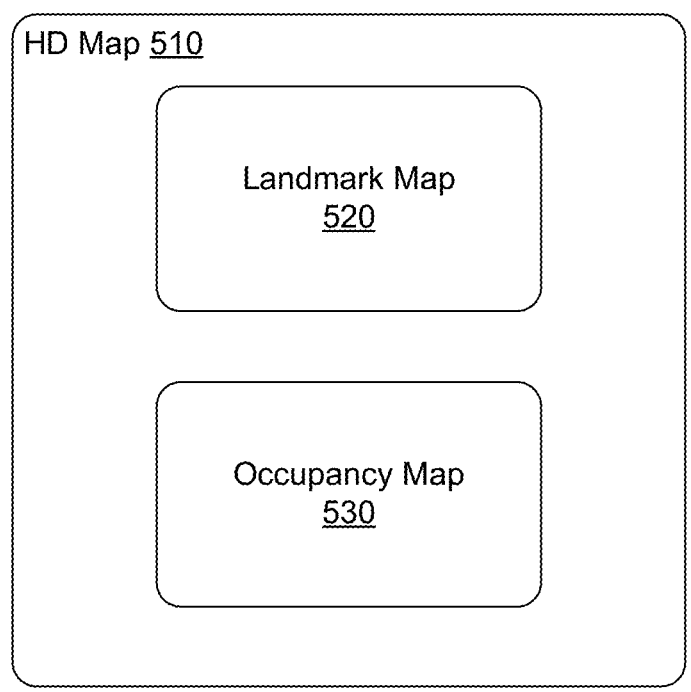
FIG. 5 illustrates the components of an HD map, according to an embodiment.

FIG. 5 illustrates the components of an HD map, according to an embodiment. The HD map comprises maps of several geographical regions. The HD map 510 of a geographical region comprises a landmark map (LMap) 520 and an occupancy map (OMap) 530. The LMap 520 comprises information describing lanes including spatial location of lanes and semantic information about each lane. The spatial location of a lane comprises the geometric location in latitude, longitude and elevation at high prevision, for example, at or below 10 cm precision. The semantic information of a lane comprises restrictions such as direction, speed, type of lane (for example, a lane for going straight, a left turn lane, a right turn lane, an exit lane, and the like), restriction on crossing to the left, connectivity to other lanes and so on. The landmark map may further comprise information describing stop lines, yield lines, spatial location of crosswalks, safely navigable space, spatial location of speed bumps, curb, and road signs comprising spatial location and type of all signage that is relevant to driving restrictions. Examples of road signs described in an HD map include stop signs, traffic lights, speed limits, one-way, do-not-enter, yield (vehicle, pedestrian, animal), and so on.

The occupancy map 530 comprises spatial 3-dimensional (3D) representation of the road and all physical objects around the road. The data stored in an occupancy map 530 is also referred to herein as occupancy grid data. The 3D representation may be associated with a confidence score indicative of a likelihood of the object existing at the location. The occupancy map 530 may be represented in a number of other ways. In one embodiment, the occupancy map 530 is represented as a 3D mesh geometry (collection of triangles) which covers the surfaces. In another embodiment, the occupancy map 530 is represented as a collection of 3D points which cover the surfaces. In another embodiment, the occupancy map 530 is represented using a 3D volumetric grid of cells at 5-10 cm resolution. Each cell indicates whether or not a surface exists at that cell, and if the surface exists, a direction along which the surface is oriented.

The occupancy map 530 may take a large amount of storage space compared to a landmark map 520. For example, data of 1 GB/mile may be used by an occupancy map 530, resulting in the map of the United States (including 4 million miles of road) occupying $4 \times 10^{15}$ bytes or 4 petabytes. Therefore the online HD map system 110 and the vehicle computing system 120 use data compression techniques for being able to store and transfer map data thereby reducing storage and transmission costs. Accordingly, the techniques disclosed herein make self-driving of autonomous vehicles possible.

In one embodiment, the HD map 510 does not require or rely on data typically included in maps, such as addresses, road names, ability to geo-code an address, and ability to computer routes between place names or addresses. The vehicle computing system 120 or the online HD map system 110 accesses other map systems, for example, GOOGLE MAPs to obtain this information. Accordingly, a vehicle computing system 120 or the online HD map system 110 receives navigation instructions from a tool such as GOOGLE MAPs into a route and converts the information to a route based on the HD map 510 information.

Geographical Regions in HD Maps

The online HD map system 110 divides a large physical area into geographical regions and stores a representation of each geographical region. Each geographical region represents a contiguous area bounded by a geometric shape, for example, a rectangle or square. In an embodiment, the online HD map system 110 divides a physical area into geographical regions of the same size independent of the amount of data required to store the representation of each geographical region. In another embodiment, the online HD map system 110 divides a physical area into geographical regions of different sizes, where the size of each geographical region is determined based on the amount of information needed for representing the geographical region. For example, a geographical region representing a densely populated area with a large number of streets represents a smaller physical area compared to a geographical region representing sparsely populated area with very few streets. Accordingly, in this embodiment, the online HD map system 110 determines the size of a geographical region based on an estimate of an amount of information required to store the various elements of the physical area relevant for an HD map.

In an embodiment, the online HD map system 110 represents a geographic region using an object or a data record that comprises various attributes including, a unique identifier for the geographical region, a unique name for the geographical region, description of the boundary of the geographical region, for example, using a bounding box of latitude and longitude coordinates, and a collection of landmark features and occupancy grid data.

Figure 6A:
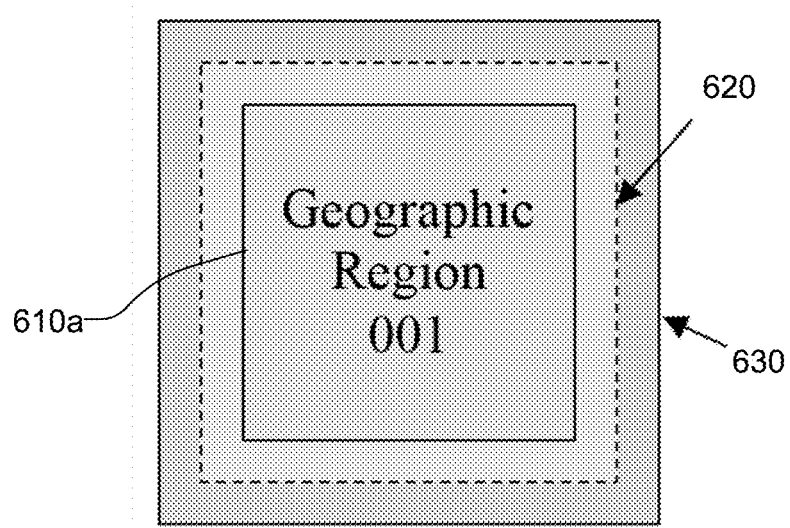
FIGS. 6A-B illustrate geographical regions defined in an HD map, according to an embodiment.
Figure 6B:
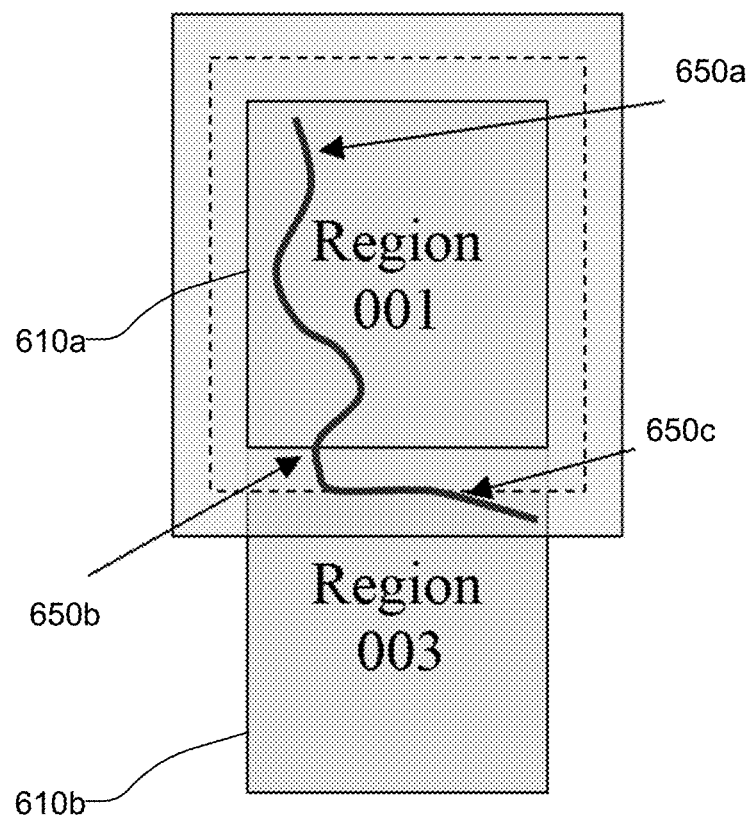

FIGS. 6A-B illustrate geographical regions defined in an HD map, according to an embodiment. FIG. 6A shows a square geographical region 610a. FIG. 6B shows two neighboring geographical regions 610a and 610b. The online HD map system 110 stores data in a representation of a geographical region that allows for smooth transition from one geographical region to another as a vehicle drives across geographical region boundaries.

According to an embodiment, as illustrated in FIG. 6, each geographic region has a buffer of a predetermined width around it. The buffer comprises redundant map data around all 4 sides of a geographic region (in the case that the geographic region is bounded by a rectangle). FIG. 6A shows a boundary 620 for a buffer of 50 meters around the geographic region 610a and a boundary 630 for buffer of 100 meters around the geographic region 610a. The vehicle computing system 120 switches the current geographical region of a vehicle from one geographical region to the neighboring geographical region when the vehicle crosses a threshold distance within this buffer. For example, as shown in FIG. 6B, a vehicle starts at location 650a in the geographical region 610a. The vehicle traverses along a route to reach a location 650b where it cross the boundary of the geographical region 610 but stays within the boundary 620 of the buffer. Accordingly, the vehicle computing system 120 continues to use the geographical region 610a as the current geographical region of the vehicle. Once the vehicle crosses the boundary 620 of the buffer at location 650c, the vehicle computing system 120 switches the current geographical region of the vehicle to geographical region 610b from 610a. The use of a buffer prevents rapid switching of the current geographical region of a vehicle as a result of the vehicle travelling along a route that closely tracks a boundary of a geographical region.

Lane Representations in HD Maps

The HD map system 100 represents lane information of streets in HD maps. Although the embodiments described herein refer to streets, the techniques are applicable to highways, alleys, avenues, boulevards, or any other path on which vehicles can travel. The HD map system 100 uses lanes as a reference frame for purposes of routing and for localization of a vehicle. The lanes represented by the HD map system 100 include lanes that are explicitly marked, for example, white and yellow striped lanes, lanes that are implicit, for example, on a country road with no lines or curbs but two directions of travel, and implicit paths that act as lanes, for example, the path that a turning car makes when entering a lane from another lane. The HD map system 100 also stores information relative to lanes, for example, landmark features such as road signs and traffic lights relative to the lanes, occupancy grids relative to the lanes for obstacle detection, and navigable spaces relative to the lanes so the vehicle can efficiently plan/react in emergencies when the vehicle must make an unplanned move out of the lane. Accordingly, the HD map system 100 stores a representation of a network of lanes to allow a vehicle to plan a legal path between a source and a destination and to add a frame of reference for real time sensing and control of the vehicle. The HD map system 100 stores information and provides APIs that allow a vehicle to determine the lane that the vehicle is currently in, the precise vehicle location relative to the lane geometry, and all relevant features/data relative to the lane and adjoining and connected lanes.

Figure 7:
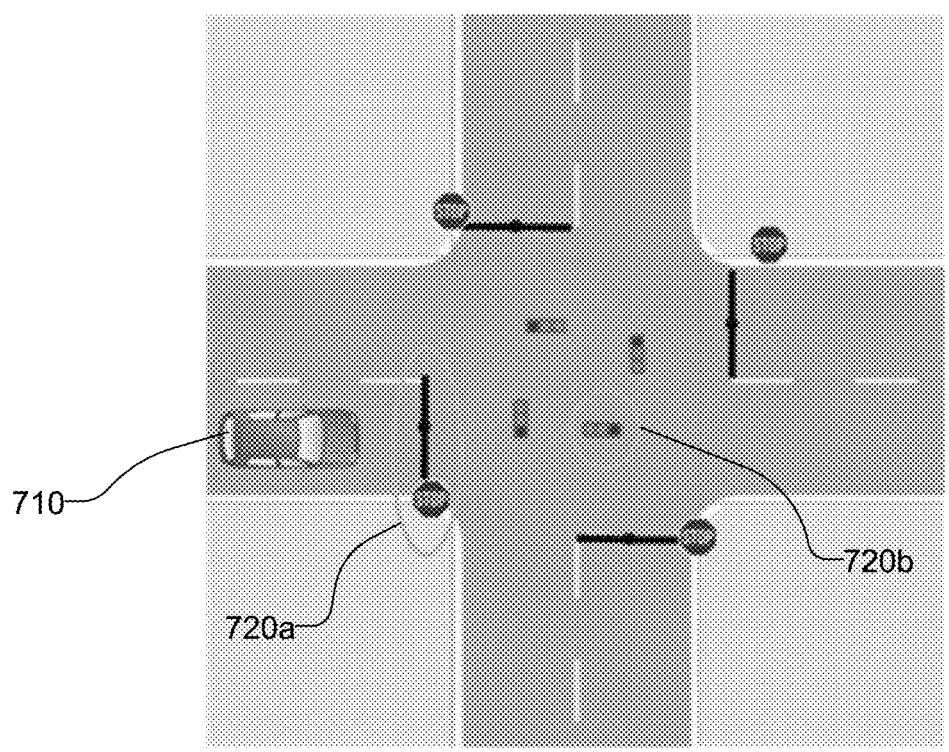
FIG. 7 illustrates representations of lanes in an HD map, according to an embodiment.

FIG. 7 illustrates lane representations in an HD map, according to an embodiment. FIG. 7 shows a vehicle 710 at a traffic intersection. The HD map system provides the vehicle with access to the map data that is relevant for autonomous driving of the vehicle. This includes, for example, features 720a and 720b that are associated with the lane but may not be the closest features to the vehicle. Therefore, the HD map system 100 stores a lane-centric representation of data that represents the relationship of the lane to the feature so that the vehicle can efficiently extract the features given a lane.

The HD map system 100 represents portions of the lanes as lane elements. A lane element specifies the boundaries of the lane and various constraints including the legal direction in which a vehicle can travel within the lane element, the speed with which the vehicle can drive within the lane element, whether the lane element is for left turn only, or right turn only, and so on. The HD map system 100 represents a lane element as a continuous geometric portion of a single vehicle lane. The HD map system 100 stores objects or data structures representing lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and so on.

Examples of lane elements represented by the HD map system 100 include, a piece of a right lane on a freeway, a piece of a lane on a road, a left turn lane, the turn from a left turn lane into another lane, a merge lane from an on-ramp an exit lane on an off-ramp, and a driveway. The HD map system 100 represents a one lane road using two lane elements, one for each direction. The HD map system 100 represents median turn lanes that are shared similar to a one-lane road.

Figure 8A:
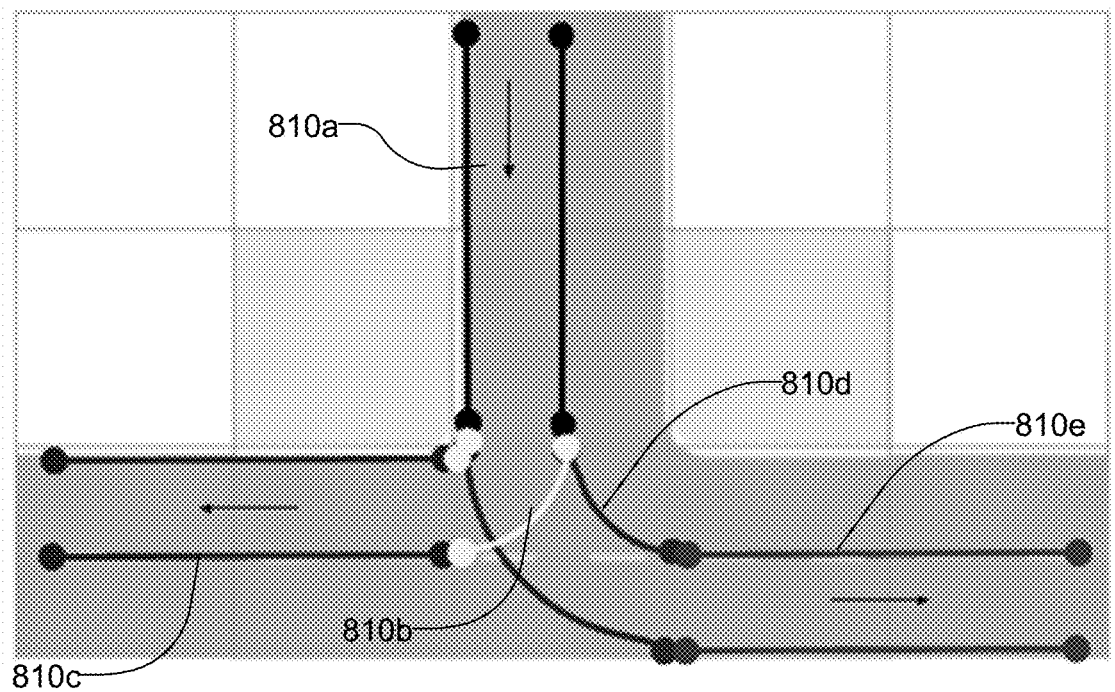
FIGS. 8A-B illustrates lane elements and relations between lane elements in an HD map, according to an embodiment.
Figure 8B:
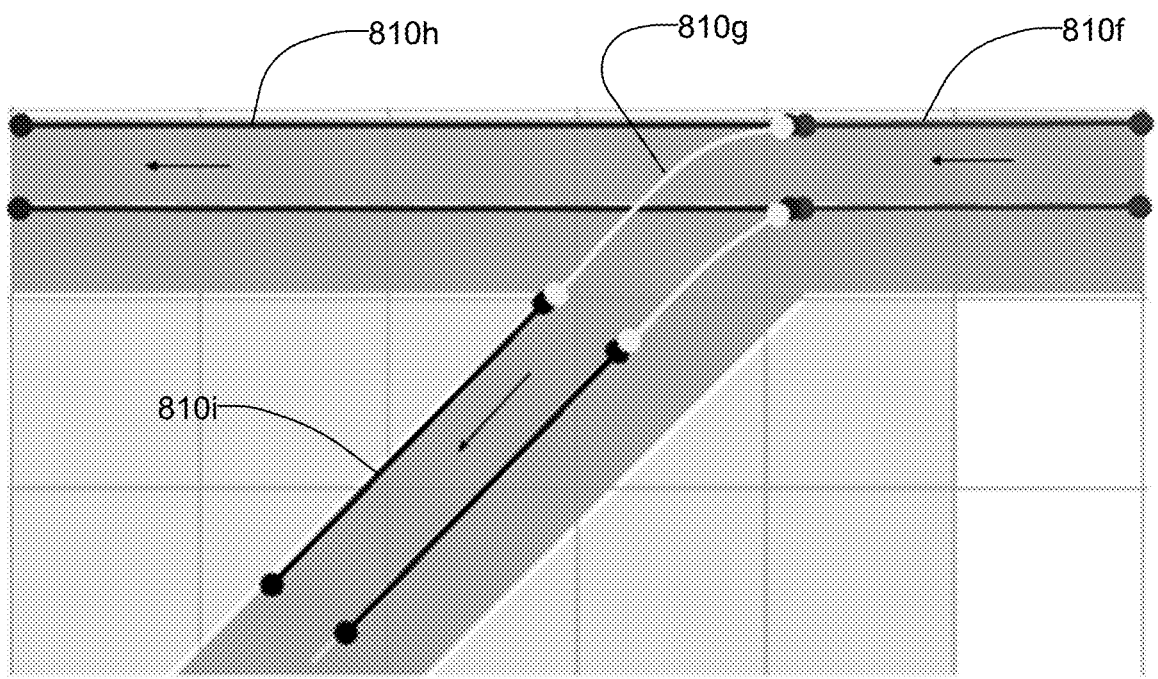

FIGS. 8A-B illustrates lane elements and relations between lane elements in an HD map, according to an embodiment. FIG. 8A shows an example of a T junction in a road illustrating a lane element 810a that is connected to lane element 810c via a turn lane 810b and is connected to lane 810e via a turn lane 810d. FIG. 8B shows an example of a Y junction in a road showing label 810f connected to lane 810h directly and connected to lane 810i via lane 810g. The HD map system 100 determines a route from a source location to a destination location as a sequence of connected lane elements that can be traversed to reach from the source location to the destination location.

Sign Creation in HD Maps

In order to build a Landmark Map (LMap) the HD map system needs to know the location and type for every traffic sign. To determine the type of sign, the HD map system uses image based classification. This can be done by a human operator or automatically by deep learning algorithms. Once the sign is detected and classified from an image, the HD map system knows the type. The HD map system further determines the location and orientation of the sign with respect to the map coordinates. The precise coordinates of the sign are needed so an autonomous vehicle (AV) may accurately predict where the sign will be located in its sensor data so that it can validate the map's prediction of the world, detect changes to the world and locate itself with respect to the map.

Embodiments perform sign feature creation for HD maps. The HD map system performs the process of creating signs using the sign's vertices in image coordinates and projecting 3D points onto that image. The 3D points that project within the image bounding box created by the sign's vertices are considered sign points. These 3D points are used to fit a plane, wherein the HD map system projects the sign's image vertices onto that 3D plane to find the 3D coordinates of the sign's vertices. At which point the HD map system has all of the information to describe a sign: its location in 3D space, its orientation described by its normal and the type of sign produced from classifying the sign in the image.

Embodiments create 3D planar objects from imagery and lidar information. Accordingly, the HD map system creates highly accurate 3D planar objects from one or more images and a sequence of one or more LiDAR scans of the area. The HD map system uses merged point clouds through the combination of scans or subsections of an Occupancy Map to identify the precise location of the 3D planar objects. The HD map system applies a correction for the rolling shutter effect, which allows the HD map system to project 3D points accurately onto the image despite distortion produced by rolling shutter while capturing images while the camera is in motion. The HD map system performs 3D scene filtering through the use of image projection and constrained depth search. The HD map system uses constraints of the 3D sign geometry to compensate for the inaccuracy of image labelled coordinates.

The features in the map encode the semantic data and inaccurate feature data in the map is likely to cause errors in the navigation of the autonomous vehicle. Thus, a requirement of HD maps is that they maintain coordinates of all features with very high accuracy, for example, 5 cm accuracy at 1 sigma (standard deviation). To locate a sign using only image information with a stereo vision setup using a 1 m baseline, there can be as much as 15-20 cm error in depth accuracy at 10 m away from the camera. Therefore the HD map system uses additional information to improve the accuracy of the sign features. LiDAR sensors are designed to accurately determine the distance to objects. Individual lidar points from a typical LiDAR scanner used for AV are in the range of +/−2 cm accuracy. Embodiments of the system use the lidar information to supplement the image information so that better accuracy can be achieved. The HD map system operates on groups of 3D points and best fits a plane to further increase the accuracy, while constraining the overall 3D geometry of the resulting sign feature.

The overall process performed by the HD map system for detecting sign features comprises the following steps: (1.) Receive as input one or more images with labelled sign vertices (2.) Identify 3D points in the scene (3.) Identify the 3D points that belong to the sign (4.) Fit a plane to the 3D sign points (5.) Project image points onto the 3D plane. The process is described in further details herein.

FIG. 9 illustrates a flowchart 900 describing a method of storing a traffic sign in a 3D map, according to one or more embodiments. The method of storing a traffic sign in a 3D map is implemented by the HD map system 110 of FIG. 1 (not shown in FIG. 9). In some embodiments, the method is carried out by the map creation module 410 or by other various modules of the HD map system 110. In one or more embodiments, the map creation module 410 comprises an image detection submodule 470, a 3D map construction submodule 475, a planar fitting submodule 480, and an image projection submodule 485, which work in tandem to store the traffic sign in the 3D map.

The method of storing the traffic sign includes receiving 910 the image with the traffic sign captured by the camera mounted on the vehicle. As mentioned prior, the camera mounted on the vehicle is an embodiment of the vehicle sensors 105 of FIG. 1. The vehicle is an embodiment of the vehicles 150 of FIG. 1. The camera captures the image, in which a portion of the image includes the entirety of the traffic sign. The traffic sign is, for example, a stationary polygon which contains information regarding a route. Traffic signs may be differentiated according to various traffic sign types. Examples of types of traffic signs are regulatory signs (e.g., 'stop' sign, 'yield' sign, speed limit signs), warning signs (e.g., 'slippery when wet', 'winding road ahead', 'construction ahead'), guide signs (e.g. route marker signs, freeway signs, welcome signs, recreational signs), street signs, etc. Additionally, the image may contain metadata information, e.g., date, time, camera settings, etc. In one or more embodiments, the image detection submodule 470 of FIG. 4B (not shown in FIG. 9) processes the first step of receiving 910 the image.

The method further includes identifying 920 a portion of the image corresponding to the traffic sign. The portion of the image corresponding to the traffic sign is identified. As mentioned prior, the traffic sign is, for example, a stationary polygon such that it may be defined by its vertices. To identify 920 the portion of the image corresponding to the traffic sign, an image classification model determines a location in the image that corresponds to the traffic sign. The image classification model also determines a polygon with minimal vertices which still encompasses the entirety of the traffic sign. In one or more embodiments, the image classification model utilizes a convolutional neural network to partition the image and more effectively locate the portion of the image which corresponds to the traffic sign. Additionally, the image classification model could implement additional layers in its convolutional neural network for identifying text within the traffic sign. The image classification model may also identify whether or not the traffic sign is obscured by other objects in the image. In one or more embodiments, the image detection submodule 470, having received 910 the image, identifies 920 the portion of the image corresponding to the traffic sign.

The method also includes receiving 930 a depth map including the traffic sign captured by a detection and ranging sensor. The depth map is a 2D map which comprises a plurality of points with each point describing a distance of a physical object to the detection and ranging sensor. The detection and ranging sensor can be a light detection and ranging sensor (LIDAR) or a radio detection and ranging sensor (RADAR). The depth map includes one or more points which correspond to the traffic sign. The detection and ranging sensor may actively filter out points in the depth map corresponding to moving objects. In one or more embodiments, the map construction submodule 475 of FIG. 4B (not shown in FIG. 9) processes the third step of receiving 930 the depth map.

The method additionally includes constructing 940 a 3D map by mapping the depth map into 3D space. The plurality of points in the depth map describing distance is utilized to construct a 3D map of an environment of the vehicle. Each point of the depth map can be mapped as a position vector of an object from the detection and ranging sensor in the 3D environment map (e.g., Occupancy Map 530 of FIG. 3). The position of a point in the depth map describes a direction of a corresponding position vector from the detection and ranging sensor and the distance of the point describes a magnitude of the position vector. From the plurality of points, the 3D map can be constructed with each point of the depth map mapping to a 3D point as defined by the position vector in the 3D map. In additional embodiments, more than one depth map can be integrated into the 3D map. Points from each depth map are added into the 3D map to provide a more comprehensive 3D map of the environment. In one or more embodiments, the map construction submodule 475, having received 930 the depth map, constructs 940 the 3D map.

In addition, the method includes identifying 950 a subset of at least three points in the depth map corresponding to the traffic sign. Of all the points in the depth map, some points describe distances of the traffic sign. To identify at least three points corresponding to the traffic sign, there are various methods for quickness and effectiveness. In one or more embodiments, a bounding box in the depth map is determined by a transformation of the portion of the image to the depth map. The transformation from camera image to detection and ranging sensor depth map can be determined by taking an image and a depth map of a single object in an environment. The points in the depth map and the portion of the image all corresponding to the single object could be used to calculate the transformation from image to depth map or vice versa. In one or more embodiments, a frustum in the 3D map which contains the traffic sign in the 3D map is determined based on a calculated minimum depth and a calculated maximum depth for the bounding box. The calculated minimum depth and the calculated maximum depth can be approximated from the size of the portion of the image corresponding to the traffic sign. In some embodiments, the classification of the traffic sign may be associated with dimensions of the traffic sign, which the HD map system 110 may recall to estimate approximate depth of the traffic sign. For example, the image classification model determines the traffic sign to be a stop sign such that the HD map system 110 recalls a standard set of dimensions for stop signs. The standard dimensions in comparison with the size of the portion of the image can provide approximate distance of the sign from the image.

The frustum is a volumetric construct in the 3D map which helps filter out points in the 3D space not close to the traffic sign thus would not correspond to the traffic sign. The frustum is constructed so as to match the shape of the bounding box, e.g., a square frustum for a square bounding box or a circular frustum for a circular bounding box. In one or more other embodiments, a first method is used for identifying the subset of at least three points by first determining a minimum point in the depth map within the frustum. The first method then identifies other points in the frustum within a threshold depth. The first method selects at least three points determined to be within the threshold depth as the subset of at least three points in the bounding box corresponding to the traffic sign. In one or more embodiments, a second method is used for identifying the subset of at least three points by first partitioning the bounding box into a plurality of cells. For each cell, the second method determines a minimum point in that cell. Then the second method calculates and selects one or more cells which have minimum points which are closest in proximity. The second method selects at least the three minimum points of the selected one or more cells as the subset of at least three points corresponding to the traffic sign. Depth within a cell is set by a metric distance from the closest point within that cell. Discussion of examples of creating the frustum and selecting the subset of at least three points within the frustum are presented in conjunction with FIGS. 12 & 13. In one or more embodiments, the planar fitting submodule 480 of the map creation module 410 identifies 950 the subset of at least three points with the process described herein.

The method also includes fitting 960 a plane in the 3D map based at least in part on the subset of at least three points. The subset of at least three points corresponding to the traffic sign are the basis to determine the plane in the 3D map which corresponds to where the traffic sign resides spatially. With a subset of exactly three points, the HD map system 110 determines the plane which contains the three points. With a subset of more than three points, the HD map system 110 may utilize a variety of fitting methods. One potential fitting method is a regression analysis. Another potential fitting method is random sample consensus (RANSAC). RANSAC is an iterative process which fits the plane by iteratively increasing influence of inliers in the subset of points while iteratively decreasing influence of outliers in the fitting process. Once the plane is established, it can be further reduced with the bounding box. In one or more embodiments, the planar fitting submodule 480 of the map creation module 410 fits 960 the plane in the 3D map based at least in part on the subset of at least three points with the process described herein.

The method further includes projecting 970 the identified portion of the image corresponding to the traffic sign onto the fitted plane in the 3D map. Projecting the identified portion of the image corresponding to the traffic sign onto the fitted plane in the 3D map takes the 2D image and places the 2D image onto the fitted plane. This can be done using various methods. In one potential projection method, the portion of the image corresponding to the traffic sign can be projected through drawing a ray from the detection and ranging sensor through each individual pixel to determine an intersection of the ray with the fitted plane. The intersection is the projected position of that pixel. After repeating for all pixels of the portion of the image, all pixels are projected on the 3D map in the fitted plane for the traffic sign. In some embodiments, only the image points corresponding to the sign vertices are projected. In other embodiments, all pixels of the sign image may be projected to obtain color information for the sign. The intersection is the projected position of that pixel. In one or more additional embodiments, there are one or more geometric constraints applied in the projected image for refining the projected image by fixing dimensions of the projected image. One geometric constraint may be determined by the shape of the identified traffic sign. For example, the projected image may be distorted so as to fit a stop sign into a regular octagon by insuring the vertices are equidistant from a centroid point in the 3D map. The projected image in the 3D map may be further processed with color adjustments, sharpening, noise reduction, other image correction, etc. In one or more embodiments, the image projection submodule 485 of the map creation module 410 projects 970 the identified portion of the image corresponding to the traffic sign onto the fitted plane in the 3D map with the process described herein.

Following are details of various steps of the above process according to various embodiments.

Identifying 3D Points in a Scene

To determine the 3D location of the sign, the HD map system determines the 3D geometry of the scene. Since a vehicle is scanning the world using LiDAR sensor(s), the HD map system efficiently and accurately creates a 3D representation of the image scene. Embodiments produce the scene from the LiDAR information using following techniques: (1.) using a single scan at the time of that the image was captured, (2.) aggregating aligned scans from before and after the image sample, and (3.) using the OMap (a 3D volumetric grid of occupied points built by fusing many sample runs through a region).

At each image sample there is an associated lidar scan. This scan may or may not contain enough data to capture a 3D representation of the sign. If there is enough information (at least 3 non-collinear points) on the sign then the HD map system has enough data and can continue. If the HD map system does not have enough data the HD map system uses one of the following approaches. According to an embodiment, the HD map system merges point clouds relative to the current sample. The HD map system selects poses that are nearby and likely to contain the data points on the sign and merges the lidar scans at each of these poses into a single point cloud on which the system can operate. This method has the benefit of providing abundant amounts of data at the cost of computation time and lack of scalability. According to another embodiment, the HD map system uses the OMap for representing the 3D geometry. The OMap contains voxelized data from many tracks and thus it likely has a more complete picture at the cost of 5 cm voxelization and the greater potential to be susceptible to errors in alignment as misalignments across tracks will cause noisier data. Using subsections of the OMap is significantly more scalable because the cost of merging the LiDAR scans is done once.

By using the LiDAR data, the HD map system is able to identify the 3D location of sign features from monocular imagery. When the HD map system merges multiple point clouds, the HD map system ensures that samples are at least a certain distance apart to avoid redundant data points. The HD map system also supports variable distances both forward and backward along a track for selecting the point cloud to merge. In an embodiment, the HD map system computes the merged point cloud on the failure in a single point cloud due to inadequate amount of data or if the plane fitting did not meet certain criteria for orientation based upon the vertical component of the normal.

Identifying Sign Points

The 3D scene points typically contain a large number of points, with only a small selection of those points representing the sign. By knowing the transformation from the 3D LiDAR points to camera coordinates, the HD map system performs a frustum check produced by the image bounding box and a minimum and maximum depth to filter the points. Using stereo images or by knowing the approximate real world size of the sign for a single image, the HD map system produces the estimated minimum and maximum depth for the frustum. For the resulting points in the frustum the HD map system uses the calibrated camera projection matrices to project the 3D points onto the image. According to another embodiment, the HD map system projects all the points onto the image and checks whether or not the sign's 2D bounding box in the image contains the point. After the points outside of the image bounding box are filter out, the HD map system processes points which may lie behind the sign in 3D but which project onto the same 2D space. The HD map system filters out these points in a number of ways. According to an embodiment, the HD map system selects the closest point in 3D and selects only other points which are close to this point. This works well for unoccluded signs which have a reasonable distance between its points and the points of any other object.

According to another embodiment, the HD map system selects the closest point that falls into each 2D cell, where a 2D cell could be a pixel or any other larger or smaller 2D grid element. In some embodiments, the HD map system uses 3D cells and selects the closest point that falls in each 3D cell. This selects only the front points of the sign as viewable from the image. This method is ideal in the case that the sign plane is complete with minimal noise in 3D, but LiDAR is sparse so there are holes where a farther away point could be selected and if there are many points of noise in front of the sign then this method will make a poor selection of points. The best method depends on the characteristics of the data which is dependent on the method of merging point clouds. Other embodiments use the first n-points for a cell, weight average of points for a cell and a hybrid combination of the max distance from the minimum point and some measure of selecting the first point.

A benefit of allowing arbitrary vertices to describe a sign rather than the tightest rectangular bounding box is that it allows for a superior segmentation of the LiDAR points. This method of filtering points using the image information is a more efficient approach to dealing with the large quantity of points as compared to most techniques that only use 3D point information. In an embodiment, the HD map system performs a correction for rolling shutter cameras. In order to correctly project the 3D points onto the image, the HD map system transforms the 3D coordinates of the points according to the image row that they would project on. The row of the image indicates at what time that point was captured by the image such that the HD map system can shift it accordingly. This correction ensures that the 3D points correctly project onto the image.

Fitting a Plane Onto 3D Points

After the points pertaining to the sign have been correctly segmented, the HD map system fits a plane to the points. The HD map system uses RANSAC to fit the plane. This provides an initial guess for the location and orientation of the plane. After which, the HD map system may use any of the following methods for optimizing the plane fit.

According to an embodiment, the HD map system focuses on 3D location of the points and disregards the 2D. In this approach the HD map system refines the location of the 3D sign vertices by optimizing the distance between each pair of vertices simultaneously with the plane orientation and location. The HD map system changes the distance between points by perturbing the image coordinates of each point used to project onto the 3D plane. This results in a 2×N+6 degree of freedom optimization problem, where N is the number of sign vertices. This produces a regularized 3D geometry that projects onto the best fit plane. Although this produces the best 3D sign, it does not minimize the 2D reprojection error. Since a sign is labelled on a single sample, the HD map system relies on the aggregation of signs in the automated sign creation to reduce the reprojection error across image samples.

According to another embodiment, the HD map system minimizes the plane fit error and the reprojection error. In the optimization, the HD map system minimizes (1/N)*(sum squared plane fit error)+lambda*(1/N)*(sum squared 3d reprojection errors). Where N is the number of vertices and lambda is a regularization term to balance plane fit and reprojection errors. The HD map system measures the plane fitting error across all points that were inliers in the initial RANSAC plane fitting and measures the reprojection error across all image samples supplied for feature creation. This provides the HD map system the ability to minimize the plane fit and reprojection error on a single image during automation and then rerun the process across all image samples the feature is visible from during the sign aggregation step to minimize the plane fitting and reprojection error across all image samples.

Projecting Image Points onto Plane

This step projects the image coordinate vertices onto the 3D plane that was fitted. By projecting a ray from the camera origin, through the pixel and through the 3D sign plane, the HD map system finds the intersection of that ray and the plane in 3D. This intersection is the location of the image coordinate in 3D on that sign. After the HD map system determines the 3D coordinates of all of the sign vertices, the HD map system applies the inverse of the rolling shutter correction (assuming the camera chip was using rolling shutter).

According to an embodiment, the HD map system places additional constraints on the created sign geometry after calculating the 3D points. Due to the ambiguity of pixels, possibly imprecise vertex labelling and other errors, the 3D sign geometry after projection onto the plane is irregular. The HD map system enforces the geometry of the 3D sign to be both planar and geometrically constrained based on the sign type, for instance stop signs are constrained to be an octagon and a rectangular speed limit sign is constrained to have rectangular geometry. According to an embodiment, the HD map system enforces these constraints for regular polygons by calculating the centroid of the points, then calculating the farther point away from the center and using that distance as the radius for a circle. The polygon is inscribed within the circle starting at the first vertex in the input list. Four sided signs have a different approach in that they select the top two point and bottom two points, then calculate the vector between the two top points and the vector between the two bottom points then take the average of this vector to represent the width. The HD map system repeats the steps for the vectors going from top to bottom and then takes the cross product of these resulting vector to ensure that the vectors are orthogonal and then recomputes the corners.

Optimizing 3D Location

As a final step, the HD map system optimizes the 3D location of the sign with respect to its position in the OMap. This is done by shifting the sign until it contains the highest density of OMap points within its bounding box. If the sign is considered to be a plane with some thickness in 3D, the HD map system maximizes the number of points contained inside of the 3D box by iteratively computing the number of points contained within the box at different 3D positions. According to another embodiment, the HD map system performs a more computationally efficient version that counts the number of points in the box at the current location. Then counts the number of points in nearby boxes and shifts the box in that direction only if the number of points contained inside the box would be greater after shifting the box to that location. According to another embodiment, the HD map system determines this location by selecting all points within some region defined by a radius r, from the current location and computing the center of mass of the points within this region and the direction of the plane by using principal component analysis. This step is desirable as the accuracy of the sign position relative to the OMap is the ultimate goal.

There are potential cases where the lidar data does not exist or is insufficient. In the case where the HD map system has lidar data but it is insufficient to fit a plane, i.e., there are less than three points or all points are collinear, then the HD map system uses the available lidar points to determine the distance from the vehicle to the sign and uses stereo vision for calculating the rest of the position information. For example, if the HD map system has only one lidar point, the HD map system calculates the x, y coordinates using stereo vision and makes the assumption that the sign is directly facing the camera so that the z is constant and equal to the lidar point's z in camera coordinates value. If the HD map system has two or more points, the HD map system creates a line. The HD map system then calculates the intersection of the x and y coordinates with that line, making the assumption that the plane is not tilted up or down and only has rotation about the y axis. In the case that the HD map system has no lidar points at all, the HD map system uses stereo triangulation to locate the sign feature in 3D. If the HD map system has multiple labelled stereo image pairs, the HD map system performs a bundle adjustment of the 3D location across all frames to minimize the reprojection error across all frames.

Sign Aggregation

Creating a sign hypothesis for every image sample from which the sign was visible means that for every sign the HD map system should have multiple images of it, possibly from across different tracks, and therefore multiple location hypotheses. In the sign aggregation step, the HD map system clusters these hypotheses to produce a single feature for each cluster. The clustering of the signs takes into account the orientation of the sign relative to the camera it was viewed from to prioritize signs with are viewed head on in the camera. Additionally the HD map system uses heuristics of planar area to remove wrong hypotheses and then the HD map system clusters the signs based upon the euclidean distance between sign centers and angle between sign planes. Once the features have been clustered the HD map system has a number of sign features all belonging to the same ground truth sign. In an embodiment, the HD map system selects the best features from cluster using a weighted scoring technique. Accordingly, the HD map system selects scores based on various criteria including closeness to median area of cluster, angle between sign normal and car heading, reprojection error of sign compared against deep learning detection result, reprojection error of sign on all images of cluster compared against corresponding deep learning result. The HD map system determines a weighted aggregate of these scores and ranks the features to select the best features.

Figure 10A:
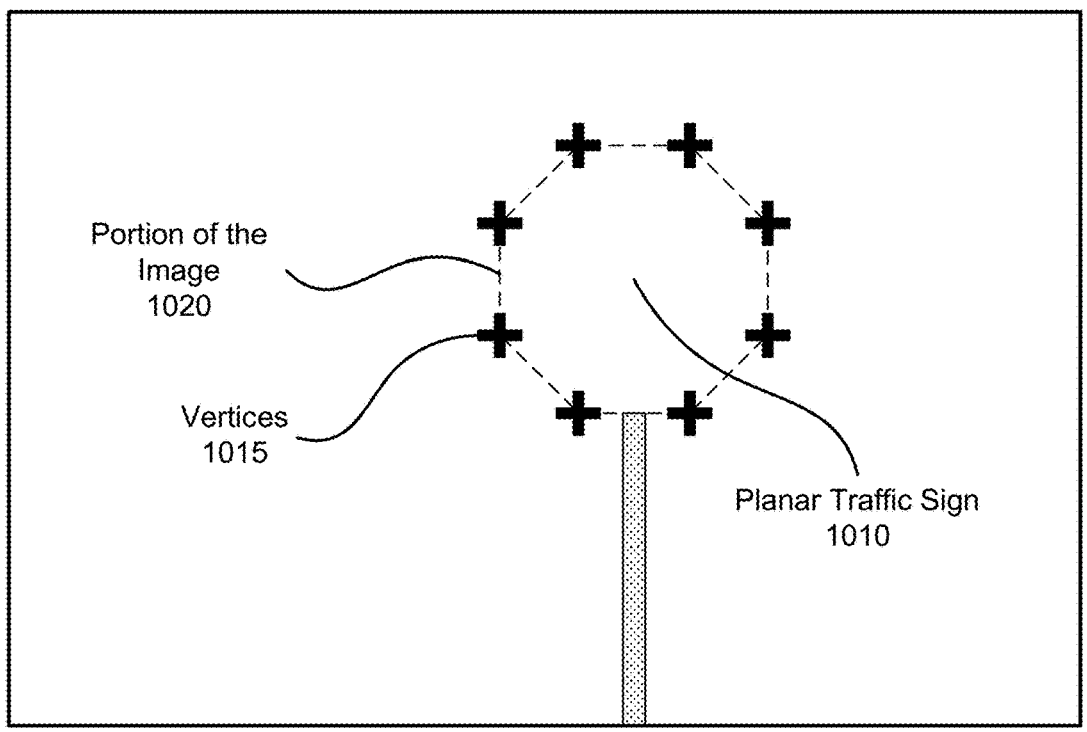
FIG. 10A illustrates a first image with a planar traffic sign with identified vertices, according to one or more embodiments.

FIG. 10A illustrates a first image 1000 with a planar traffic sign 1010 with identified vertices, according to one or more embodiments. In an example illustration, the HD map system 110 performs a portion of the method of FIG. 9. The HD map system 110 first receives 910 the first image 1000 with the planar traffic sign 1010 from a vehicle sensor 105 of a vehicle 150. The identified planar traffic sign 1010 is unobstructed in the first image 1000 and is octagonal in shape with a plurality of vertices 1015 (referring to all eight vertices denoted by crosses in FIG. 10A). The HD map system 110 continues to identify 920 a portion of the image 1020 corresponding to the planar traffic sign 1010. In this illustration, the identification 920 of the portion of the image 1020 includes identifying the plurality of vertices 1015 which help define a shape of the traffic sign. In this example, the HD map system 110 identifies eight vertices for the planar traffic sign 1010 thereby determining the planar traffic sign 1010 to be octagonal in shape. As vertices are connected to establish the octagon, the HD map system 110 determines the portion of the image 1020 corresponding to the planar traffic sign 1010. The HD map system 110 utilizes the portion of the image 1020 to determine a bounding box in a corresponding depth map based on a transformation from the image to the depth map.

Figure 10B:
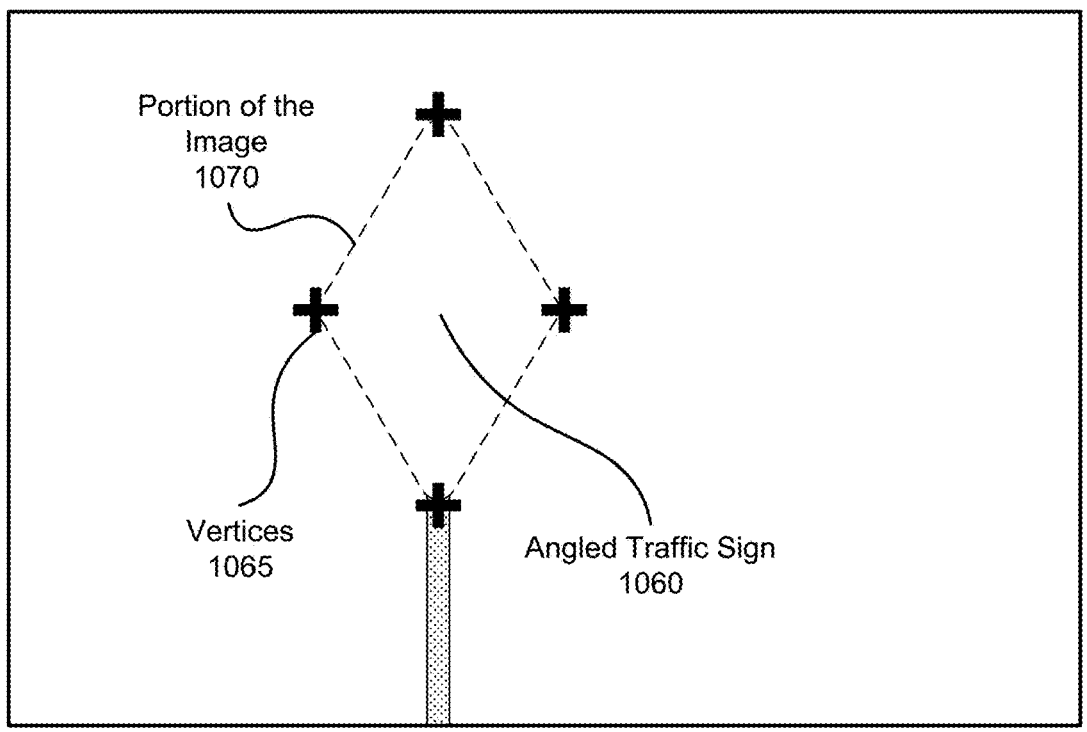
FIG. 10B illustrates a second image with an angled traffic sign with identified vertices, according to one or more embodiments.

FIG. 10B illustrates a second image with an angled traffic sign with identified vertices, according to one or more embodiments. In another example illustration, the HD map system 110 performs a portion of the method of FIG. 9. The HD map system 110 first receives 910 the second image 1050 with the angled traffic sign 1060 from a vehicle sensor 105 of a vehicle 150. The identified angled traffic sign 1060 is unobstructed in the first image 1000 and is square in shape when viewed in a planar view. However, in this example illustration, the angled traffic sign 1060 is angled such that the second image 1050 captures the angled traffic sign 1060 in a rhombus shape. The HD map system 110 continues to identify 920 a portion of the image 1070 corresponding to the angled traffic sign 1060. In this illustration, the identification 920 of the portion of the image 1070 includes identifying a plurality of vertices 1065. In this example, the HD map system 110 identifies four vertices for the angled traffic sign 1060 thereby determining the angled traffic sign 1010 to be quadrilateral in shape. As vertices are connected to establish a rhombus, the HD map system 110 determines the rhombus to be the portion of the image 1070 corresponding to the angled traffic sign 1060. Furthermore, the HD map system 110 applies an image classification model which determines that the angled traffic sign 1060 is indeed angled. In further steps of the method of FIG. 9, the HD map system 110 may distort the portion of the image 1070 when projecting onto a fitted plane in the 3D map corresponding to the angled traffic sign 1060 so as to adjust for projecting the rhombus shape in the image onto the square shape in the 3D map.

Figure 11:
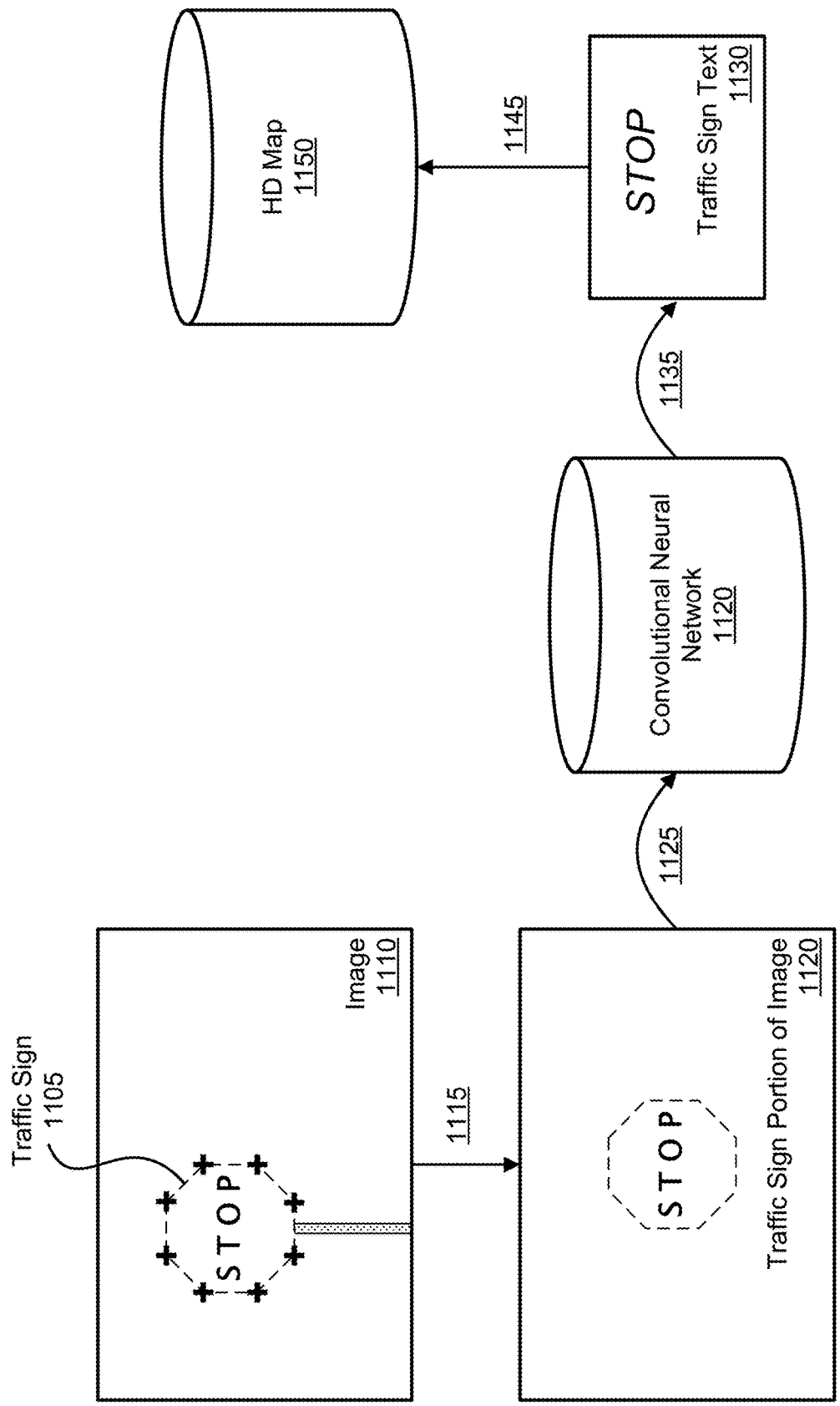
FIG. 11 illustrates a method of deciphering text on a traffic sign, according to one or more embodiments.

FIG. 11 illustrates a method of deciphering text on a traffic sign 1105, according to one or more embodiments. In an example illustration, the HD map system 110 performs a portion of the method of FIG. 9. The HD map system 110 receives the image 1110 as the first step of the method of FIG. 9 including a stop sign as the traffic sign. In the second step, the HD map system 110 identifies the portion of the image 1120 corresponding to the traffic sign. The HD map system 110 applies a convolutional neural network model to the identified portion of the image 1120 which in return identifies text on the portion of the image 1120. In this example, the convolutional neural network model identifies "STOP" as the text on the traffic sign. The HD map system 110 may store the text as an attribute of the identified traffic sign in the HD map 1150. The HD map system 110 may further determine legal limitations dependent on the text. For example, the text "STOP" necessitates a legal requirement to come to a full stop at an intersection with the traffic sign. These further limitations may be additionally stored as additional attributes of the traffic sign in the HD map 1150.

Figure 12:
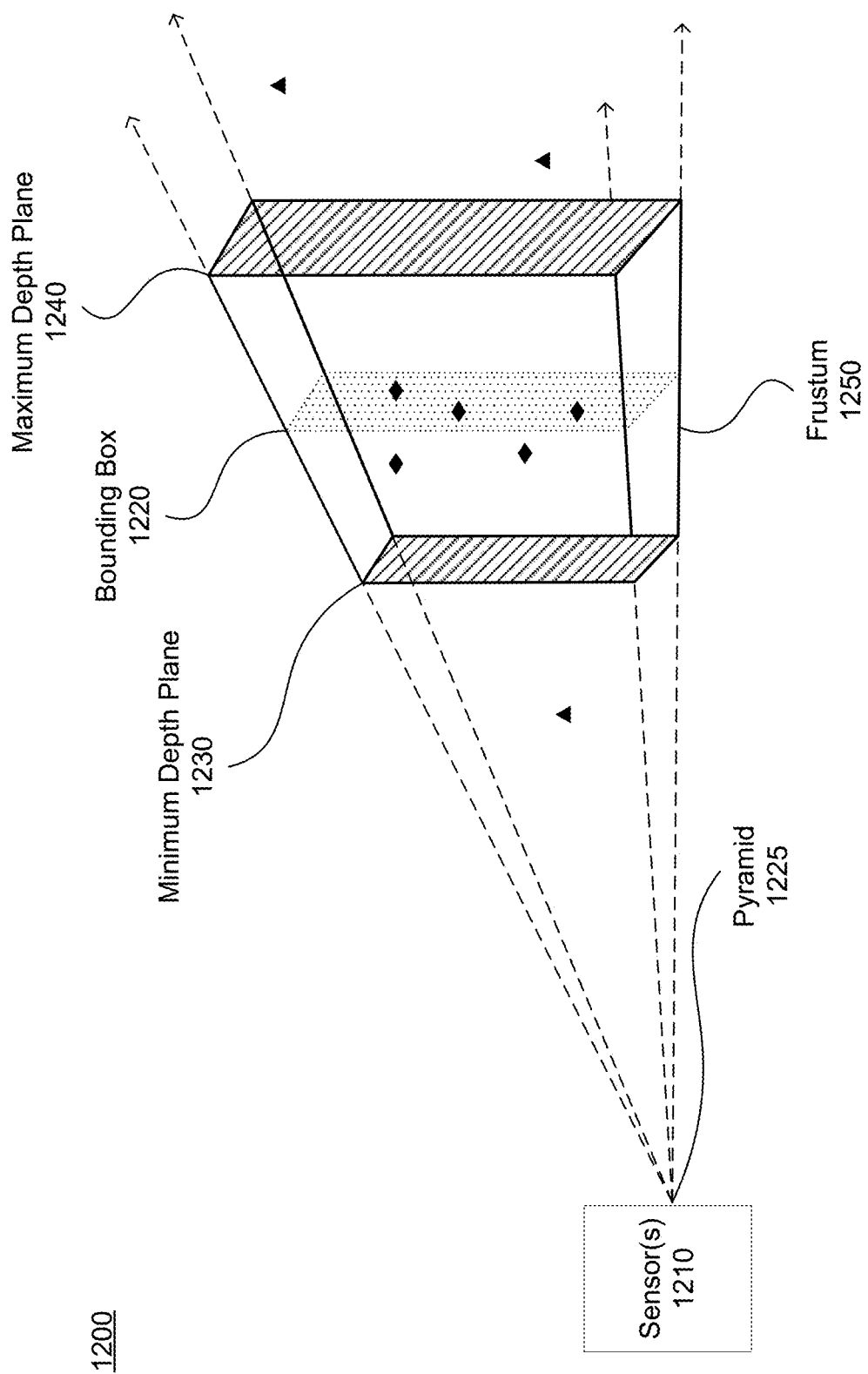
FIG. 12 illustrates a method of identifying points corresponding to a traffic sign by filtering out points in a 3D map with a frustum, according to one or more embodiments.

FIG. 12 illustrates a method of identifying points corresponding to a traffic sign by filtering out points in a 3D map 1200 with a frustum 1250, according to one or more embodiments. A vehicle has one or more sensors 1210, including a LIDAR and one or more cameras mounted. The 3D map 1200 is constructed by the HD map system 110 based on a depth map produced by a sensor 1210, such as a light detection and ranging sensor (LIDAR). The 3D map 1200 comprises a plurality of points corresponding to position vectors of objects in the environment derived from points in the depth map. The HD map system 110 determines a bounding box 1220 in image space from the traffic sign image vertices. Each vertex of the bounding box 1220 establishes a ray from a sensor 1210 on the vehicle, such as a camera. All the rays from the vertices of the bounding box 1220 establish a frustum 1250 from the camera indefinitely. In this illustration, the bounding box 1220 is rectangular in shape thus the pyramid is rectangular. Utilizing the closest lidar point within the frustum as the minimum depth and setting the maximum depth relative to the minimum depth, a minimum depth plane 1230 and a maximum depth plane 1240 can be defined. In some embodiments, the minimum depth plane 1230 and the maximum depth plane 1240 can be further constrained by the HD map system 110 based on geometric constraints. For example, the minimum depth plane 1230 and the maximum depth plane 1240 may be constrained to be parallel to each other. In another example, the HD map system 110 determines the traffic sign to be angled and so constrains the minimum depth plane 1230 and the maximum depth plane 1240 to be parallel to the determined angle of the traffic sign. The minimum depth plane 1230 and the maximum depth plane 1240 intersect the pyramid 1225 established by the bounding box 1220 to determine the frustum 1250. All points in the 3D map 1200 within the pyramid 1225 which fall outside the frustum 1250 are filtered out. In this illustration all points in the 3D map 1200 represented as triangles are filtered out. The HD map system 110 identifies points corresponding to the traffic sign from points within the frustum 1250 represented as rhombuses in this illustration.

Figure 13:
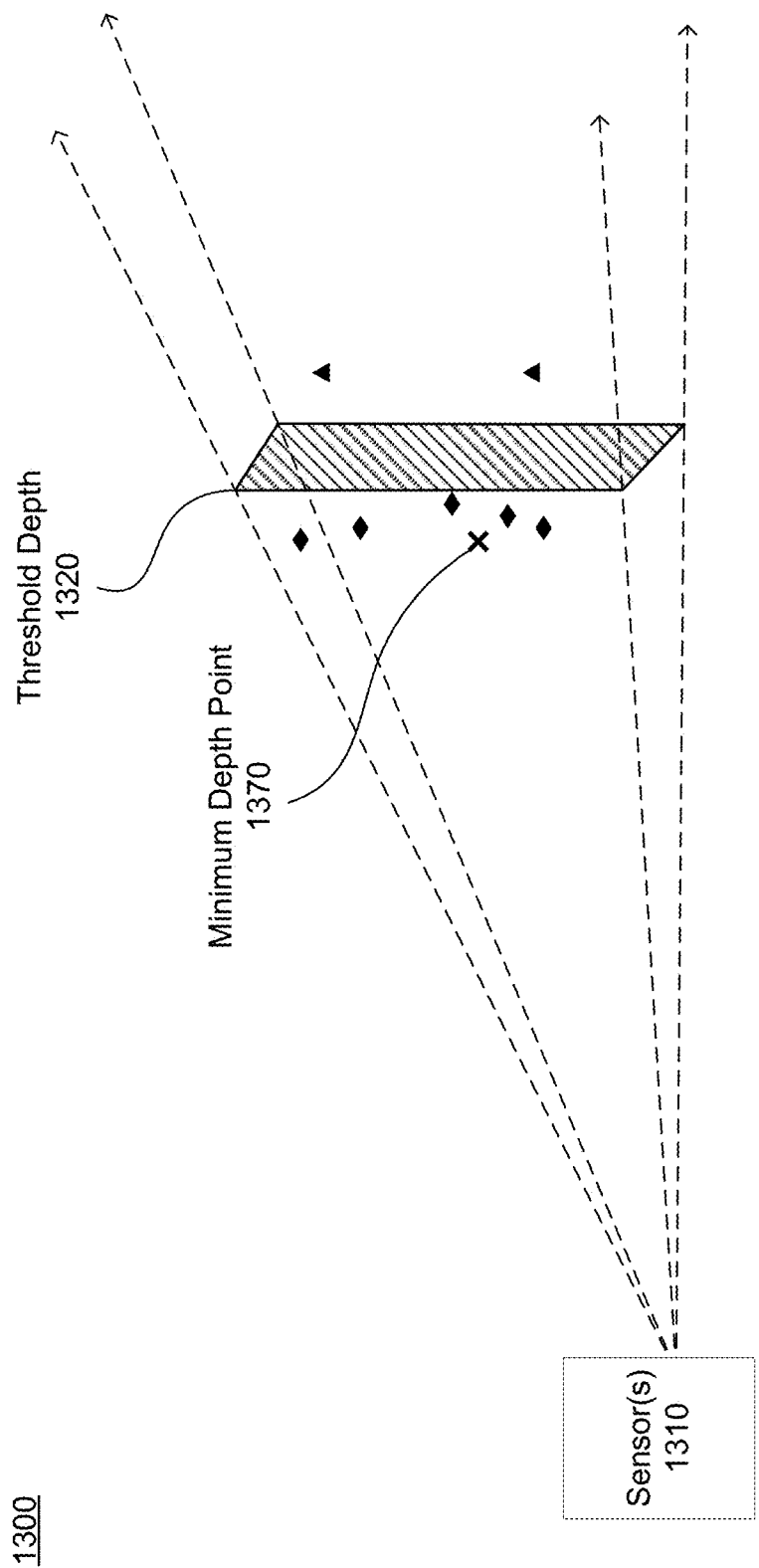
FIG. 13 illustrates a method of identifying a subset of points in a 3D map corresponding to a traffic sign, according to one or more embodiments.

FIG. 13 illustrates a method of identifying a subset of points in a 3D map 1300 corresponding to a traffic sign, according to one or more embodiments. In one or more embodiments, the method of identifying the subset of points follows a filtration of outlier points in the 3D map by the HD map system 110. In this illustration, the points in the 3D map are remaining points after a filtration with a frustum, such as the frustum 1250 in FIG. 12. Of the remaining points, the HD map system 110 determines a minimum depth point 1370 (denoted by an 'X') which is the point closest to a sensor 1310, such as a camera or a LIDAR. The HD map system 110 identifies points within a threshold depth 1320 from the minimum depth point 1370 denoted by rhombuses. Points which lie farther than the threshold depth 1320 from the minimum depth point 1370 are excluded and denoted as triangles. The HD map system 110 selects the points within the threshold depth 1320 as the subset of points corresponding to the traffic sign. In this illustration the threshold depth 1320 is represented as a plane in the 3D map 1300; however, in other embodiments, the threshold depth 1320 may be defined using the radius from the sensor 1310, such as a camera.

Figure 14:
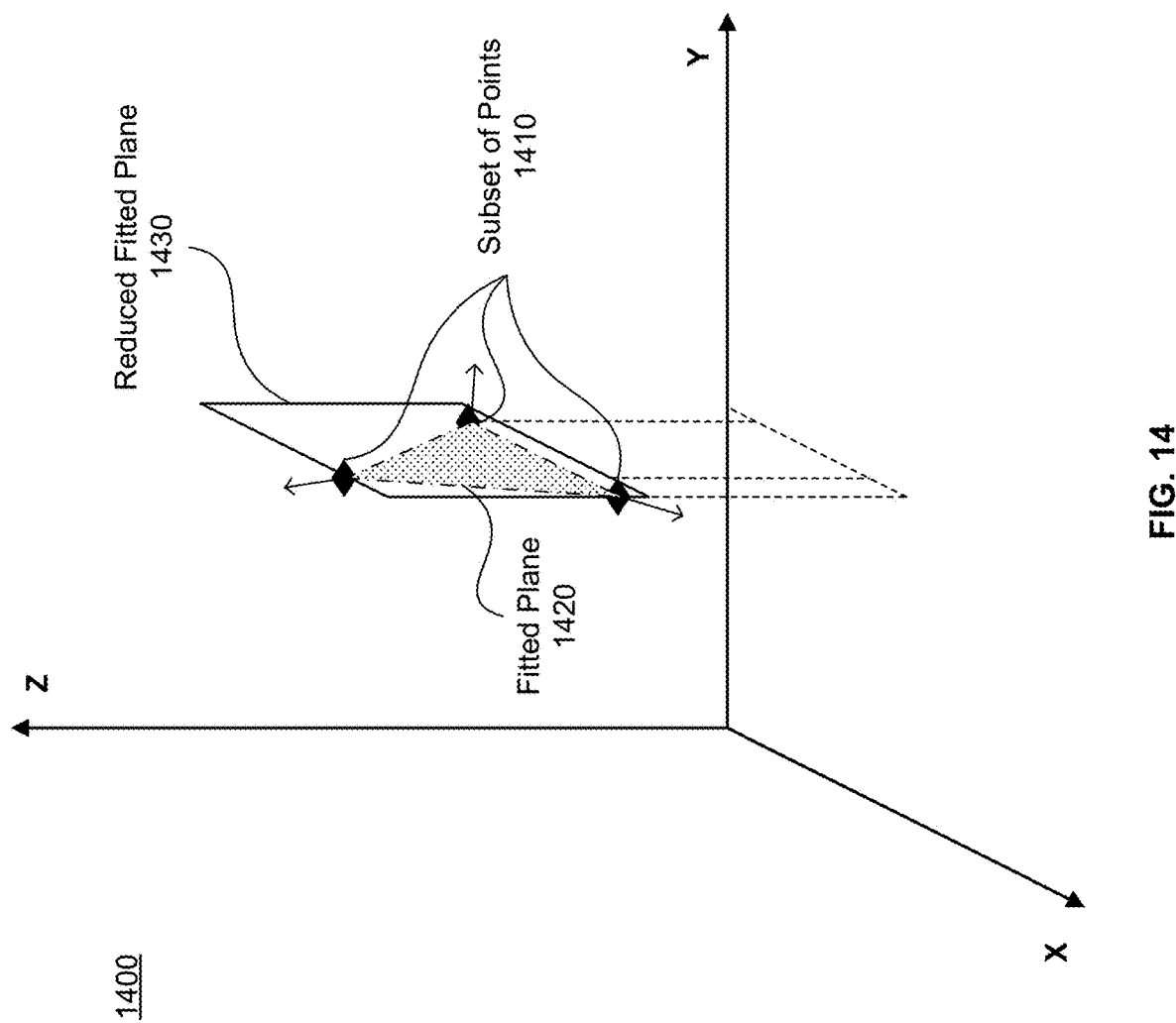
FIG. 14 illustrates a method of determining a reduced fitted plane with a fitted plane determined by a subset of points, according to one or more embodiments.

FIG. 14 illustrates a method of determining a reduced fitted plane 1430 with a fitted plane 1420 determined by a subset of points 1410, according to one or more embodiments. In this illustrative example, the HD map system 110 identified a subset of three points 1410 in a 3D map 1400 corresponding to a traffic sign. In one or more embodiments, the HD map system 110 identified the subset of three points 1410 in the 3D map 1400 utilizing a bounding box and a cone determined by the bounding box, similar to the pyramid 1225 defined by the bounding box 1220 in FIG. 12. The HD map system 110 with the subset of three points 1410 can define the fitted plane 1420 utilizing coordinates of the three points. The HD map system 110 further reduces the fitted plane 1420 into the reduced fitted plane 1430 by determining a portion of the fitted plane 1420 which intersects the cone determined by the bounding box. The reduced fitted plane 1430 can be the basis on which the HD map system 110 projects an image of the traffic sign. In this illustrative example, the subset of three points 1410 exactly defines the fitted plane 1420; however, in various other embodiments, the HD map system 110 utilizes a fitting model to determine a fitted plane. In these such embodiments, the HD map system 110 may implement various mathematical fitting techniques. One such technique (as mentioned above in conjunction with FIG. 9) is RANSAC.

Examples

FIGS. 15-27 show example images representing various stages of processing for sign feature creation for HD maps, according to an embodiment.

Figure 15:
FIGS. 15-27 show example images representing various stages of processing for sign feature creation for HD maps, according to an embodiment.

FIG. 15 shows an image with bounding box drawn around a sign. The sign location service takes the track id, sample id, camera sub sample id, and camera id corresponding to this image and the list of vertices of the bounding box in image coordinates. Track id, sample id, camera sub sample id, camera id are all data tagged with the image from the camera which provide information on the image.

Figure 16:

FIG. 16 illustrates LIDAR points projected on an image. Points are colored by intensity. LIDAR points that reflect off of the sign return with higher intensity, so the system can determine that there are some points that are behind the sign in the LIDAR scan that are projected onto the sign as the black points.

Figure 17:
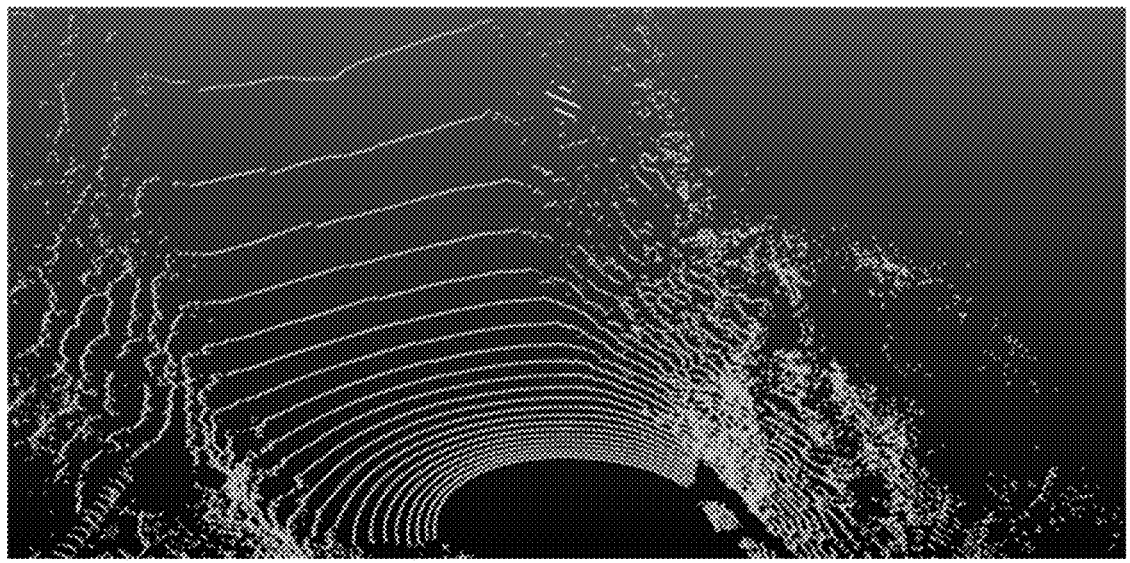

FIG. 17 illustrates LIDAR points filtered by an image bounding box. In this figure, the white colored points are the LIDAR points that were within the image bounding box filtered to the nearest points to the camera to remove far away LIDAR point outliers.

Figure 18:
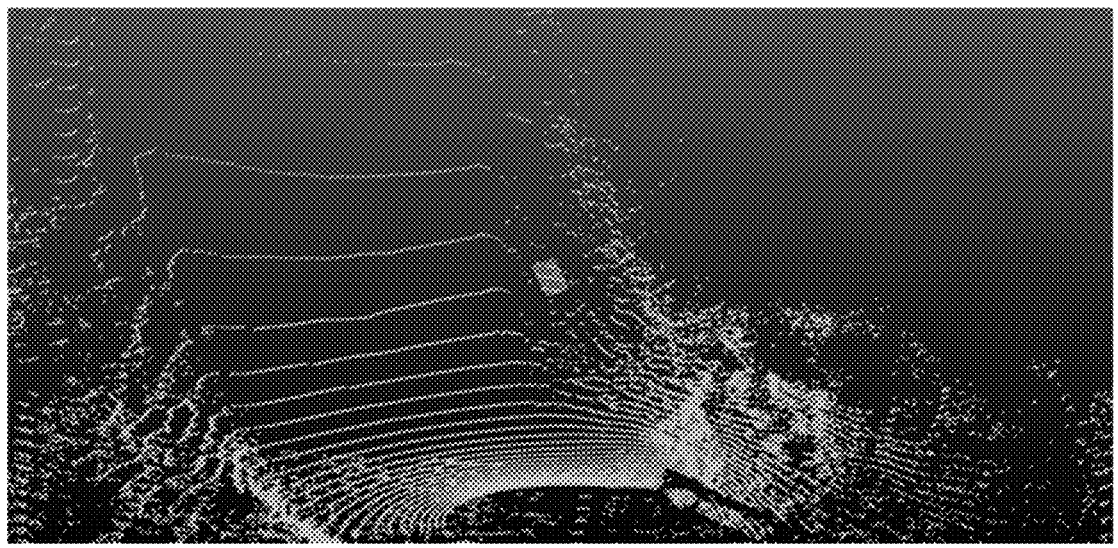

FIG. 18 illustrates a plane in three dimensional space, fitted to filter LIDAR points. In this figure, the diamond shape is the plane fitted to the LIDAR points. This plane extends to infinity but is fitted around the sign points for illustration clarity.

Figure 19:
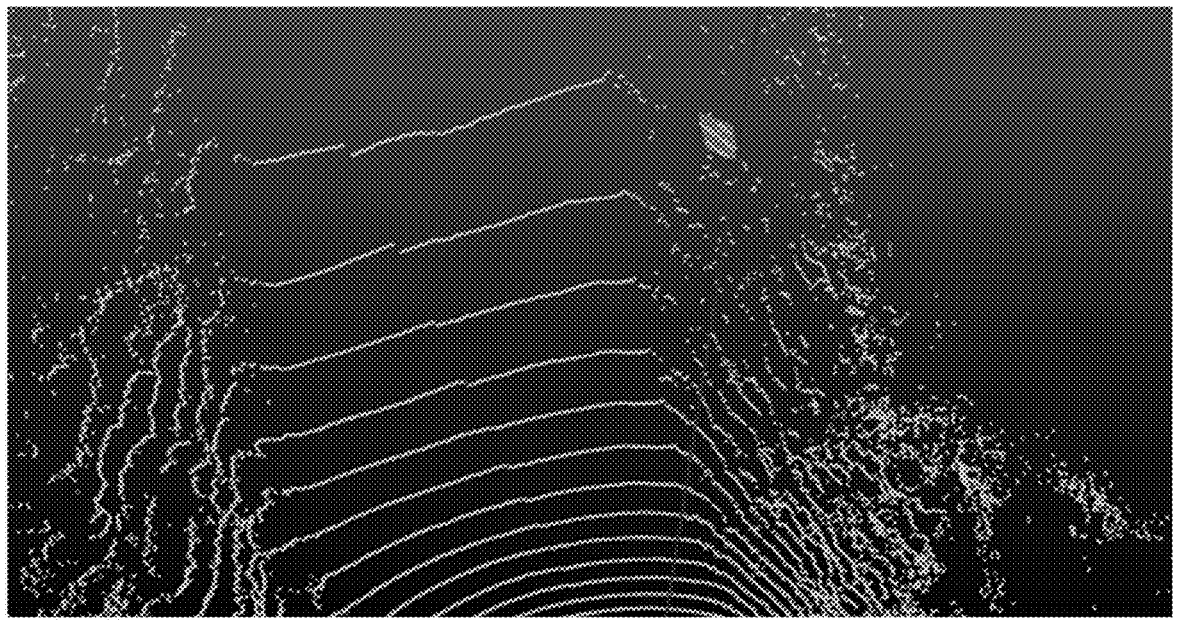

FIG. 19 illustrates intersection of ray with sign plane. To find the location of the image bounding box vertices in 3D the system finds the location in 3D that the ray emitted from the camera, going through the image pixel corresponding to the bounding box vertex intersects the 3D sign plane.

Figure 20:
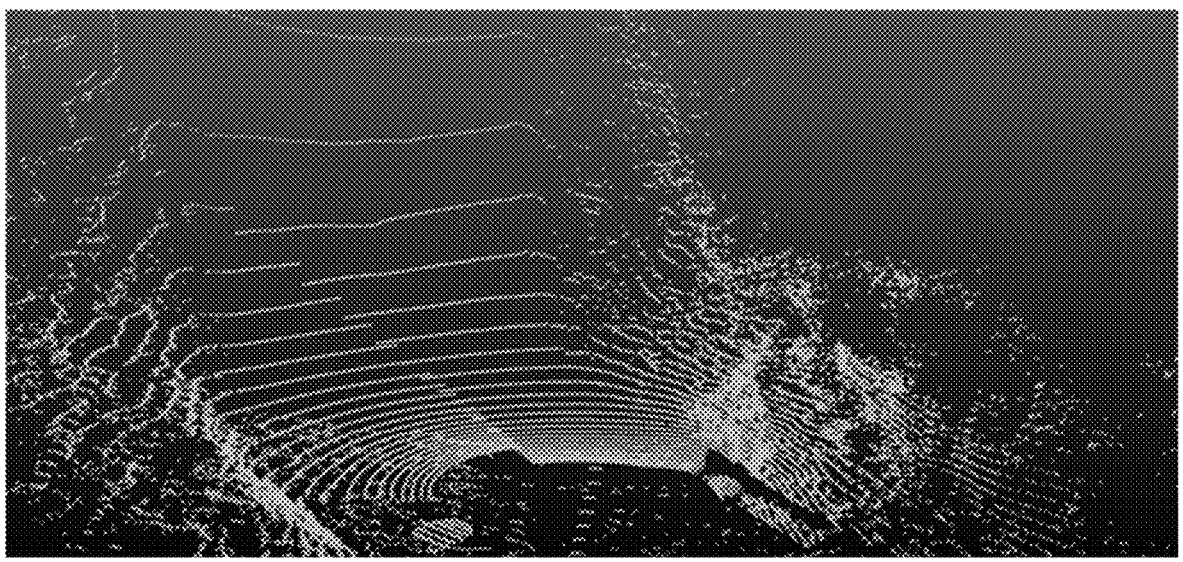

FIG. 20 shows 4 sign vertices in 3D LIDAR coordinates relative to the LIDAR sensor at the time of that the camera captured the image. As shown in this figure, the system connect the 4 vertices so that we can see the shape defined by the points and how well it aligns with the sign in LIDAR coordinates.

Figure 21B:
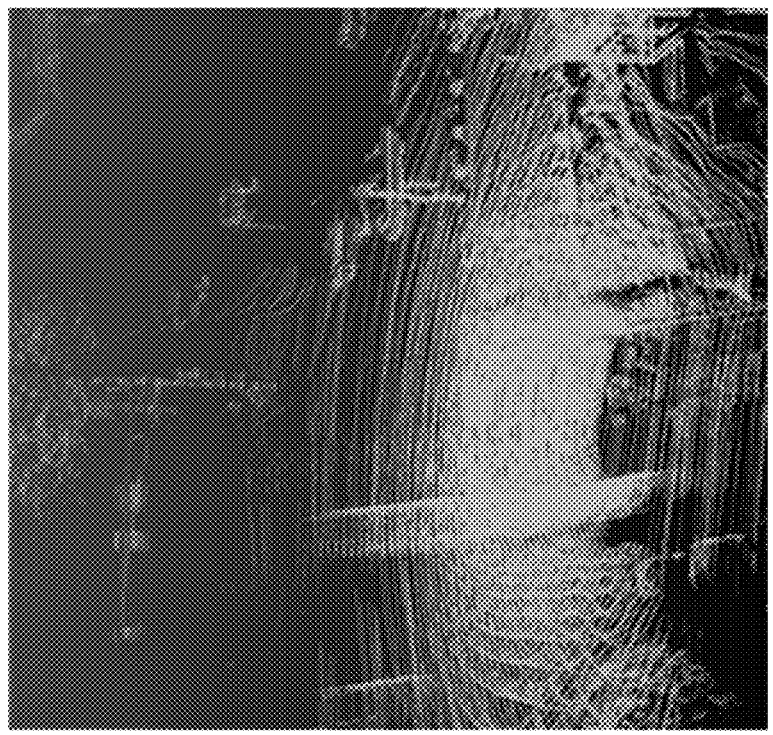
Figure 21A:
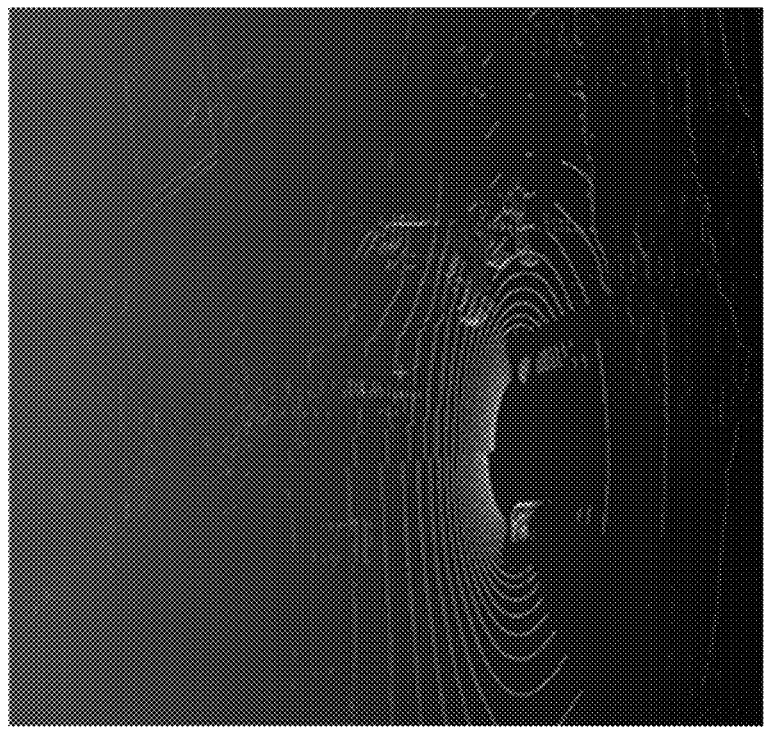

FIGS. 21(A-B) illustrates merged point clouds. These two figures depict the benefit of merging point clouds. FIG. 21(A) is a single scan of an intersection. FIG. 21(B) shows the result of merging the previous 20 LIDAR scans into a single point cloud at the same intersection. As shown in the figures, after the merging of the LIDAR scans into a single point cloud, the image in FIG. 21(B) shows a clear image of the traffic signals in the point cloud data, which only appeared as a single LIDAR scan line in FIG. 21(A) from the single LIDAR scan.

Figure 22C:
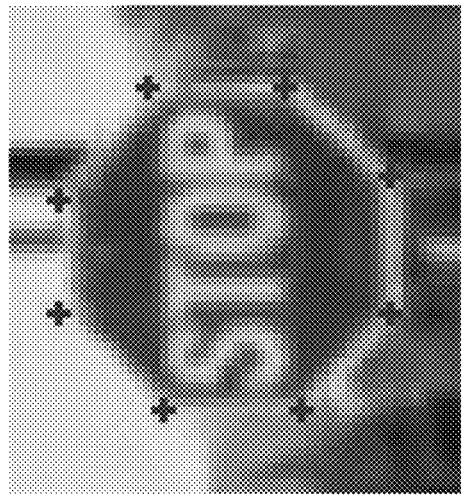
Figure 22B:
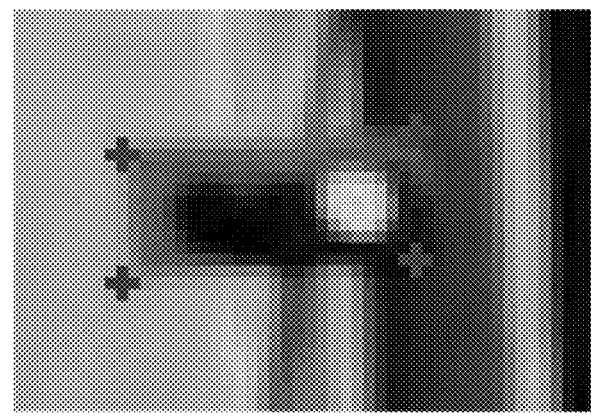
Figure 22A:

FIGS. 22(A-C) show examples of images labelled with input vertices. Each of the pluses denote a vertex of the geometry of the sign. Any number of vertices can be supplied and the geometry for that shape is optimized.

Figure 23:
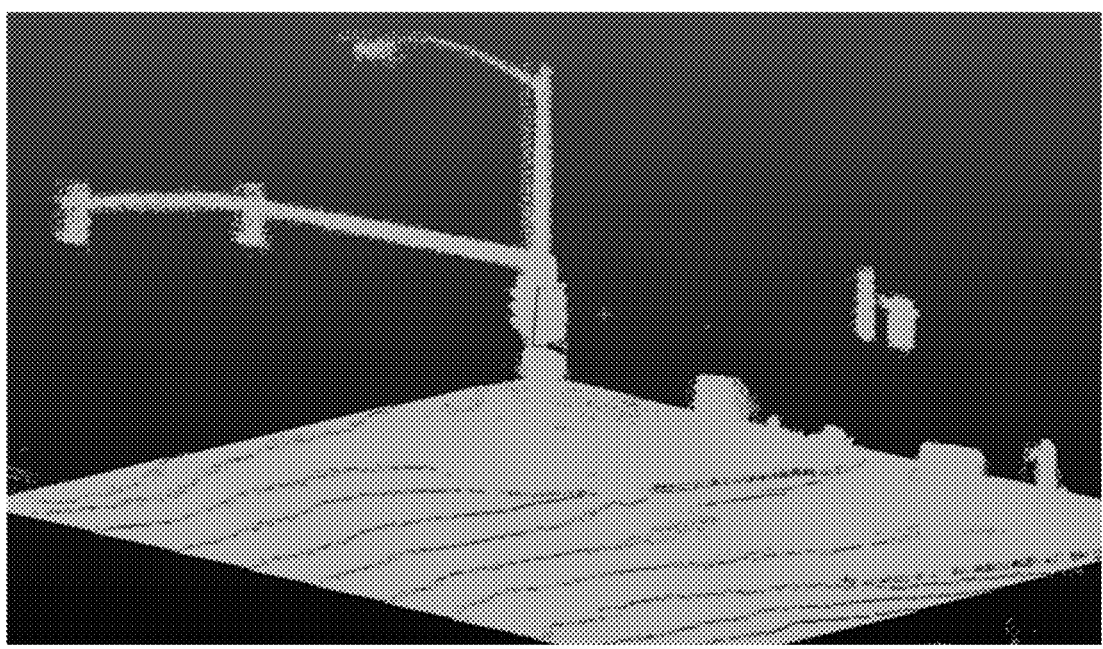

FIG. 23 shows an example of Occupancy Map (OMap) selection. The traffic light outlined in in the figure is the target feature for this OMap subsection. The system selects a 20 meter by 20 meter subsection of the OMap to process based on the estimated location of the feature. The feature although not the center of the OMap, it is well contained within the subsection.

Figure 25:

FIG. 25 illustrates the filtering process for selecting plane points, according to an embodiment.

Figure 24:

FIG. 24 depicts the input vertices used to produce FIG. 25, which is a sign that has tree branches behind it. This figure serves as context for the 3D point cloud representation.

FIGS. 24-25 illustrate the need to properly filter the 3D points that belong to the sign. The first image is the input, which shows a sign that has tree branches behind it. FIG. 25, displays the merged 3D point cloud around the sign. Both the red and green points are points that are within the image projection frustum. The red points are a subset of the points within the frustum, which meet the filtering criteria for sign points. Even with the filtering there is still some noise, which is why the plane fitting needs to be robust to outliers.

Figure 26:
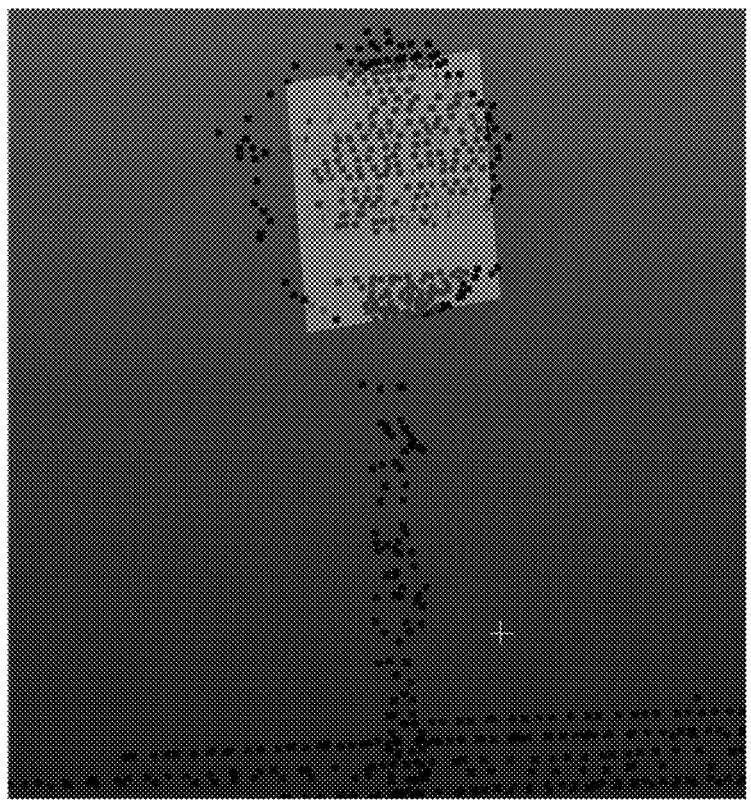

FIG. 26 illustrates plane fitting. Once the system has selected the points that belong to the planar object, the system fits a plane to those points. In the image shown in FIG. 26, the red points within the shape depicting the sign are the points resulting from filtering the 3D points due to the image bounding box and 3D depth. The red points with lower opacity are points behind the plane and the bright red points are in front of the plane. Due to the noise in the points the system selects the best fit to the red points.

Figure 27:
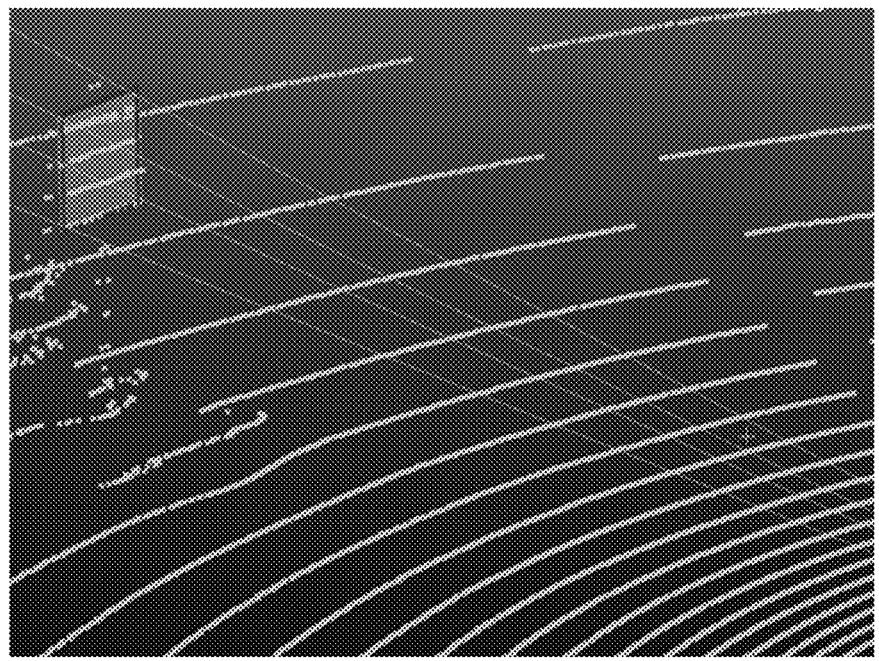

FIG. 27 illustrates image point projection. After the plane is fit, the system uses the labelled image vertices to project onto the 3D plane. The intersection of the camera ray with this plane is the 3D location of the point. In the image above the red bounding box denotes the sign created from the 3D vertices. The lines going from the bottom right to the top left are the imaginary rays from the camera. The semi-opaque white box is the fitted plane. The intersection of the rays and that plane are the 3D vertices of the sign.

Lane Line Module

FIG. 28A shows the system architecture of lane line module 460, according to an embodiment. The lane line module 460 comprises a pixel store 2810, an image pixel classifier 2815, a mapping module 2820, a clustering module 2825, a lane line cluster store 2830, a segment center analysis module 2835, and a lane connection module 2940. Similar to the architecture of the HD map system, other embodiments of the lane line module 460 may include more or fewer modules than those shown in FIG. 28A and functionality indicated as being performed by a particular module may be implemented by other modules. In an embodiment, the lane line module 460 may be a distributed system comprising a plurality of processors.

The pixel store 2810 contains the two-dimensional pixels, referred to as a "2D points", contained in images of lane lines. The image pixel classifier 2815 assigns probabilities to each 2D pixel which describes the likelihood that an individual pixel is in the center of a lane line. The mapping module 2820 traces each 2D pixel above a threshold probability of being in the center of a lane line to a 3D representation, referred to as a "3D voxel". The clustering module 2825 groups neighboring points into lane line clusters which are stored within the lane line cluster store 2830. The segment center analysis module 2835 simplifies stored lane line clusters by removing outlier points from the cluster and draws a center line through the remaining points. Using the center line, the lane connection module 2940 connects multiple lane line segments to create a complete representation of a lane line.

Overview of Lane Line Creation for HD Maps

Figure 28B:
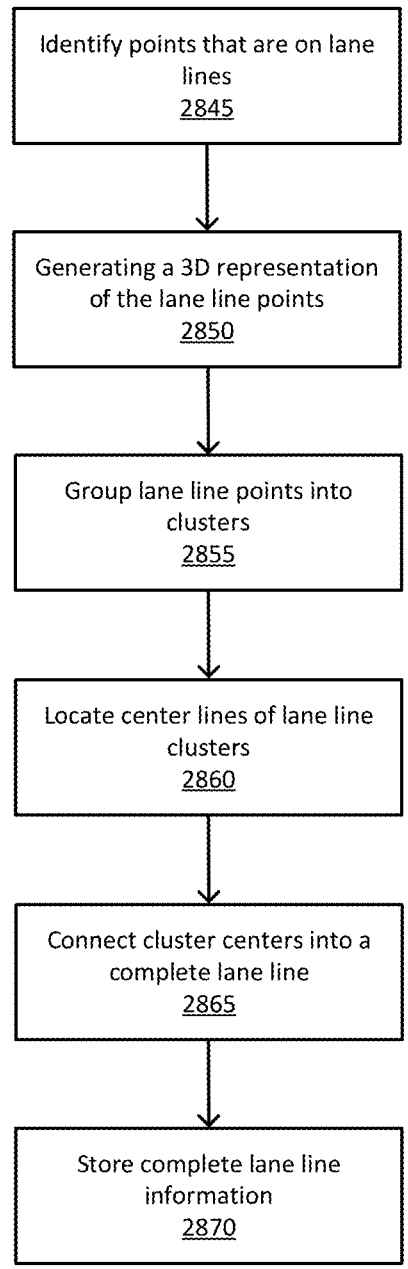
FIG. 28B shows a flow chart describing the lane line creation process, according to an embodiment.
Figure 30:
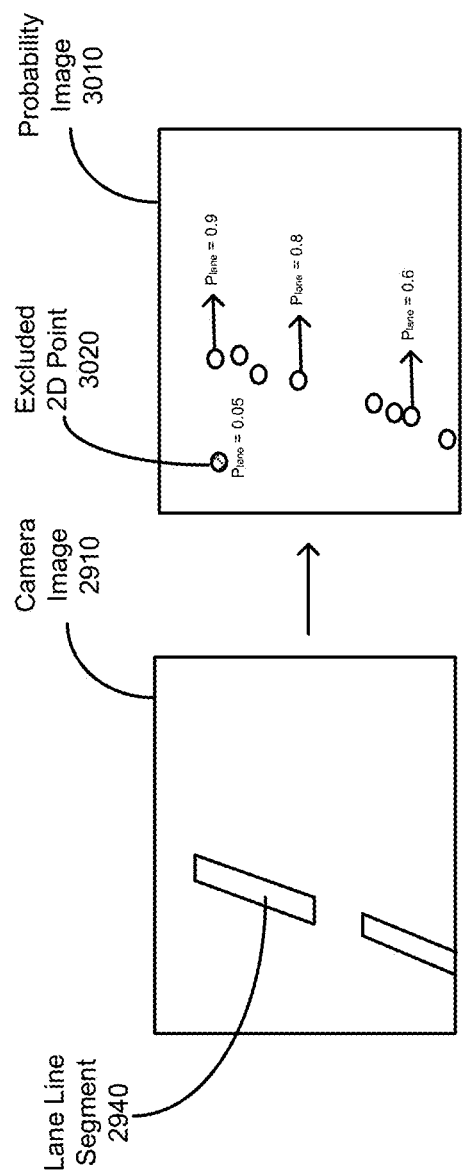
FIG. 30 illustrates a camera image of two lane elements represented as a group of 2D points, according to an embodiment

FIG. 28B illustrates a flow chart describing the lane line creation process, according to an embodiment. From one or more pictures of a lane line, the image pixel classifier 2815 classifies 2D points based on their likelihood of being located along the center of a lane line. In some embodiments, the likelihood that an image pixel falls along the center, or a center line probability, is represented as a numeric probability determined by an image segmentation deep learning model. For example, 2D points with a definite likelihood of being located at the center of a lane line have probabilities of 1 whereas 2D points located off of the lane line have a probabilities of 0. Referring now to FIG. 30, an illustration of a camera image of two lane elements being represented as a group of 2D points 2915 is shown, according to an embodiment. A camera image 2920 may be converted into a probability image 3010 comprising a group of points that center line probabilities of 0.6, 0.8, and 0.9, all of which are greater than the probability of the excluded 2D point 3020 with a center line probability of 0.05.

Continuing from the above example, 2D points located between the center and the edge of the lane line have probabilities between 0 and 1. Based on these classifications, the image pixel classifier 2815 further identifies 2845 points that fall on a lane line. In some embodiments, 2D point 2915 that fall on a lane line are identified by a range of acceptable probability values (e.g., 0.75 to 1.0).

Figure 29:
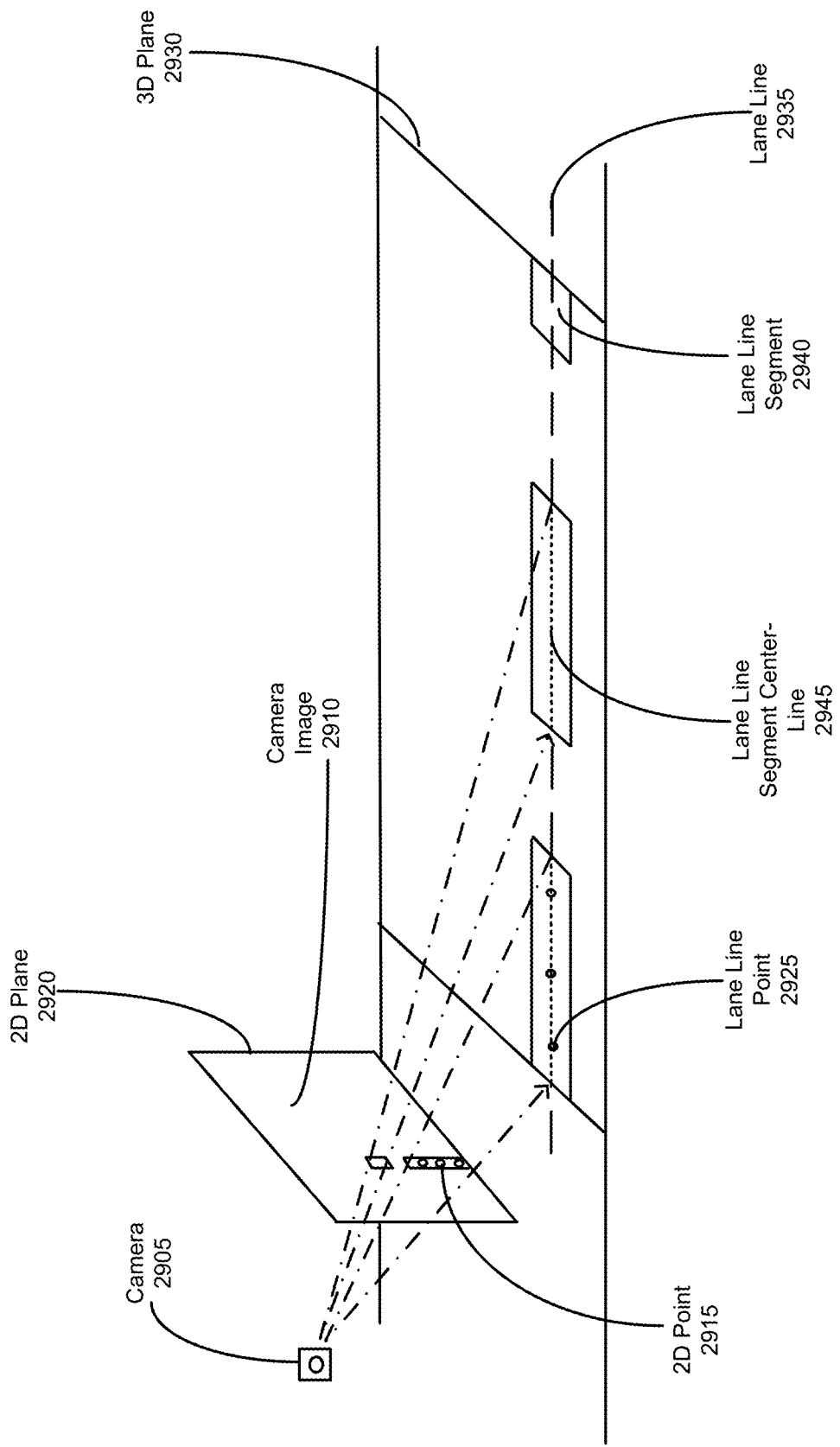
FIG. 29 shows a visual representation of the components used to describe the lane line creation process, according to an embodiment.

Additionally, FIG. 29 shows a visual representation of the various components used to perform the lane line creation process 2800. The camera 2905 captures a camera image 2910 and identifies 2D points 2915 of those images in a 2D plane 2920. The identified 2D points with high enough center line probabilities are mapped to lane line points 2925 of a 3D voxel which exists in a 3D plane 2930. Lane lines 2935 are represented as continuous lines along a vehicle route, but can be broken down into lane line segments 2940. Lane line segments 2940 refer to sub-divisions of a single lane line. In some embodiments, different lane line segments 2940 may be geometrically identical whereas in others they have different dimensions. Each lane line segment is encompassed by and identified by a lane line segment center-line 2945 which includes two or more lane line points 2925 in the 3D plane 2930.

Mapping Between 2D Points and 3D Voxels

Figure 31A:
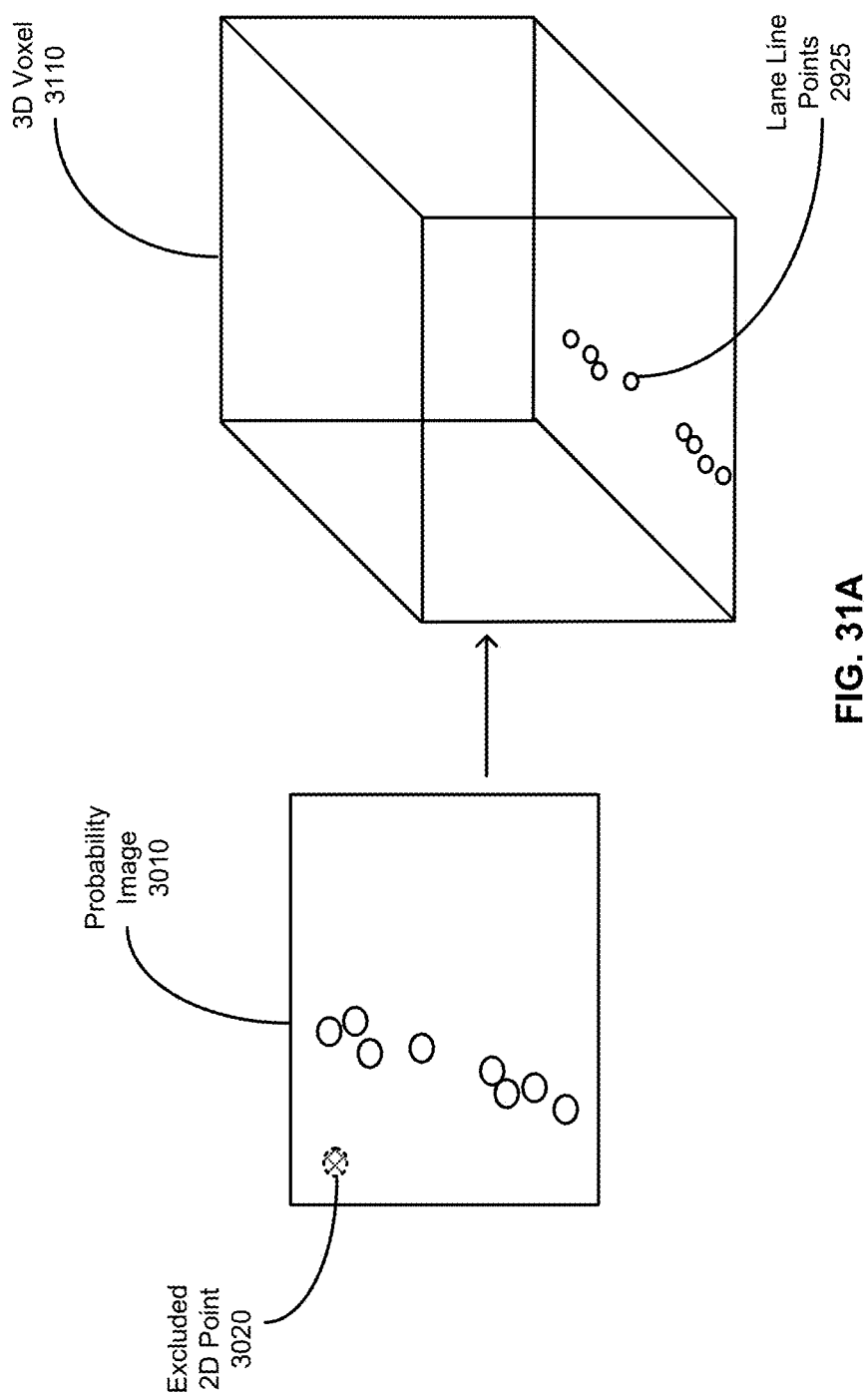
FIG. 31A shows a 3D representation of a probability image converted from a camera image, according to an embodiment.

FIG. 31A shows a 3D voxel representation of the original probability image converted from the camera image, according to an embodiment. While the probability image only represents the lane line and its surrounds in two-dimensions, the 3D voxel 3110 represents the same information in three-dimensions to provide an additional layer of information to the online HD map system 120.

Figure 31B:
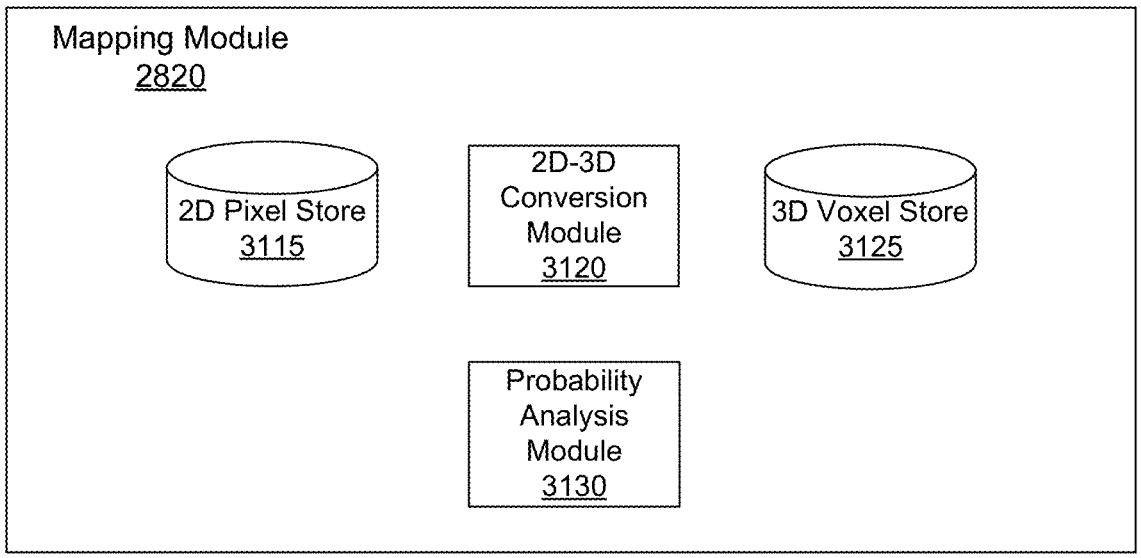
FIG. 31B shows the system architecture of a mapping module, according to an embodiment.

FIG. 31B shows the system architecture for the mapping module, according to an embodiment. The mapping module 2820 maps each 2D point 2915 to a lane line point 2925 in a 3D voxel 3110 to create a three-dimensional representations of the 2D point's surroundings. FIG. 11A shows the system architecture of the mapping module 2820, according to an embodiment. The mapping module 2820 comprises a 2D pixel store 3115, a 2D-3D conversion module 3120, a 3D voxel store 3125, and a probability analysis module 3130. Other embodiments of the mapping module 2820 may include more or fewer embodiments modules than those presented in FIG. 11B and functionality indicated as being performed by a particular module may be implemented by other modules. The 2D pixel store 3115 contains all 2D points 2915 obtained from the converting the camera image 2910, whether identified as a having a center line probability above or below a threshold probability. From the 2D pixel store 3115, 2D points 2915 identified as having a center line probability above the threshold probability are passed through the 2D-3D conversion module 3120 to map the 2D point 2915 to a 3D voxel 3110 All mapped 3D voxels 3110 are stored in the 3D voxel store 3125. The probability analysis module 3130 computes the probability that a given 3D voxel includes the center of a lane line.

Figure 31C:
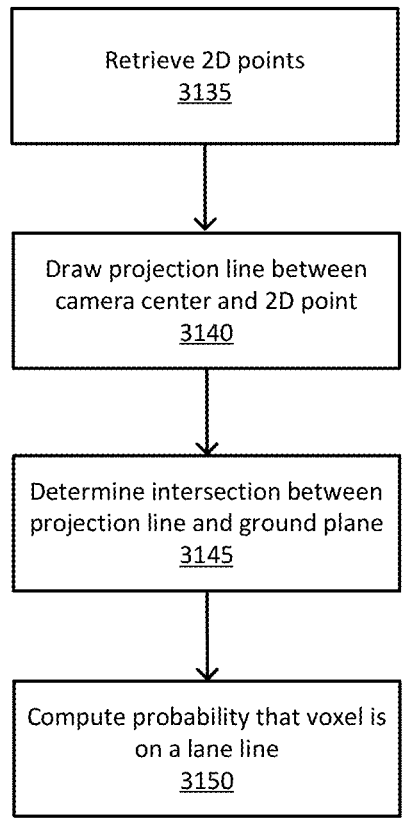
FIG. 31C illustrates a flow chart describing the process for mapping from the two-dimensional plane to the three-dimensional plane, according to an embodiment.

FIG. 31C illustrates a flowchart of the process occurring within the mapping module 2820 for mapping 2D points 2915 to 3D voxels 3110 (e.g., forward mapping), according to an embodiment. The mapping module 2820 retrieves 3135 one or more 2D points 2915 from the set of identified 2D points within the 2D pixel store 3115 with high center line probabilities. Between each of the identified 2D points 2915 and the center of the camera responsible for producing the initial camera image, the 2D-3D conversion module 3120 draws 3140 a projection line and determines 3145 the intersection between the projection line and a ground plane. The ground plane refers to the surface on which the lane line elements can be found. The intersection between the projection line and the ground plane is used to characterize the dimensions and location of the 3D voxel.

In some embodiments, 3D voxels 3110 are mapped in reverse to 2D points 2915 to obtain the lane line probability for each 3D point, i.e., the probability that the 3D point is on a lane line. In this case, the HD map system processes or iterates through 3D points (e.g., from LIDAR), converts them to camera coordinates (finds corresponding 2D mapping), and projects them to image (e.g., backward or reverse mapping). The HD map system uses deep learning techniques to determine a probability map that maps each pixel to the probability that the pixel lies on a lane line. The HD map system uses the probability map to determine the lane line probability for the 3D point corresponding to the pixel.

For each 3D voxel 3110 stored in the 3D voxel store 3125, the mapping module computes 3150 a probability describing the likelihood of a 3D voxel 3110 being found on a lane element. In some embodiments, the same conventions and classification methods described in reference to the image pixel classifier 2815 are also implemented by the mapping module 2820. In other embodiments, the mapping module uses different techniques. Because of distance distortion within camera images, as distance increases label granularity for the image may also decrease, resulting in errors for representing double lane lines. To improve accuracy, the mapping module 2820 may aggregate mappings from 2D points 2915 to 3D voxels by using the center-line probability of a 3D voxel 3110 from a second image that also contains a pixel of interest found in the first image. In an embodiment, grouping a set of identified two-dimensional points into a cluster comprises forming a group of points that are located within a threshold distance of each other, wherein the threshold distance is greater than a lane line width and significantly less than a distance between two lane lines. For example, the HD map system may use a distance slightly bigger than a typical lane line width, such as a distance of 40 cm, but much smaller than distance between 2 lane line segments (which could be a few meters).

Grouping Lane Line Points into Lane Line Point Clusters

Figure 32A:
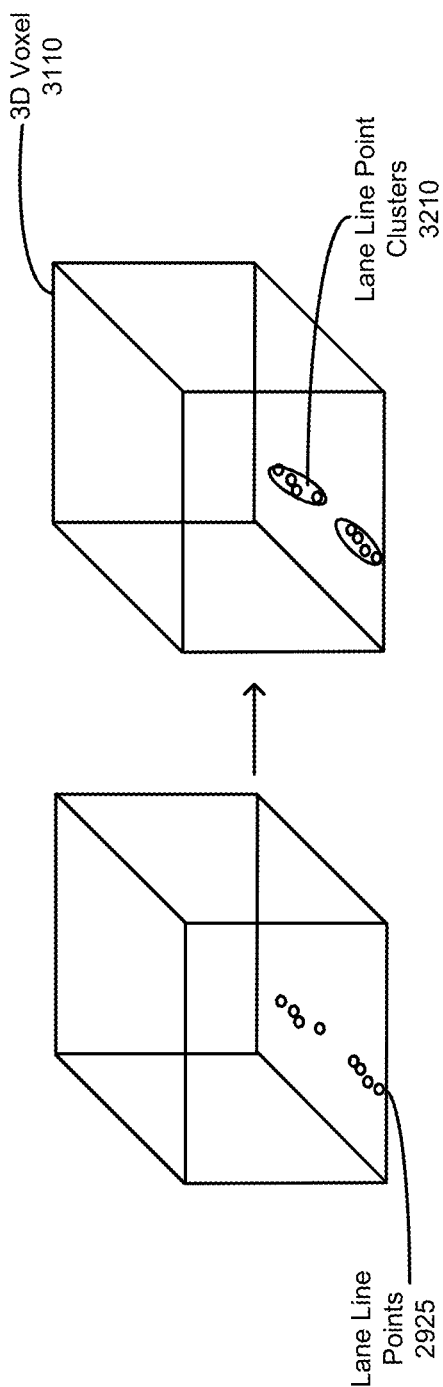
FIG. 32A shows a 3D representation of two lane line point clusters, according to an embodiment.
Figure 32B:
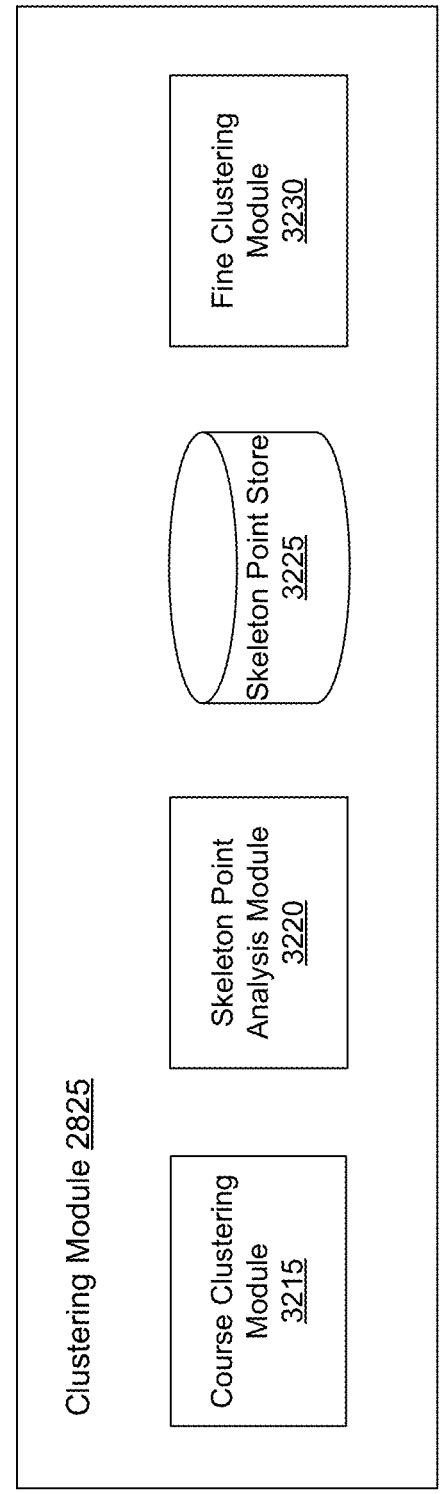
FIG. 32B shows the system architecture of a clustering module, according to an embodiment.

FIG. 32A shows a visual representation of lane line point clusters 3210 and the lane line points 925 within them in a 3D voxel 3110, according to an embodiment. FIG. 12B shows the system architecture for the clustering module 2825, according to an embodiment. The clustering module 2825 groups neighboring lane line points 925 within 3D voxels 3110 together into lane line point clusters 3210 to define segments of a lane line. The clustering module 2825 comprises a course clustering module 3215, a skeleton point analysis module 3220, a skeleton point store 3225, and a fine clustering module 3230. Other embodiments of the clustering module 2825 may include more or fewer modules than those presented in FIG. 12B and functionality indicated as being performed by a particular module may be implemented by other modules. The coarse clustering module 3215 identifies and groups neighboring lane line points 925 into clusters based on a set of established distance parameters. The skeleton point analysis module 3220 further groups lane line points 925 in a cluster into smaller subclusters encompassing the entirety of the cluster and determines a center point for each sub-cluster. The center point within each sub-cluster is also referred to as a skeleton point and is stored by the skeleton point store 3225. Using the identified skeleton points stored within the skeleton point store 3225, the fine clustering module 3230 distinguishes between intersecting lane lines 2935 moving in different directions. Further details regarding the course clustering module 3215, the skeleton point analysis module 3220, and the fine clustering module 3230 are discussed below in reference to FIG. 32D-F.

Figure 32C:
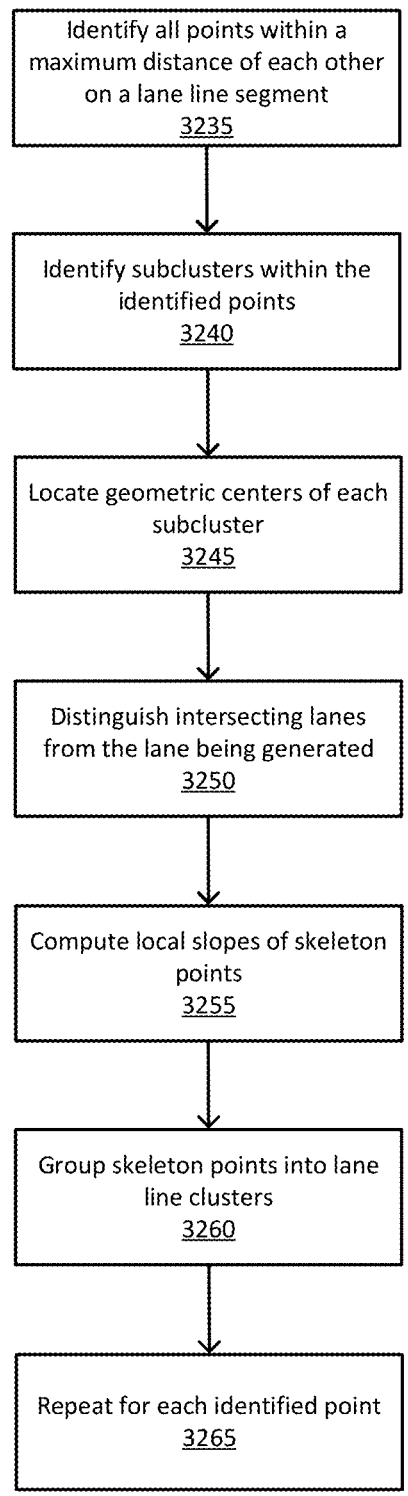
FIG. 32C illustrates a flow chart describing the process for grouping two dimensional points into clusters, according to an embodiment.

FIG. 32C illustrates a flowchart of the process for grouping lane line points 925 into clusters. The course clustering module 3215 identifies 3235 all lane line points 925 neighboring each other. In some embodiments, neighboring points are within a maximum distance of each other. For example, five lane line points 925 may be arranged in a line in increasing order. When grouping neighboring points into clusters, a lane line cluster 3210 originating at the first point may include the second, third, and fourth point, but not the fifth point because it is a distance from the first point greater than a threshold distance. Alternatively, lane line point cluster 3210 originating from the second point, may include the first, third, fourth, and fifth point because for each point the separating distance is below a threshold distance.

Figure 32D:
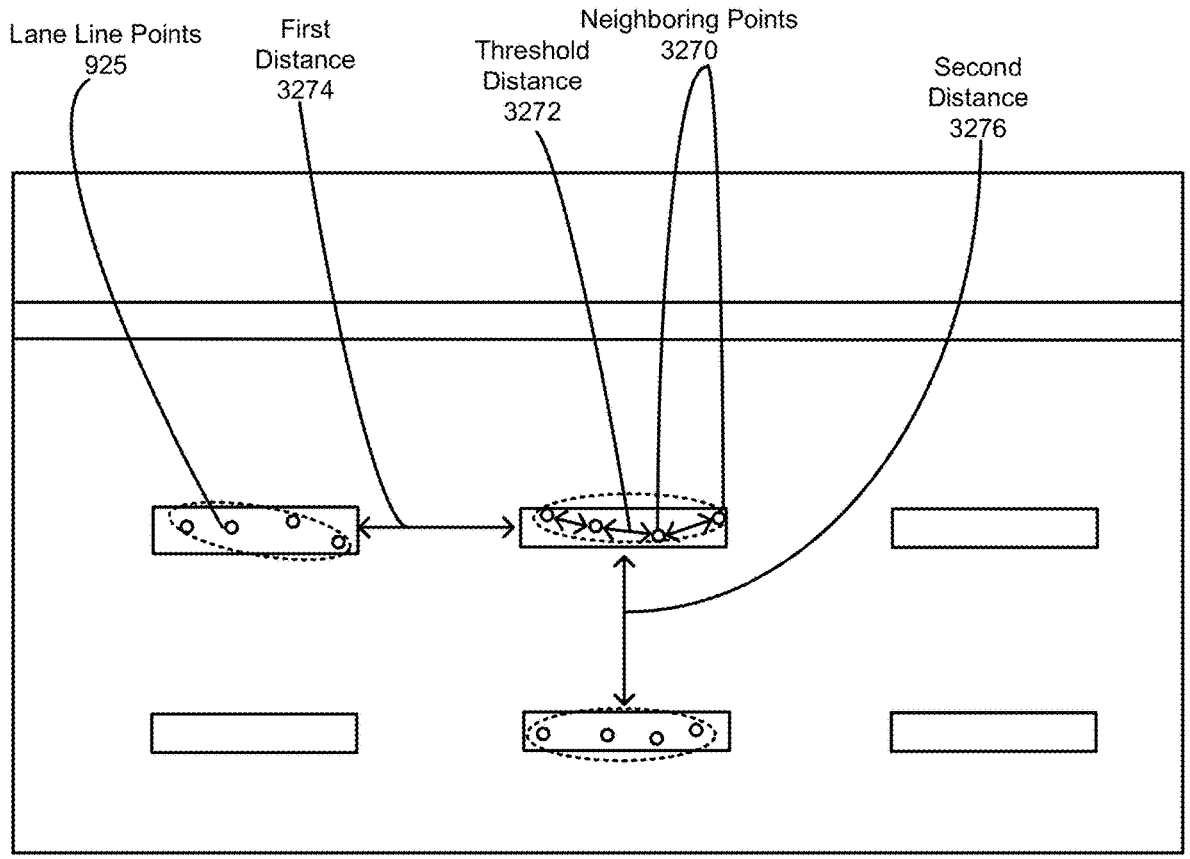
FIG. 32D-32F show different steps of the process for grouping two dimensional points into clusters, according to an embodiment.

Referring now to FIG. 32D, a scenario of grouping lane line points 925 into lane line point clusters 3210 is described, according to an embodiment. Neighboring points 3270 are defined as points with a threshold distance 3272 of each other. In some embodiments, the threshold distance is defined as a distance that is: 1) smaller than a first distance 3274 between the lane line segment containing the lane line points 925 and a following or preceding lane line segment within the same lane line and 2) smaller than a second distance 3276 between the lane line containing the lane line points 925 and a second lane line running parallel or intersecting with the first lane line. In other embodiments, the threshold distance 3272 is defined as numerical maximum distance between two lane line points in a lane line (i.e. 5 cm). For example, the clustering process described above is performed using an algorithm that receives an input point and outputs all points within a distance of the input point. More specifically, the input point may be picked at random and used to locate a first neighboring point 3270 with the most optimal combination of additional neighboring points. The first neighboring point 3270 is then used as an updated input point. From the updated input point, all neighboring points are identified.

Figure 32E:
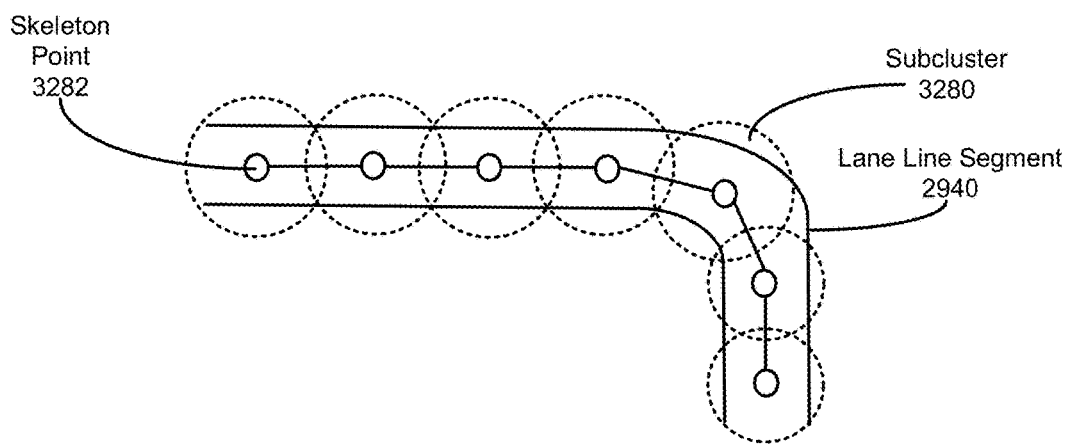

Returning now to FIG. 32C, the skeleton point analysis module 3220 identifies 3240 subclusters from the identified neighboring points. As lane line points 925 are grouped into subclusters, they are removed from the general cluster. The process described above is repeated until all lane line points 925 within a lane line point cluster 3210 have been included in a subcluster. Within each subcluster, the skeleton point analysis module locates 3245 a geometric center, or a skeleton point. In some embodiments, skeleton points are determined based on the weighted center-line probabilities of each lane line point 925 within the subcluster and stored within the skeleton point store 3225. FIG. 32E shows a visual representation of a lane line segment 2940 divided into several subclusters 3280 and their respective skeleton points 3282, according to an embodiment. In one embodiment, subclusters 3280 may be have a circular shape while in others they may be elliptically shaped or a polygon.

Figure 32F:
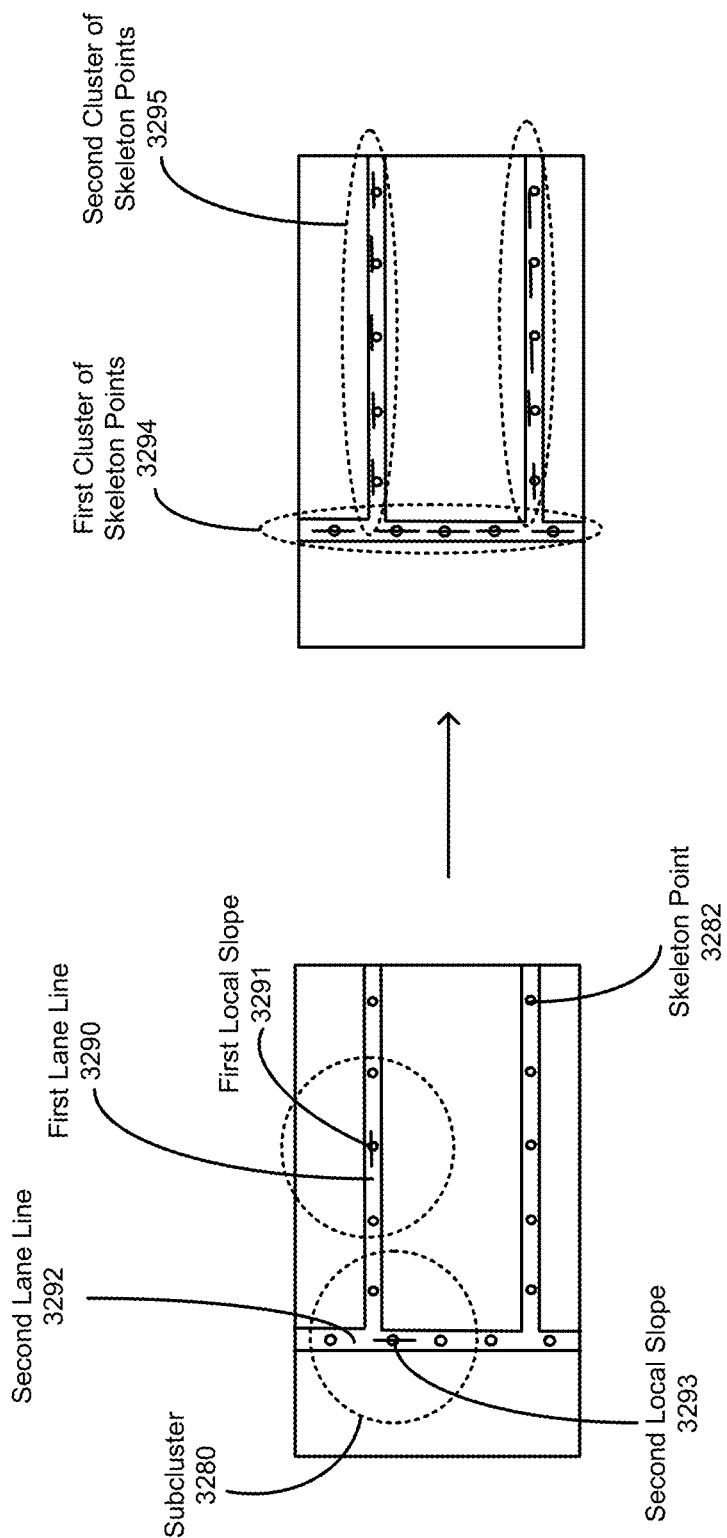

Returning now to FIG. 32C, within each subcluster 3280, the fine clustering module distinguishes 3230 intersecting lane lines from the lane line in the process of being created. For each skeleton point 3282 within a lane line point cluster 3210, the fine clustering module 3230 computes 3250 a local slope using the lane line points 923 within each subcluster 3280. The fine clustering module 3230 groups 3260 skeleton points sharing local slopes within a range of each other and within a maximum distance apart together by the fine clustering to indicate that they are within the same lane line. FIG. 32F shows a visual representation of a first lane line 3290 with a first local slope 3291 intersecting a second lane line 3292 with a second local slope 3293. Because their respective local slopes are outside a range of acceptable similarity, the first lane line 3290 and second lane line 3291 are identified as independent of each other and are grouped into a first cluster of skeleton points 3294 and a second cluster of skeleton points 3295. In some embodiments, the range of acceptable similarity is defined generally by the user whereas in other embodiments the range is defined specific to the set of lane line points under consideration. The above process is repeated 3265 for each skeleton point in a lane line segment 2940.

Locating Centers on Lane Line Point Clusters

Figure 33A:
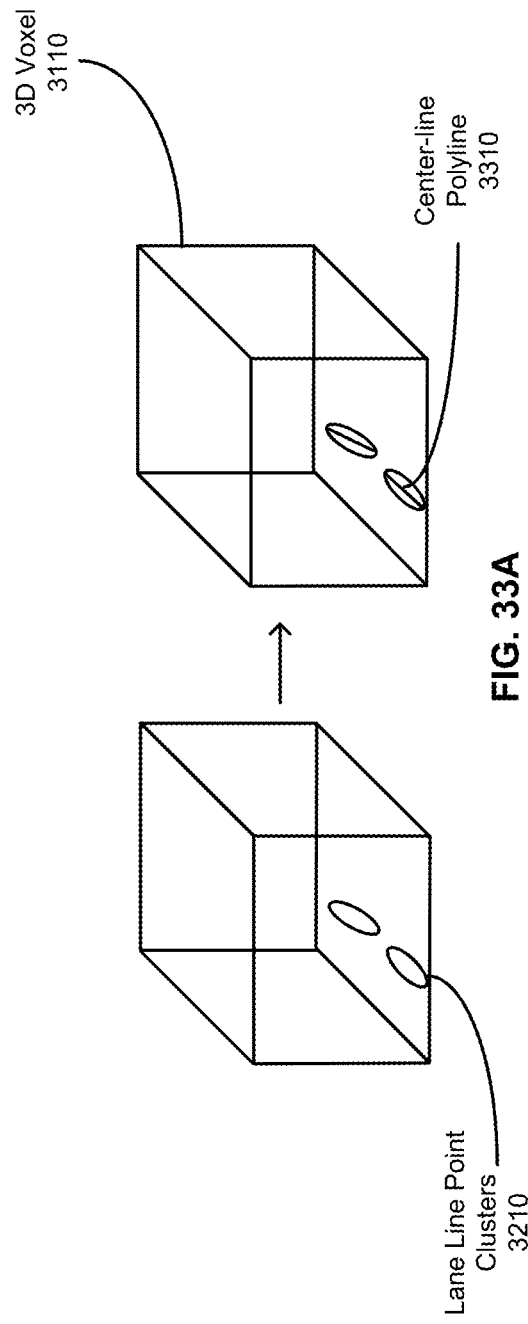
FIG. 33A shows a 3D representation of two center-line polylines within two lane line clusters, according to an embodiment.

FIG. 33A shows a representation of a center-line polyline 3310 through a lane line point cluster 3210 in a 3D voxel 3110, according to one embodiment.

Figure 33B:
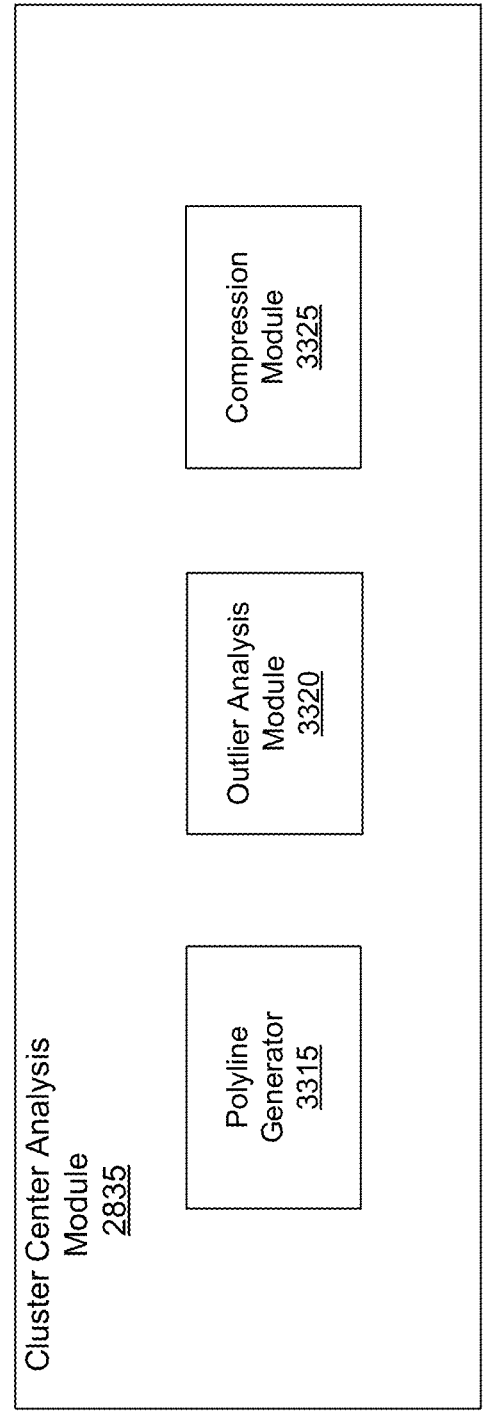
FIG. 33B shows the system architecture of a cluster center analysis module, according to an embodiment.

FIG. 33B shows the system architecture for the cluster center analysis module 2835, according to an embodiment. The cluster center analysis module 2835 locates center lines for each lane line segment 2940 by connecting skeleton points 3282 within each segment. The cluster center analysis module 2835 comprises a polyline generator 3315, an outlier analysis module 3320, and a compression module 3325. Other embodiments of the cluster center analysis module 2835 may include more or fewer modules than those presented in FIG. 33B and functionality indicated as being performed by a particular module may be implemented by other modules. The polyline generator 3315 organizes skeleton points 3282 within a lane line segment 2940 and creates a polyline through the ordered points. The outlier analysis module 3320 identifies and analyzes outliers to determine if they represent a change in the direction of the lane line segment or merely a deviation from the polyline in the same direction. The compression module 3325 identifies and removes redundant skeleton points 3282 to condense the polyline to the fewest number of points while still conveying the correct shape of the lane line segment. Further details regarding the polyline generator 3315, the outlier analysis module 3320, and the compression module 3325 are discussed below in reference to FIG. 33C-E.

Figure 33C:
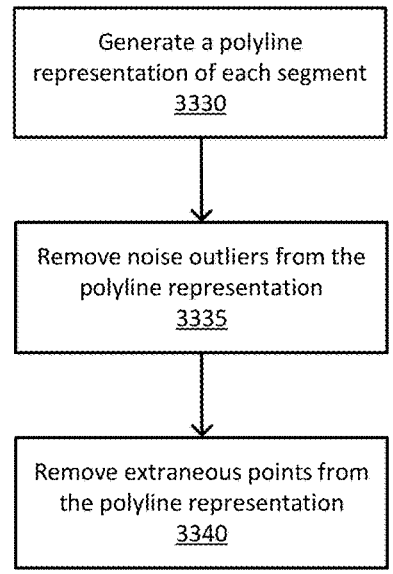
FIG. 33C illustrates a flow chart describing the process for the analyzing the lane line centers, according to an embodiment.
Figure 33D:
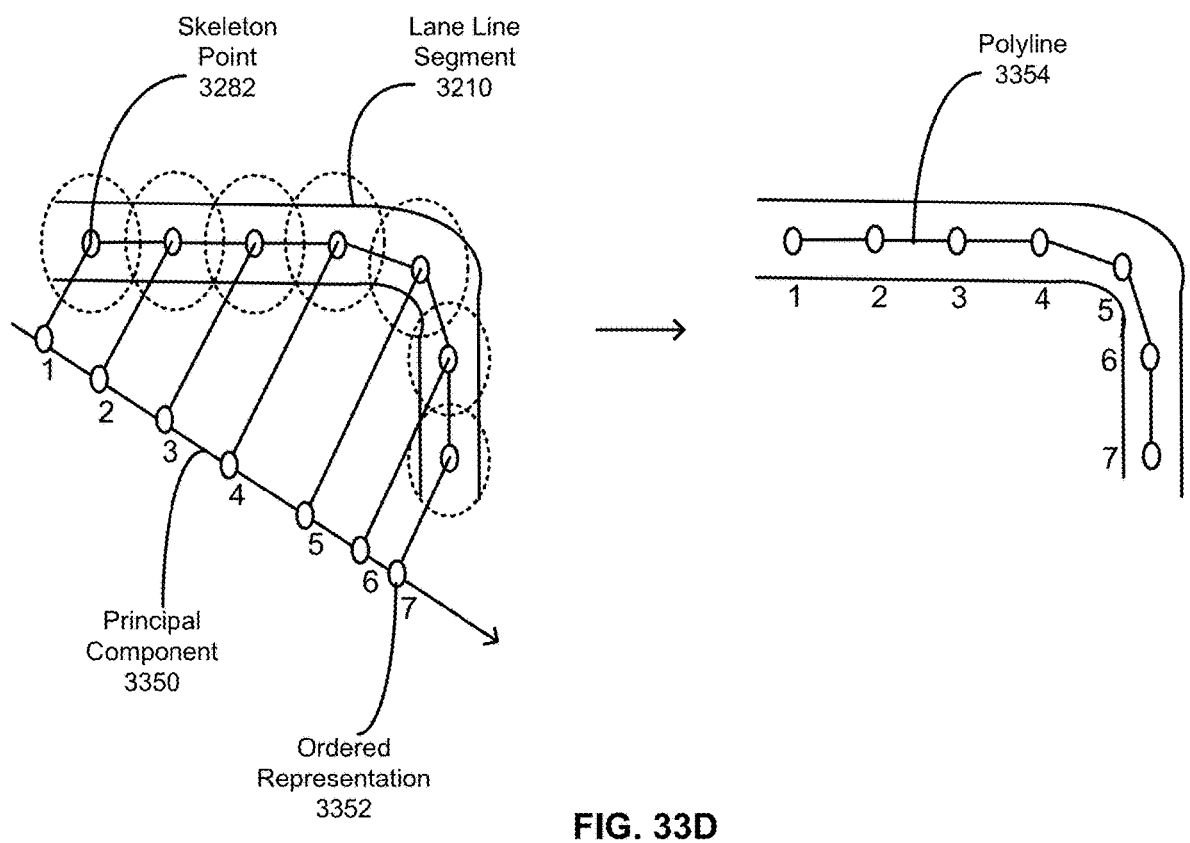

FIG. 33C illustrates a flowchart of the process for locating the center line of a lane line segment 2940, according to an embodiment. The polyline generator 3315 generates 3330 a polyline representation of each lane line segment. When generating the polyline, the polyline generator 3315 may consider the geometry of the lane line segment. In one embodiment, the lane line segments is long and winding and the polyline is generated based on skeleton points 3282 within the lane line segment. Under the assumption that the lane line being considered is relatively straight and doesn't follow a circular path, the polyline generator may reorganize the skeleton points into a consecutive order using a principal component of the points as illustrated in FIG. 33D. A principal component 3350 on which the skeleton points 3282 are projected is determined and the skeleton points 3282 are ordered through the projection. The ordering of the projection 3352 is mapped to the initial position of the lane line points on the lane line segment to determine the ordered position of the lane line points on the lane line segment. The polyline 3354 is generated by consecutively connecting the skeleton points 3282.

In another embodiment, the lane line segment is short and straight and uses a technique for fitting a geometric line through the lane line points 925 in a lane line point cluster 3210, as described in FIG. 33E. Once the geometric fit line 3356 has been determined for a lane line point cluster 3210, the geometric fit line 3356 can be shortened to run between a first endpoint 3358 and a second endpoint 3360 of the cluster. In some embodiments, there are not two clearly defined endpoints and instead two points with the greatest distance between them are used to contain the geometric fit line 3356.

Returning now to FIG. 33C, in some embodiments, the generated polyline 3354 may be non-linear due to an off-set between one or more points and the majority of remaining points on which the polyline 3354 is based. In these embodiments, off-set points, or outliers, are analyzed to determine whether they are noise points that do not affect the direction of the polyline 3354 or inflection points that indicate a change in the direction of the polyline 3354. Points identified as inflection points indicate that the polyline 3354 is changing direction or deviating from a current direction by a significant amount. Conditions qualifying as a significant amount of change may be set manually or based on consideration of the specific lane line points 925 in the lane line segment 2940. FIG. 13F illustrates one example polyline with a noise outlier point 1370 and another example polyline with an inflection point outlier 1375, according to an embodiment.

Once one or more noise outliers 1370 have been identified, the outlier analysis module 3320 removes 3335 the noise outliers from the polyline 3354, i.e., performs denoise operation on the polyling. Low pass filtering of the polyline coordinates may be used to remove noise outliers 1370. In another embodiment, beginning at a first point a fit line is generated by iterating through neighboring points within a lane line points 925 from one end of a segment to another. For example, the fit line includes the first point, 5 points ahead of the first point, and 5 points behind the first point for an 11 point fit line. Assume the current point is p*, previous denoised point is p', next point in polyline is p". The system checks if the first angle between p*p'-L (theta0) or the second angle p*p"-L (theta1) is bigger than a threshold value, for example, max_theta_degrees (typical value is 15 degrees). If so, the system marks the current point as noise and discards it, otherwise the system marks the current point as good point and adds to denoised polyline 3354. Once all necessary noise outliers have been analyzed and removed from the polyline, the polyline of remaining lane line points is referred to as a de-noised polyline.

Figure 33G:
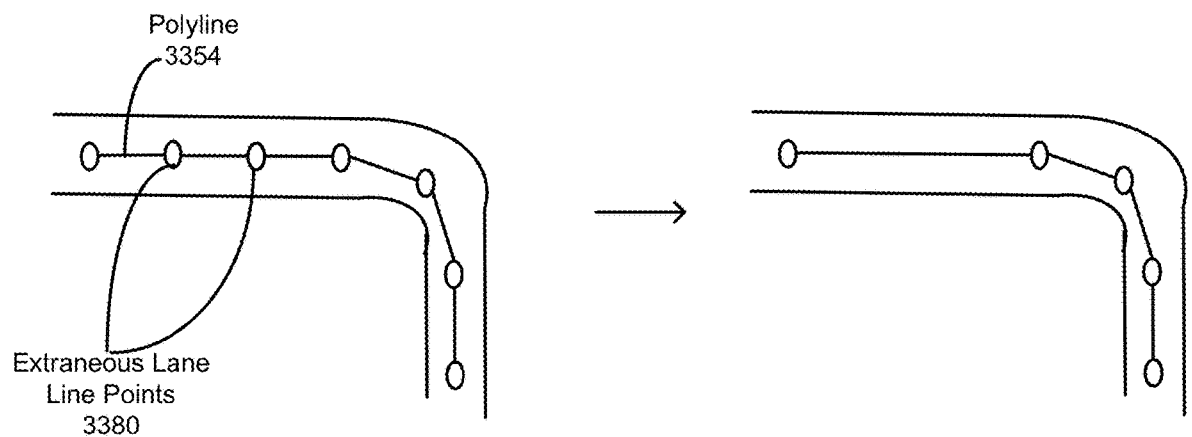
Figure 33H:
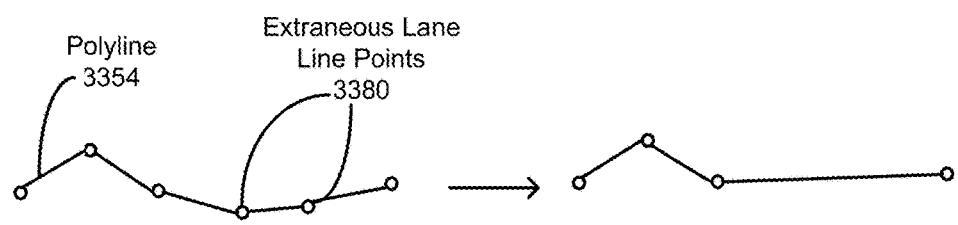

In order to reduce the memory required to store lane line segments, the compression module 3325 may remove 3340 extraneous lane line points from the polyline 3354. In one embodiment, extraneous lane line points may fall on the polyline 3354 in parallel with a preceding point, as described in FIG. 33G which shows an example with multiple removed extraneous lane line points 3380 with no deviation from the direction of the preceding lane line points. FIG. 13H illustrates an additional embodiment, in which extraneous lane line points 3380 deviate less than a minimum threshold distance from the polyline 3354. The threshold parameters may be determined manually or based on the characteristics of the polyline 3354. In the aforementioned embodiment, extraneous points 3380 must be analyzed to confirm that they are not inflection points. For example, all lane line points 2925 on the polyline between the endpoints are analyzed to identify any points greater than a threshold distance from the polyline. If no lane line points are identified, all points between the endpoints are removed from the polyline consists of only the endpoints. Alternatively, if a lane line point 2925 is identified with a distance from the polyline 3354 above a threshold distance, the polyline 3354 is shortened by adjusting one endpoint closer to the identified lane line point. Adjusting the endpoints of the polyline 3354 may be performed by identifying a first midpoint of the entire polyline and identifying any lane line points 2925 between the first midpoint and the first endpoint of the polyline that are a distance greater than the threshold distance from the polyline. If no lane line point is identified, the first midpoint is set as a new endpoint and the above process is performed for a second midpoint that lies between the first midpoint and the second endpoint. If a lane line point 2925 is identified, each lane line point 2925 between the first midpoint and the first endpoint is analyzed. Once the lane line point 2925 has been identified, it is set as a new endpoint for the polyline 3354. The processes described above are performed iteratively until the polyline endpoint and the identified lane line point 2925 overlap at the same point.

Connecting Lane Line Segments into Lane Lines

Figure 34A:
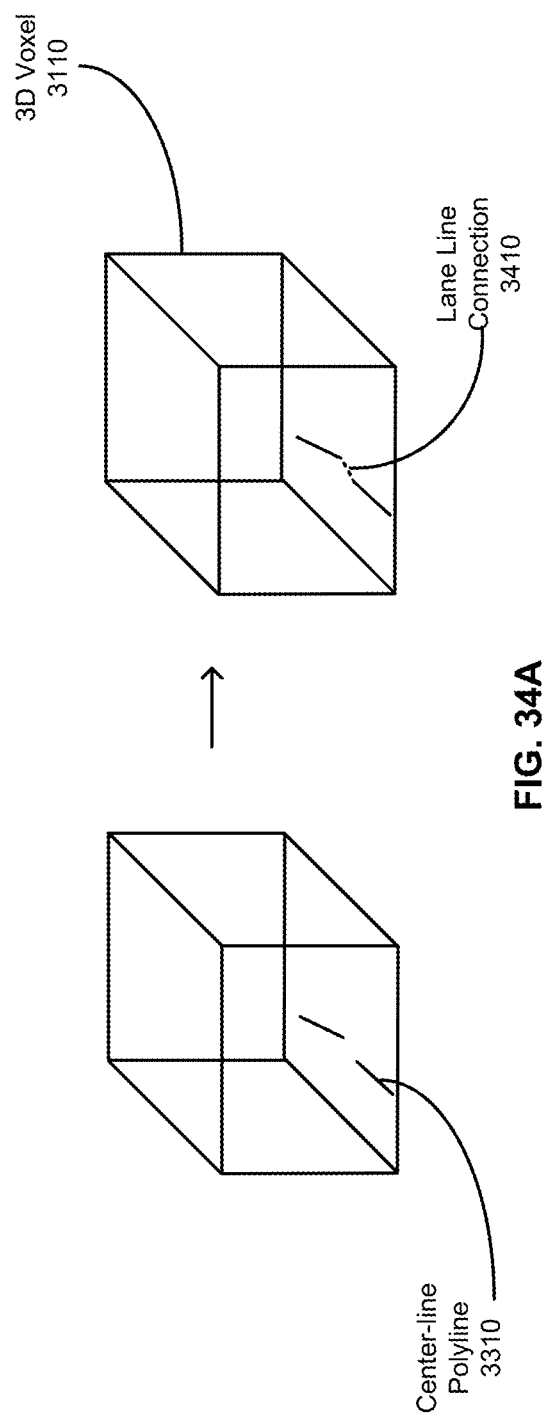
FIG. 34A shows a 3D representation of a lane line connection between two lane line segments, according to an embodiment.

FIG. 34A shows a representation of a complete lane line 2935 created by connecting center-line polylines 3310 in a 3D voxel 3110, according to an embodiment.

Figure 34B:
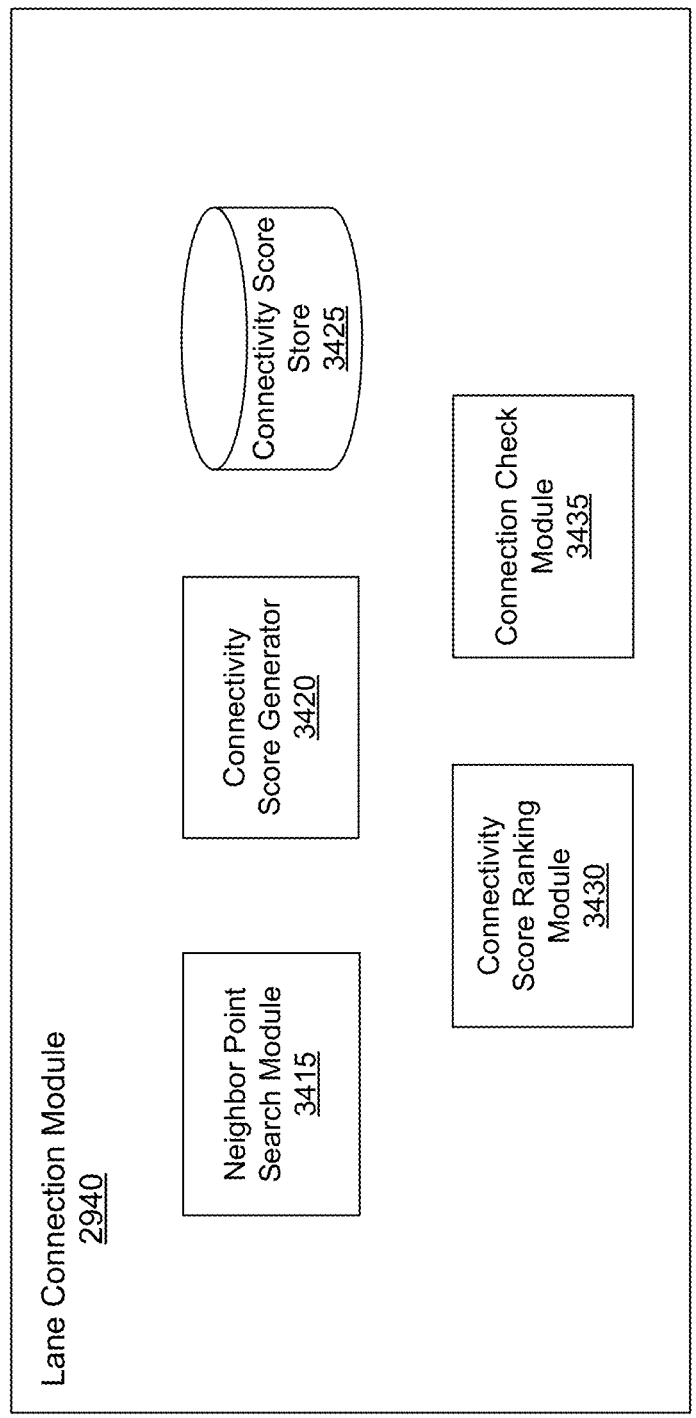
FIG. 34B shows the system architecture of a lane connection module, according to an embodiment.
Figure 34C:
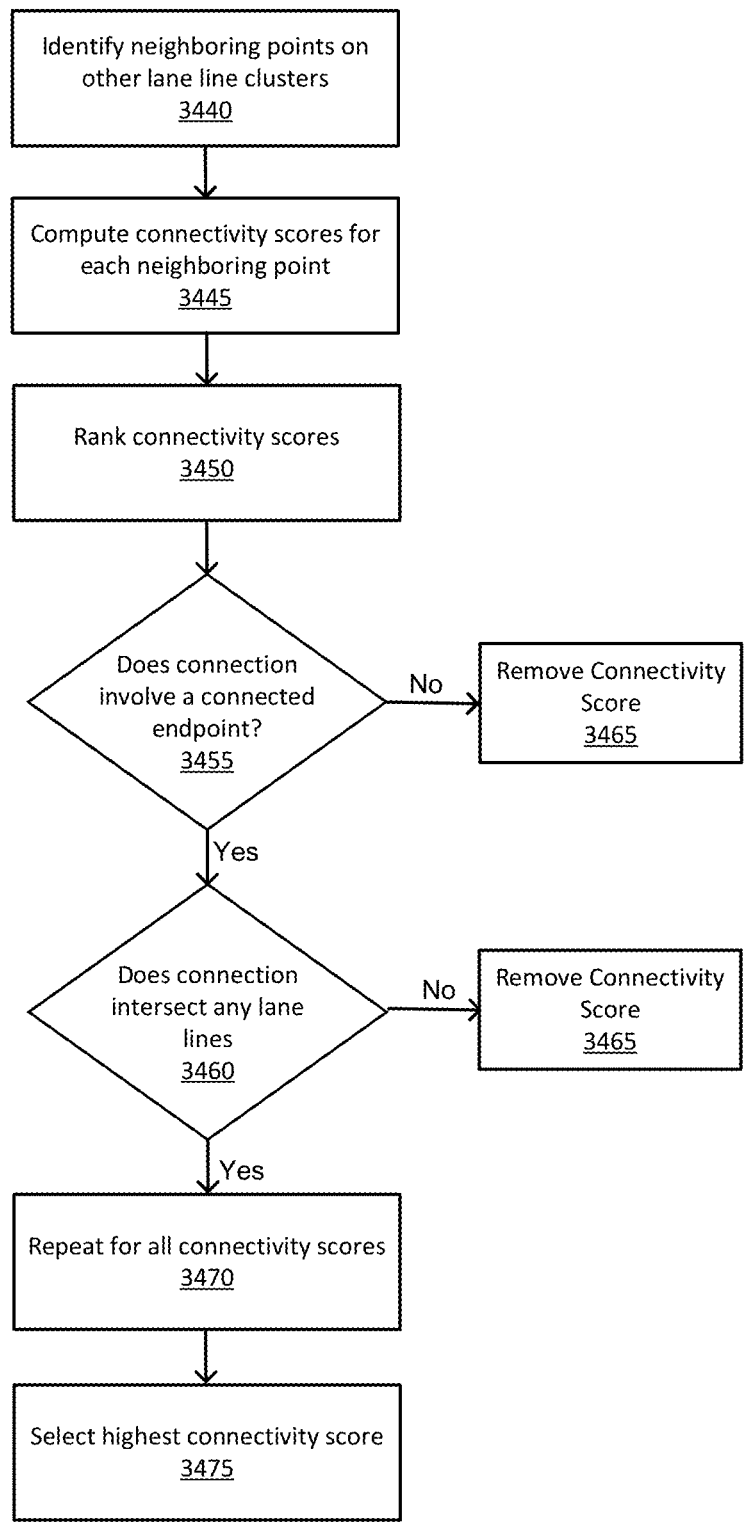
FIG. 34C illustrates a flow chart describing the process for connecting one or more lane line segments, according to an embodiment.

FIG. 34B shows the system architecture for the lane connection module 2940, according to an embodiment. The lane connection module 2940 connects individual lane line segments into complete representation of lane lines using the center-line polylines 3310 generated by the cluster center analysis module 2935. The lane connection module 2940 comprises a neighbor point search module 3415, a connectivity score generator 3420, a connectivity score store 3425, a connectivity score ranking module 3430, and a connection check module 3435. Other embodiments of the lane connection module 2940 may include more or fewer modules than those presented in FIG. 34B and functionality indicated as being performed by a particular module may be implemented by other modules. The neighbor point search module 3415 identifies neighboring endpoints of additional lane line segments that are eligible to be connected with the lane line of interest. The connectivity score generator 3420 determines a connectivity score between each neighboring endpoint and the endpoint of the lane line of interest and the connectivity score store 3425 stores the score. The connectivity score ranking module 3430 organizes all possible connections based on their connectivity scores and the connection check module 3435 confirms that the each connection does not overlap with any other lane line segments.

The neighbor point search module 3425 identifies 3440 neighboring points within other lane line segments 2940 less than a maximum distance away from the endpoints of the lane line segment 2940 of interest. For each neighboring point identified, the lane connectivity score generator 3420 computes 3445 a connectivity score between the identified neighboring points and the closest endpoint of the lane line segment 2940 being analyzed. The connectivity score may consider: 1) the distance between two lane line segments and 2) the change in direction between the two segments. For example, connectivity scores improve as the distance between the two lane line segments decreases and the direction of change between two the segments is small. Alternate embodiments only consider one of these factors at a time. The connectivity score ranking module 3430 may rank 3450 the connectivity scores in a descending order such that the neighboring point with the highest score is at the top of the list. In another embodiment, the connectivity score ranking module 3430 may rank the connectivity scores in ascending order.

First, for each connection, the connection check module 3435 checks 3455 whether the connection involves an endpoint that has already been connected with a different lane line segment. If the check indicates that the endpoint has already been connected to a different lane line segment, the connection is removed from the ranked list. Specifically, to check endpoints for involvement in an existing connection, connections with a distance below the length of the lane line segment 2940 are analyzed. The system checks endpoints whose distances to one end of the connection are smaller than a threshold D. The threshold D is the maximum distance that the system considers. For the remaining connections on the ranked list, the connection check module 3435 checks 3460 whether the connection, if made, would intersect any existing lane lines. If the check indicates that the connection would overlap with an existing lane line segment, the connection is removed 3465 from the ranked list. Specifically, to check for intersections of existing lane lines, the connection check module 3435 checks for any overlap or intersections with the bounding boxes of the lane line segment 2940. In some embodiments, the order of the first check and the second check is reversed. The connection check module 3435 repeats 3470 the process described above for each connection of the ranked list until a connection is found that satisfies both check protocols. The lane connection module 2940 selections 3475 the remaining connection with the highest connectivity score and draws a connection between those two lane line segments. In embodiments in which connections are ranked in descending order, the highest connection score is the first connection score to satisfy both check protocols and to not be removed from the ranked list. For certain connection pairs that the system is trying to connect (for example, L), and when the system tries to determine if there are existing connection pairs that would intersect with the L, out of all existing connection pairs, the system finds those pairs whose one endpoints lie within distance D to one end of L.

Additional Embodiment

In an embodiment, the HD map system creates an occupancy map (OMap) by merging LIDAR scans from many track samples and multiple data collection runs. Since track samples have been aligned, individual point clouds can be transformed to the common coordinate of OMap, merged and voxalized into small cubes (e.g., 5×5×5 cm cubes), where each cube indicates that the space within is occupied. Since LIDAR sensor provides intensity for each point, the HD map system populates the intensity values to OMap voxels (e.g., by taking the mean or median intensity from all points falling inside the cube). Further, since lidar sensor and camera sensors have been calibrated, the HD map system projects LIDAR points to nearby camera images to assign color to each point. Similarly, the HD map system populates the color information to OMap voxels.

A voxel may not have any color info if all the points within it are not visible from camera view. In this situation, the HD map system assigns a default color to it, e.g., blue, and marks it so that it is distinguished from road features. Given a set of OMap voxels, each of which having an intensity value and most with color info the HD map system applies bottom-up projection to the set of voxels to create a set of 2D images. Given each column of voxels in the vertical direction, the system takes the lowest voxel and converts its intensity and color info to a pixel in the output image. Accordingly, the HD map system creates two images, one gray-scale image storing the intensity value, and an RGB image storing the color information. The benefit of doing bottom-up (picking the lowest voxel in each column) instead of top-down projection (picking the highest voxel in each column) is that the system can get rid of objects on top of the road, e.g., cars, tree crowns and light poles.

Accordingly, after projection, the HD map system obtains two images for each OMap area, one for intensity and the other for RGB. The HD map system further divides each image into pixel tiles, for example, 1024×1024 pixel tiles to ensure that file size is manageable. The HD map system applies machine learning techniques (e.g., deep learning) to these images to extract road features (e.g., lane lines). In an embodiment, the HD map system merges the gray-scale image and RGB image into a single 4-channel matrix to learn the model since deep learning can process the input data independent of the number of channels in the input data. Compared to using camera images, using OMap images gives one more channel of information beyond RGB, i.e., intensity. This significantly improves the results since one major source of confusion to machine learned models is shadow on the road, which has significantly different color compared to its surroundings and may be confused with road features such as lane lines. LIDAR intensity, on the other hand, is insensitive to shadows. Thus the gray-scale intensity image shows uniform values across shadow boundary. Lidar intensity is still sensitive to road features, most of which are painted on and produce higher reflectivity than ground.

After the deep learning step, each image pixel is labeled as either "lane line" or "not lane line". In some embodiments, the HD map system uses machine learning based models that further categorize lane lines into different types, and consider other road features. The HD map system propagates these labels back to OMap voxels, for example, to the lowest voxel in each column. At this point the data is in the same format as the camera-based method, and the system applies the same post processing as described herein including clustering, skeleton extraction, line fitting and cleanup, and so on to create lane line features.

Lane Element Graph

In some embodiments, the HD map system 100 generates a lane element graph that represents a network of lanes to allow a vehicle to plan a legal path between a source and a destination. A lane element graph allows navigation of autonomous vehicles through a mapped area. Each lane element is associated with the traffic restrictions that apply to it such as speed limit, speed bump, and traffic signs and signals. A lane element graph represents the navigable road surface that is divided into lane elements, and includes connectivity among lane elements (e.g., where vehicles can go from current lane element) as well as semantic association between lane elements and features (e.g., speed limit in current lane element) to assist in on-vehicle routing and planning needs. The lane elements are topologically connected, and each lane element is known to its successors, predecessors, and left and right neighbors.

Lane elements are stored as pieces of a lane element graph. Within the lane element graph, individual lane elements are represented as nodes on the graph connected by edges to other nodes, representing neighboring lane elements of the graph. The edges connecting two lane elements indicate physical connection between two lane elements that a vehicle can legally traverse. For example, an edge between two lane elements may represent a dashed white line over which vehicles can change lanes, but may not represent a median over which vehicles not legally cross. In some embodiments, boundaries between lane lines over which cars cannot cross have a representation distinct from the above edges of the lane element graph. Additionally, within geographical regions, lane elements transition from a current lane element to a subsequent lane element. Similarly, crossing the boundary of two geographical regions and transitioning from the current geographical region to an adjacent one, the lane element of the current geographical region also transitions to the connecting lane element with the adjacent geographical region.

Figure 35:
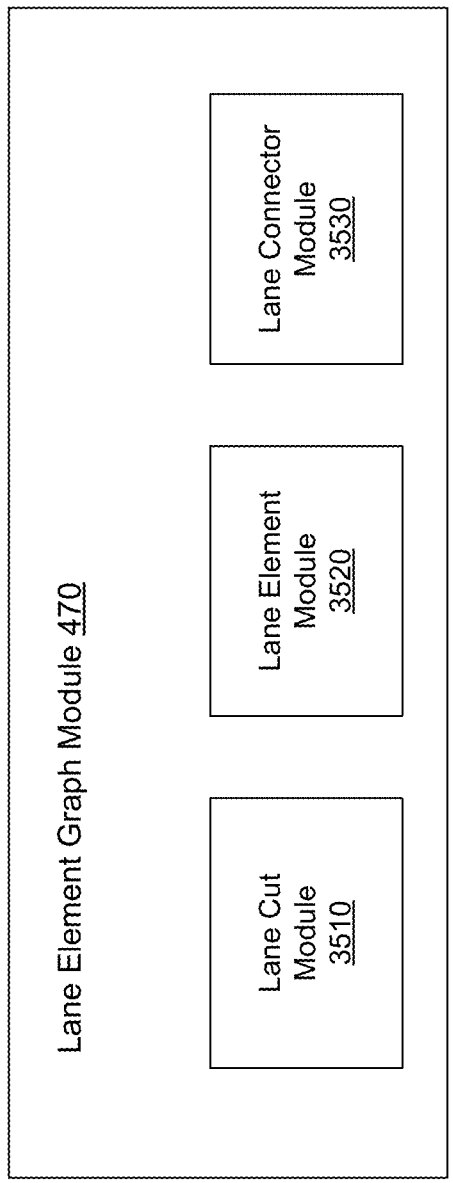
FIG. 35 illustrates an example embodiment of a lane element graph module.

FIG. 35 illustrates an example embodiment of a lane element graph module 470, according to an embodiment. The lane element graph module 470 generates a lane element graph. The lane element graph module 470 includes a lane cut module 3510, a lane element module 3520, and a lane connector module 3530. Alternative embodiments may include different or additional modules or omit one or more of the illustrated modules.

The lane cut module 3510 generates lane cuts by analyzing lane lines and navigable boundaries. A lane line represents a boundary of a lane (e.g., explicitly marked by white and yellow stripes, or implicit paths). A lane line may be represented by a head control point, a tail control point, and a line segment. A control point may include a latitude, a longitude, and an altitude. A navigable boundary represents a boundary of navigable road surface and is one in which vehicles should not cross or go beyond these boundaries (e.g., curb edge, median edge, traffic island edge, etc.). A lane cut is generated where there is a topological change in the road network (e.g., an intersection, a split or a merge of lanes) or where there is a semantic change in the lane (e.g., a change in speed limit). A lane cut goes through the width of the road, cutting it into adjacent segments. A lane cut ends at a navigable boundary. An example process of the lane cut module 3510 is described in further detail at FIG. 37.

The lane element module 3520 generates lane elements from lane lines, navigable boundaries, and lane cut segments. The lane lines and navigable boundaries may be generated from received image frames from an imaging system mounted on a vehicle. Lane elements, also referred to as cells or LaneEls, have left and right edges that are defined by lane lines or navigable boundaries. Lane elements have a bottom and a top edge defined by lane cut segments. Lane elements have 0 or 1 left and right neighbors and 0 or more predecessor and successor neighbors. Each lane elements can be associated with features that only affect local lane elements (e.g., stop sign, yield sign, or traffic light). Additional details regarding generating lane elements will be discussed in the detailed description of FIG. 36.

The lane connector module 3530 generates lane connectors for connecting lane elements together and indicating where a vehicle can go from a current lane element. In some embodiments, human operators can draw lane connectors between the lane elements at intersections to annotate their connectivity to create successor and predecessors for the lane elements. A lane element may be generated to represent a lane connector at an intersection, and the left and right edges of the lane element can be derived from the geometry of the lane connectors and the lane elements it connects. In one embodiment, the lane connector module 3530 generates lane connectors using tracked trajectory of a data-collecting vehicle at an intersection. The tracked trajectory represents a known path through the intersection. The lane connector module 3530 can simplify the tracked trajectory to find a centerline for the lane connector. The lane connectors are produced from the previously traversed routes in a data collecting trip. In other embodiments, lane connectors are generated by using template matching. The lane connector module 3530 can generate an intersection configuration dictionary or collection of known intersection configurations in the real world. All such intersection configurations can be added to the dictionary. Each configuration can be represented as a directed graph, with node being the lane elements drive into/out of the intersection, and edges are the lane connectors. Each node is labeled with diving restrictions. For example, a left-only lane element is labelled with "L", a lane element where car can either make a right turn or go straight cross the intersection is labelled with "RS". Edges are left/right neighbors and predecessor/successor relationships. The intersection of lane elements may already have some lane connectors inferred from tracked trajectory. The remaining lane connectors can be inferred by finding a best match to one configuration in the configuration dictionary. The lane connector module 3530 generates lane connectors for the lane elements in the intersection based the known configuration that best matches the intersection. In one embodiment, human operators can qualify the result and may modify the lane connectors after they are automatically inferred for quality assurance.

Figure 36:
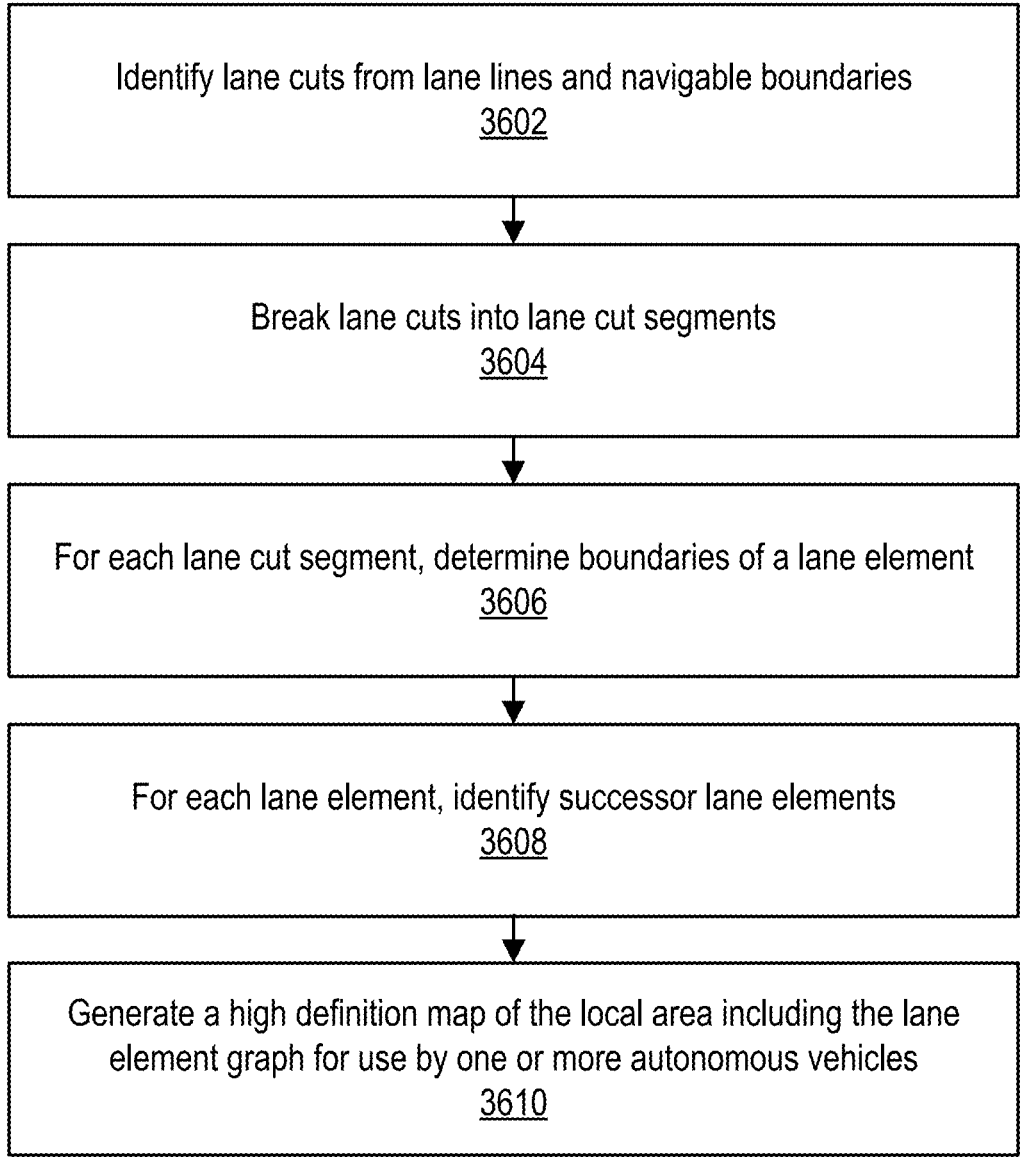
FIG. 36 is a flowchart illustrating an embodiment of a process for generating a connected graph of lane elements.

FIG. 36 is a flowchart illustrating an embodiment of a process for generating a connected graph of lane elements. The lane element graph module 470 identifies 3602 lane cuts from lane lines and navigable boundaries. The lane cut lines and navigable boundaries are generated from a plurality of received image frames from an imaging system mounted on a vehicle. The lane element graph module 470 breaks 3604 lane cuts into lane cut segments across a single lane. For each lane cut segment, the lane element graph module 470 determines 3606 boundaries of a lane element. The boundaries of the lane element include the lane cut segment as a bottom edge of the lane element, a right and left edge of the lane element, and a top edge of the lane element. In one embodiment, the lane element graph module 470 (i) identifies two lane lines the lane cut segment intersects and (ii) a corresponding lane cut segment that the two lane lines intersect. In some embodiments, the bottom edge or the top edge may include two lane cut segments. In the case of a road split, the lane element graph module 470 (i) identifies two lane lines the lane cut segment intersects and (ii) two lane cut segments that the two lane lines intersect. The two lane cut segments are joined form the top edge of the lane element and the two lane lines are the right and left edge of the lane element. In the case of a road merge, the lane element graph module 470 (i) identifies one lane line the lane cut segment intersects, (ii) an neighboring lane cut segment where the lane cut segment does not intersect a lane line, (iii) a neighboring lane line the neighboring lane cut segment intersects, and (iv) a corresponding lane cut segment that the one lane line and the neighboring lane line intersect. The lane cut segment and neighboring lane cut segment are joined to form the bottom edge of the lane element, the one lane line and the neighboring lane line form the right and left edges of the lane element, and the corresponding lane cut segment is the top edge of the lane element. For each lane element, the lane element graph module 470 identifies 3608 successor lane elements. These successor lane elements of an intersection may be identified by tracking trajectory information of a data-collecting vehicle and connecting lane elements based on the tracked trajectory information. The successor lane elements may be identified by creating a collection of directed graphs from known intersection configurations with nodes being lane elements and edges being lane connectors. An intersection configuration of lane elements can be matched to a single directed graph out of the collection, the matching may be based in part on the lane elements of the intersection configuration including some identified successor lane elements based on the tracked trajectory information. The lane elements of the intersection may be connected based on the known intersection configuration in the directed graph. A high definition map of the local area can then be generated 3610 including the lane element graph for use in driving by one or more autonomous vehicles.

Lane Cut Generation

FIG. 37 is a flowchart illustrating an embodiment of a process for identifying lane cuts. In one embodiment, the lane cut module QHX10 identifies or generates lane cuts. For each lane line, for each head and tail control point of a lane line, the following steps are performed. The lane cut module 3510 casts 3702 a ray perpendicular to the line segment. The head or tail control points of each lane line will be referred to as the origin of the ray. The ray extends from the origin of the ray. The lane cut module 3510 computes 3704 the intersections of the ray to other nearby lane lines and navigable boundaries. The computation is done in a same direction that the ray extends. In some embodiments, a ray can be cast in a first direction and a ray can be cast in a second direction. Responsive to an intersection being within a threshold distance (e.g., 1 meter) of a head or tail control point of an intersecting lane line, the lane cut module 3510 snaps 3706 the intersection to the head or tail control points of intersected lane line. This avoids duplicate cuts when multiple lanes come to an uneven stop at an intersection. The lane cut module 3510 identifies 3708 qualified intersections for each ray. A qualifying intersection refers to an intersection that is a threshold distance from ray origin. For example, assuming the width of the road cannot exceed x meters, all intersections within this distance are considered qualifying or a qualified intersection. The lane cut module 3510 sorts 3710 the intersections from ascending distance to origin. This distance may be positive or negative depending on which side of the ray origin to ensure correct order of intersections after sorting them. The lane cut module 3510 iterates 3712 through the sorted intersections starting from the origin and connects intersections that are within a threshold distance to the previously visited intersection (e.g., within 10 meters). The connected intersections form a candidate lane cut. An intersection with navigable boundaries terminates the cut. The lane cut module 3510 sorts 3714 the candidate lane cuts. The candidate lane cuts are sorted by the following rules: (i) lane cuts with more intersections snapped to head or tail control points rank higher if tied with another lane cut; (ii) lane cuts with more intersections rank higher if tied with another lane cut; and (iii) lane cuts with smaller curvature (measured by the maximum angle between consecutive segments) rank higher. The lane cut module 3510 selects 3716 final lane cuts from the sorted candidate lane cuts. The final lane cuts are selected by going through the sorted candidate cuts and selecting a lane cut if and only if it has no overlap, i.e., no shared control points with previously selected final lane cut.

Examples of Lane Lines and Lane Cuts

Figure 38A:
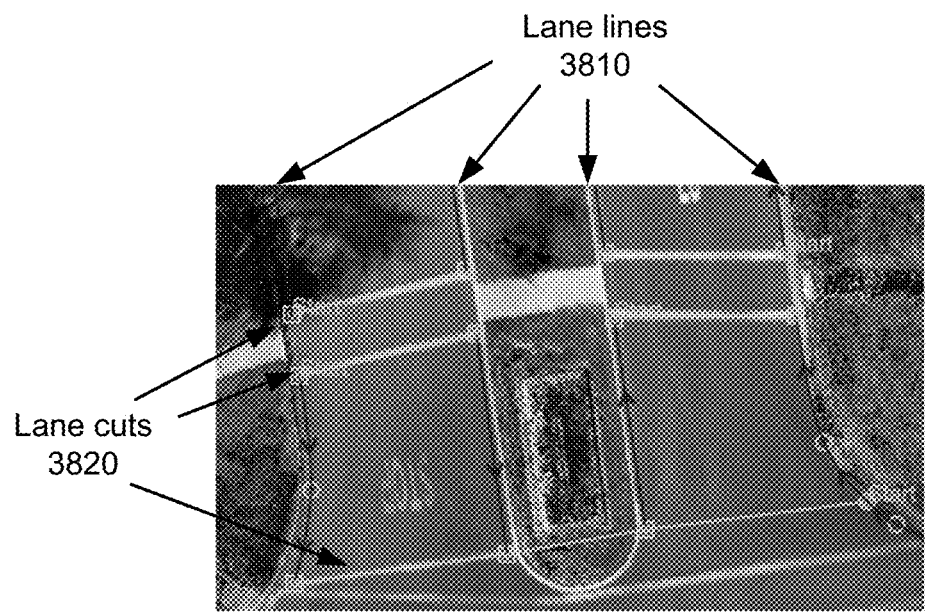
FIGS. 38A, 38B, and 38C show examples of lane lines and lane cuts.
Figure 38B:
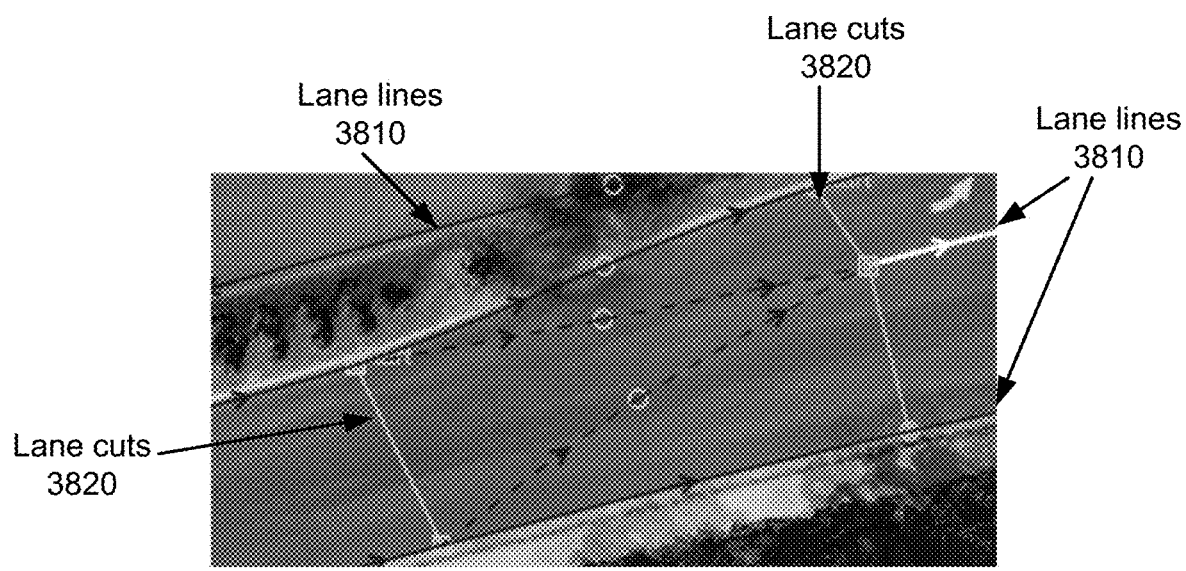
Figure 38C:
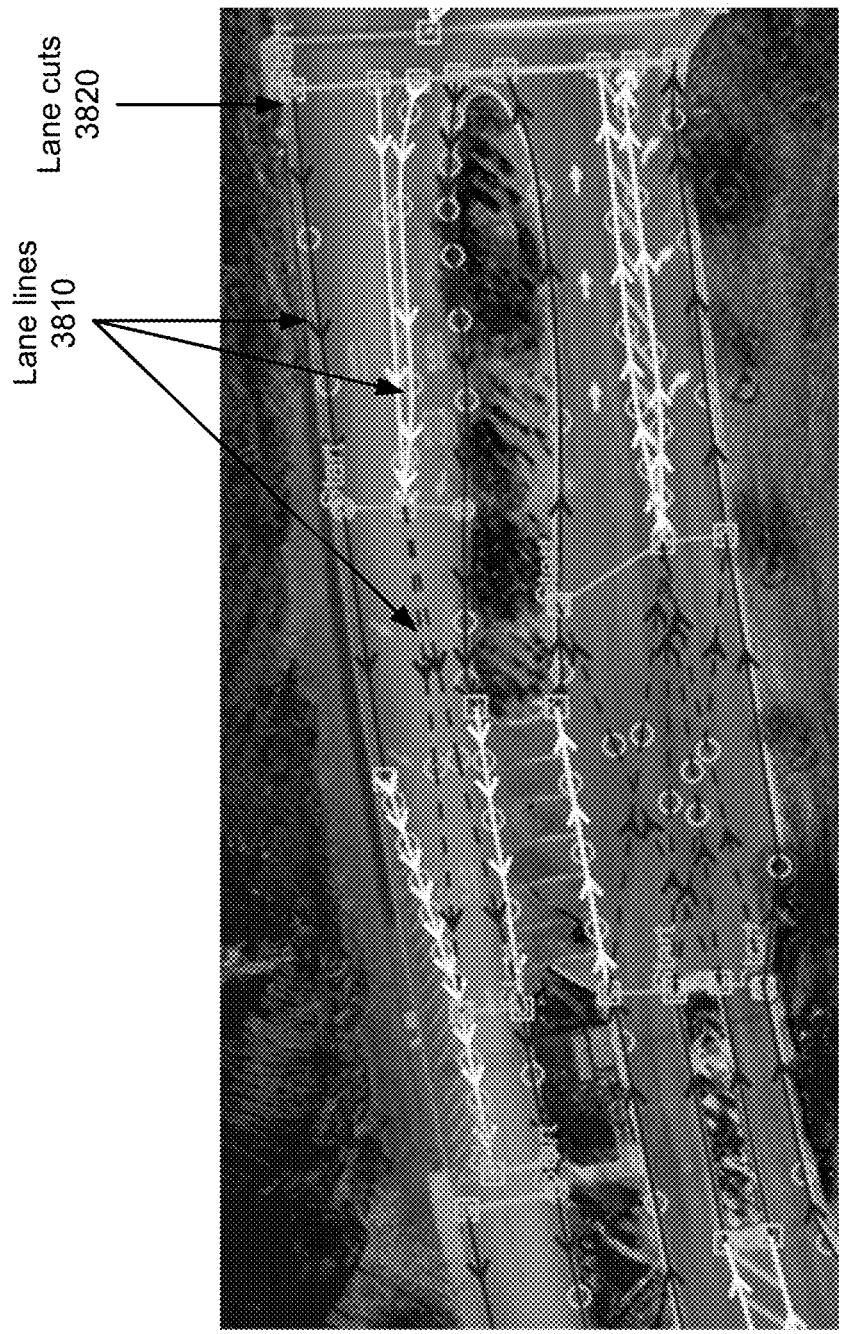
Figure 39:
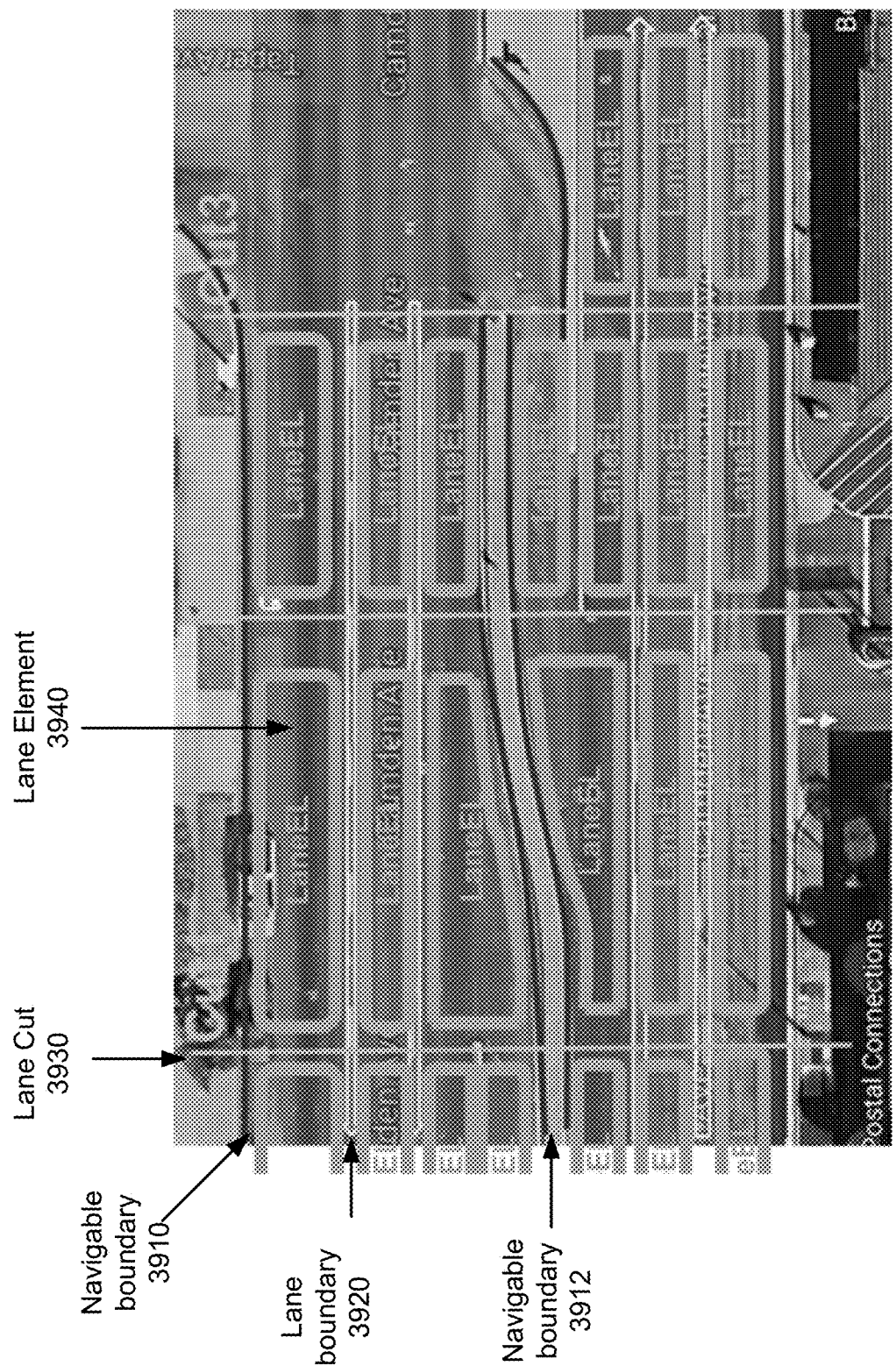
FIG. 39 shows an example of lane elements, lane boundaries, navigable boundaries, and lane cuts.
Figure 40:
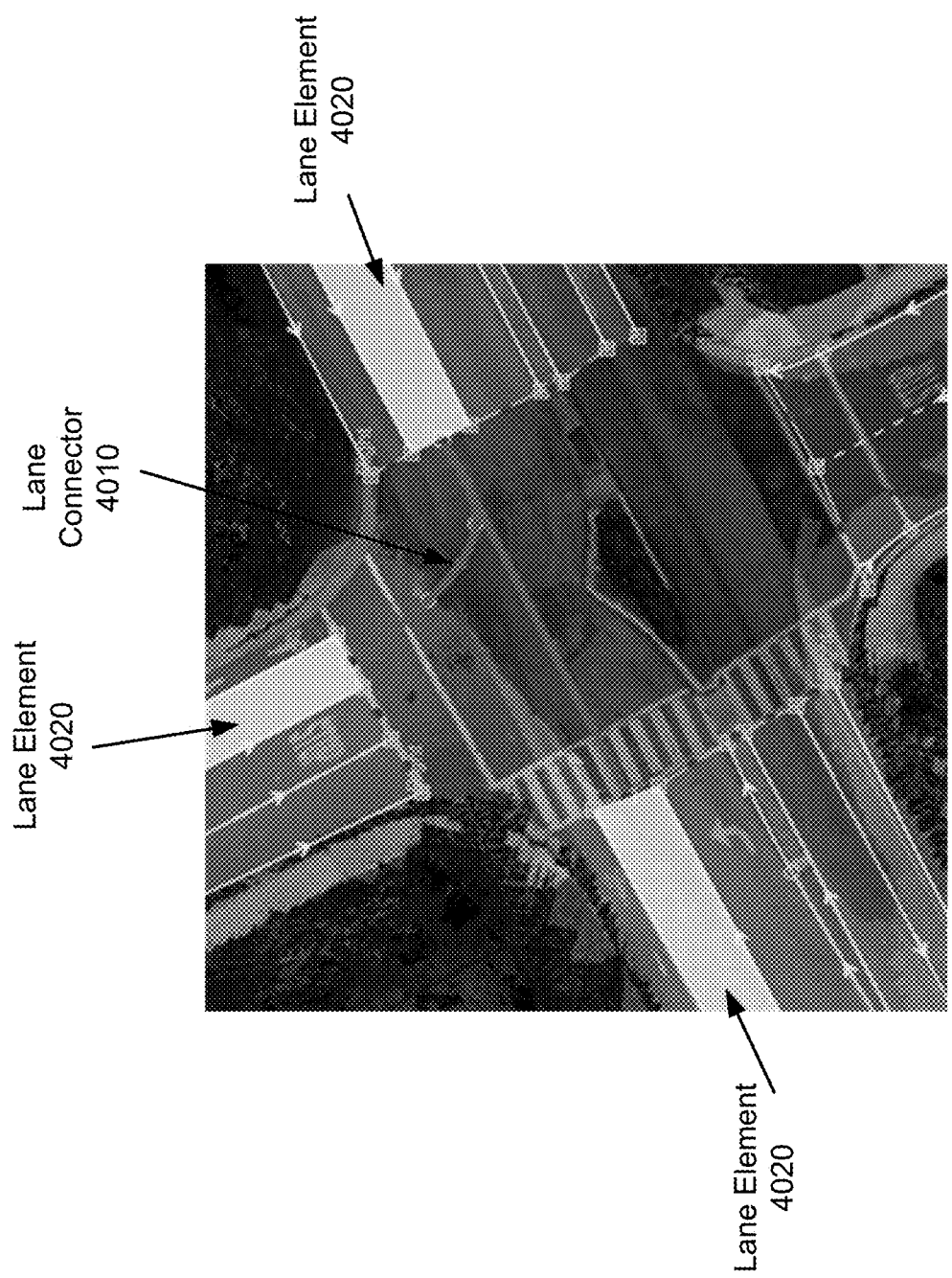
FIG. 40 shows an example intersection with lane connectors connecting lane elements.

FIGS. 38-40 show examples of lane lines and lane cuts. FIGS. 38 and 39 show some example lane lines 3810 (purple and white) and manually labeled lane cuts 3820 (green). FIG. 38 shows lane cuts at crosswalks and intersections (stop lines). FIG. 38B shows lane cuts 38B20 at lane splits. FIG. 38C show example lane lines 38C10 (purple and white, dotted ones are implicit) and manually labeled lane cuts 38C20 (green). FIG. 38C shows more complex lane cut examples at lane merges and lane crosses. At least one of the vertices in each lane cut 3820 is at the end point of a lane line feature (explicit or implicit) which provides a fairly robust way of lane cut detection.

Examples of Lane Elements

FIG. 39 shows an example of lane elements 3940 (orange), lane boundaries 3920 (yellow), navigable boundaries 3912 (red), and lane cuts 3930 (green).

FIG. 40 shows an example intersection with lane connectors 4010 connecting lane elements 4020. The connectivity of the three lane elements 4020 can be calculated from their spatial relations. For example, an automatic template matching algorithm can be used to infer the connectivity of the lane elements at intersections and automatically create lane connectors. Alternatively, a human can draw lane connectors.

Specific fields of a lane element may be the following: left lane line, right lane line, reference to incoming LaneEls, reference to outgoing LaneEls, reference to left and right adjacent LaneEls (if any, note: may be a LaneE1 traveling opposite direction, and only considered adjacent if it is clearly navigable, not if there is a curb or barrier between), left lane restriction: whether you can legally cross on the left or not, right lane restriction, termination restriction—a semantic termination restriction for the outgoing end of the LaneE1 (e.g., a stop line), speed limit, vertical clearance, keep clear, the spatial bounds, references to related Features (e.g., signs or lights), left and right Navigable Surface Polylines.

A termination restriction is an enumeration of semantic termination restrictions for the end of a Lane element. Examples include a stop line—may be an N-way stop line, which needs to reference the stop line locations for the other N−1 stops, yield line, crosswalk, traffic light, dead end, rail crossing, keep clear, speed bump, etc.

In some embodiments, the lane elements are restricted to a maximum length. Breaking lane elements in to smaller lengths can make processing and usage of the lane element more efficient.

Examples of Features

Features are everything on a map that is either drawn by operators or automatically generated. A feature can be a lane boundary, navigable boundary, or a lane element, as well as traffic lights, traffic signs, etc. Each feature may comprise a list of control points and an interpolation method. An interpolation method can be one of polyline, bezier curve, etc, which describes how to interpolate the geometry among the control points. Primary Features are features that are either drawn by operators, or a sign or lane boundary that is automatically generated. Primary features can also be automatically generated features that are further modified by human operators. For example, a lane cut or lane connector can be generated by automatic algorithms, but is later modified by a human operator during human curation. Examples of primary features are lane boundaries, crosswalks, stop lines, yield lines, traffic lights, and traffic signs. Derived features are features that are inferred and constructed from primary features. The properties of a derived feature depends on other features. In one embodiment, human operators are not allowed to directly add/modify derived features. An example of a derived feature type is a lane element.

It would be difficult for a human operator to manually update and validate the lane element graph. Lane elements are aligned with lane boundaries and navigable boundaries. Changing one lane element may affect many of its neighbors. Adding a speed bump may cause many lane elements to be split. Adding a speed limit sign changes attributes of tens or hundreds of lane elements.

Lane cuts can be primary features. Lane cuts cut out a cross section of a road. Counting the intersections between a lane cut and the lane boundaries/navigable boundaries, all information of a road cross section can be inferred: how many lanes, what are the lanes directions, etc. A lane cut is needed whenever there are changes to roads: lane merging/splitting, upcoming intersection or junction, speed limit changes, speed bump. In some easy cases a lane cut can be automatically generated, for example, when a speed limit sign is encountered, shoot a ray orthogonal to the direction the sign is facing to produce a lane cut. In some complicated cases, such as lane merging, human operators may draw the lane cut precisely.

Lane connectors can be primary features. At intersections, roads become complicated and lane elements overlap. Lane cuts alone are not enough to describe the road connectivity. Assuming lane elements are generated until just before the intersections, lane connectors can be drawn by operators or automatically generated to describe how they are connected through the intersections.

Figure 41:
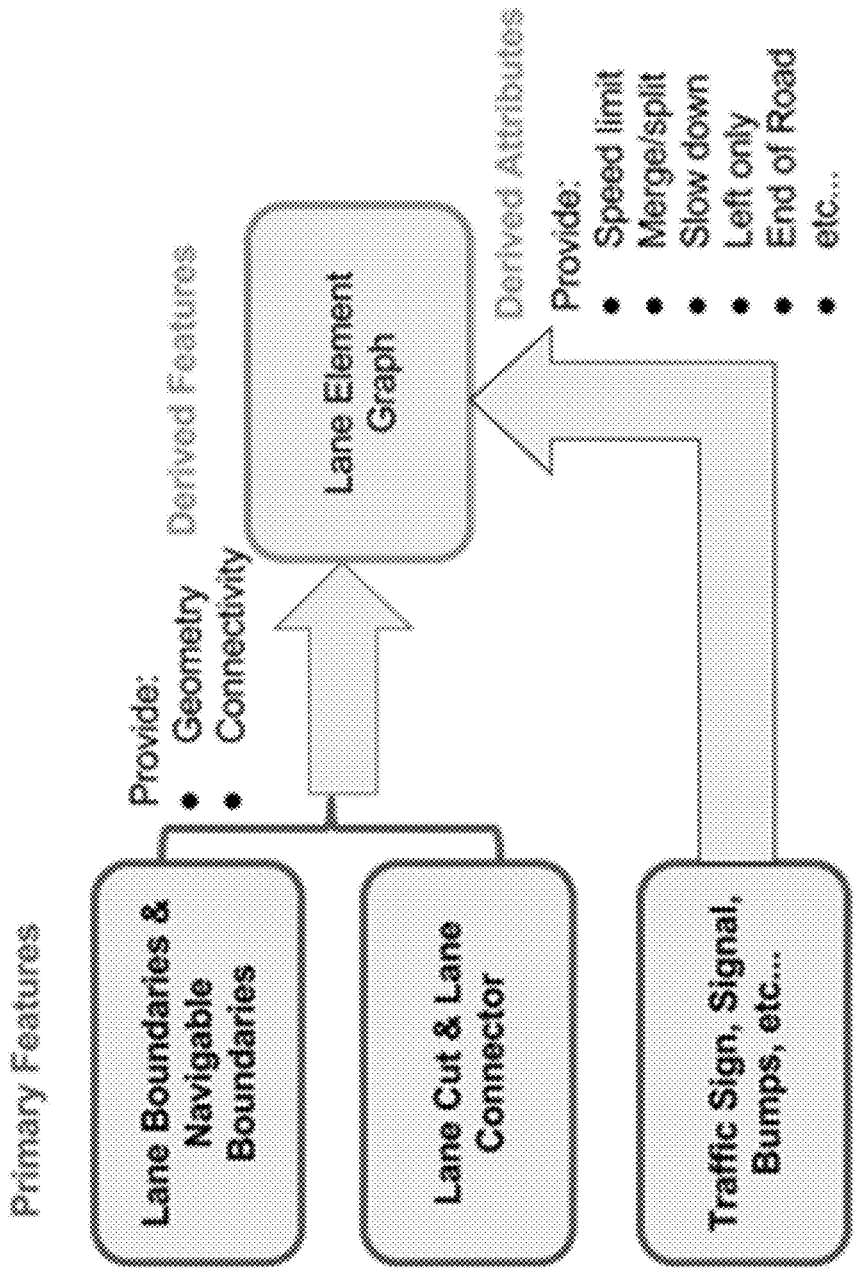
FIG. 41 illustrates the process of creating a lane element graph from primary features and derived features.

FIG. 41 illustrates generating a lane element graph from primary features and derived features. Primary features may include lane boundaries, navigable boundaries, lane cuts, lane connectors, and traffic sign, signal, bumps, etc. Note that lane cuts may be drawn by users and may be primary features.

Example of Lane Element Generation

Figure 42:
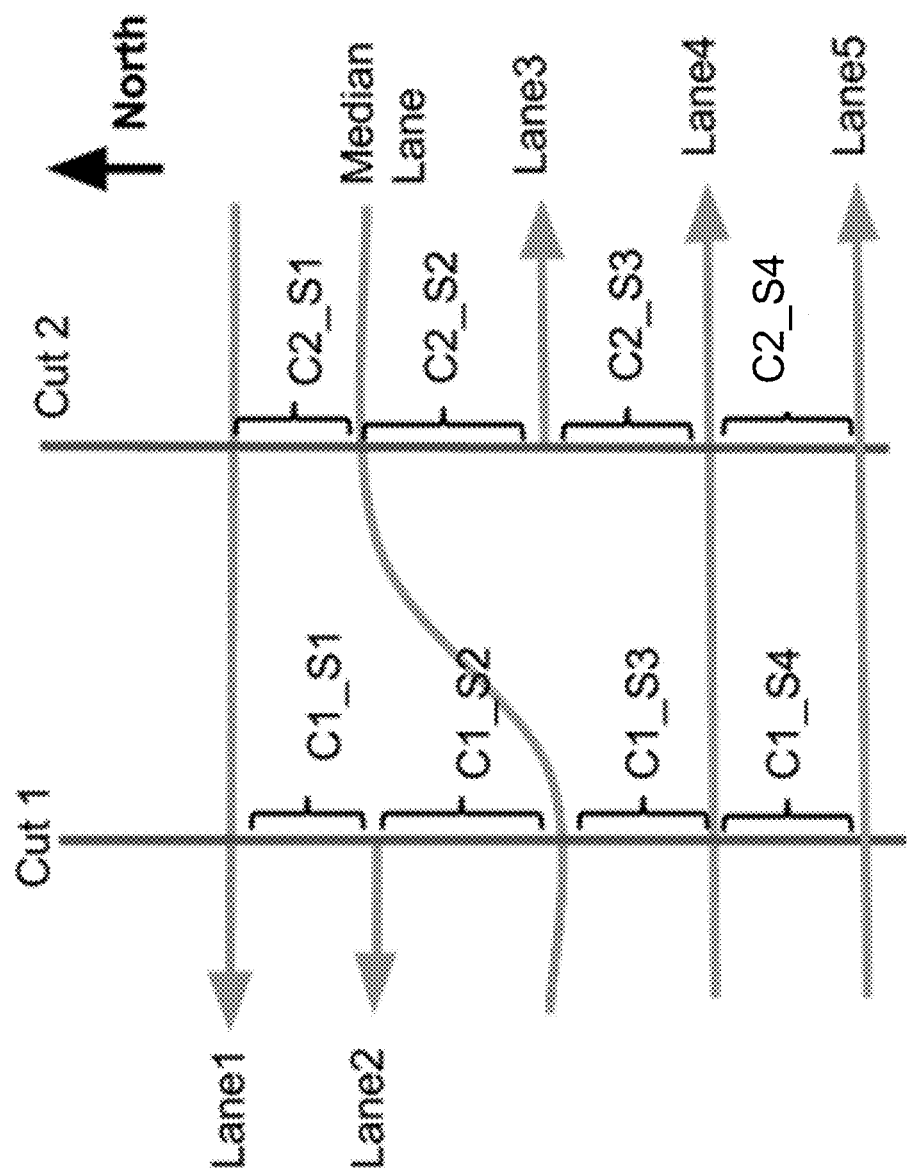
FIG. 42 illustrates example lane cuts and lane boundaries.

FIG. 42 shows an example of lane cuts and lane boundaries for the purposes of illustrating the basic algorithm of lane element generation. The lane cuts are Cut 1 and Cut 2. The lane boundaries are Lane 1, Lane 2, Median Lane, Lane 3, Lane 4, and Lane 5.

In the algorithm for lane element generation, the system goes through each lane cut and, based on the intersection points between the lane cuts and lane boundaries, breaks the lane cuts into segments. Cut 1 intersects with lane1, lane 2, median lane, lane 4 and lane 5. Thus, Cut 1 is broken into 4 lane cut segments C1_S1, C1_S2, C1_S3 and C1_S4. Note that for each segment, the traffic direction can be inferred based on traffic direction of the lane boundary. In this example, lane cut segments C1_S1 and C1_S2 are going west and lane cut segments C1_S3 and C1_S4 are going east. Cut 2 will be broken to lane cut segments C2_S1, C2_S2, C2_S3, and C2_S4 in a similar fashion.

The system further goes through each lane cut segment, where the lane cut segment itself serves as the bottom edge for a lane element, and the system traces the two lane boundaries that are intersected by the segment until another lane cut segment is reached. The other lane cut segment is the top of the lane element. The parts of the two lane boundaries will serve as the left and right edges of the lane element. Thus, the full geometric boundary of the lane element is obtained. For example, from lane cut segment C1_S4, trace lane4 and lane 5 until lane cut segment C2_S4 is reached.

An example for a road split includes performing the algorithm from lane cut segment C2_S1. The right edge of C2_S1 (lane1) is traced until it reaches C1_S1. The left edge of C2_S1 (median lane) is traced until it reaches C1_S2. This lane element is a split zone. Its cap or top edge is formed by joining C1_S1 and C1_S2, and this lane element will have two successor lane elements.

An example for road merge occurs if we assume the traffic direction in FIG. 42 is reversed and perform the algorithm from lane cut segment C1_S1. C1_S1 does not have a right edge to trace, so the neighboring lane cut segment C1_S2 is used to obtain a right edge (Median Lane) to trace. The left edge is Lane 1. Both the Median Lane and Lane 1 end at C2_S1. For this lane element, the bottom edge will be C1_S1 joined with C1_S2 and the top edge will be C2_S1.

The left and right neighbors of lane elements are derived by using the property that neighboring lane elements share the same edge at intersection points.

In one embodiment, lane or navigable boundaries that are broken are connected to implicit lane boundaries. For example, at the driveway of houses, the curb (navigable boundaries) is broken and can be connected to an implicit lane boundary that is formed at the driveway boundary.

An alternative method to generating lane elements without the step of tracing lane lines to find the corresponding top edge of a lane element is to solve an optimization problem and find the best match to minimize a certain cost function. In FIG. 42, the optimal match of lane cut segments (bottom edge and top edge for lane elements) is:

$$C1\_S1 <-> C2\_S1$$

$$C1\_S2 <-> C2\_S1$$

$$C1\_S2 <-> C2\_S2$$

$$C1\_S2 <-> C2\_S3$$

$$C1\_S2 <-> C2\_S4$$

A simple cost function can be used based on whether a lane cut segment shares a left lane edge or right lane edge with another lane cut segment and distance between lane cut segments to find the match.

The algorithm can be executed in instant mode and batch mode. In instant mode, the system can assume operator has changed any primary features, so the whole lane element graph will be affected. The lane element generation algorithm has to be rerun for a reasonably large area (e.g., 100 meters by 100 meters). In one embodiment, the human operator may preview the changes to ensure accuracy. At this scale, the algorithm may build a complete graph within seconds. In batch mode, a whole region (e.g., 50 miles by 50 miles) is done at a time. Since the core algorithm works with each lane cut independently (e.g., each lane cut is only traced along the traffic direction, and does not look backward), in theory the work can be distributed into a map reduce job and linearly scaled with number of machines provided. The algorithm is deterministic, so a preview of the lane element graph in instant mode is the same as what is generated and sent to vehicle in batch mode.

Example Lane Elements Connectivity

Figure 43:
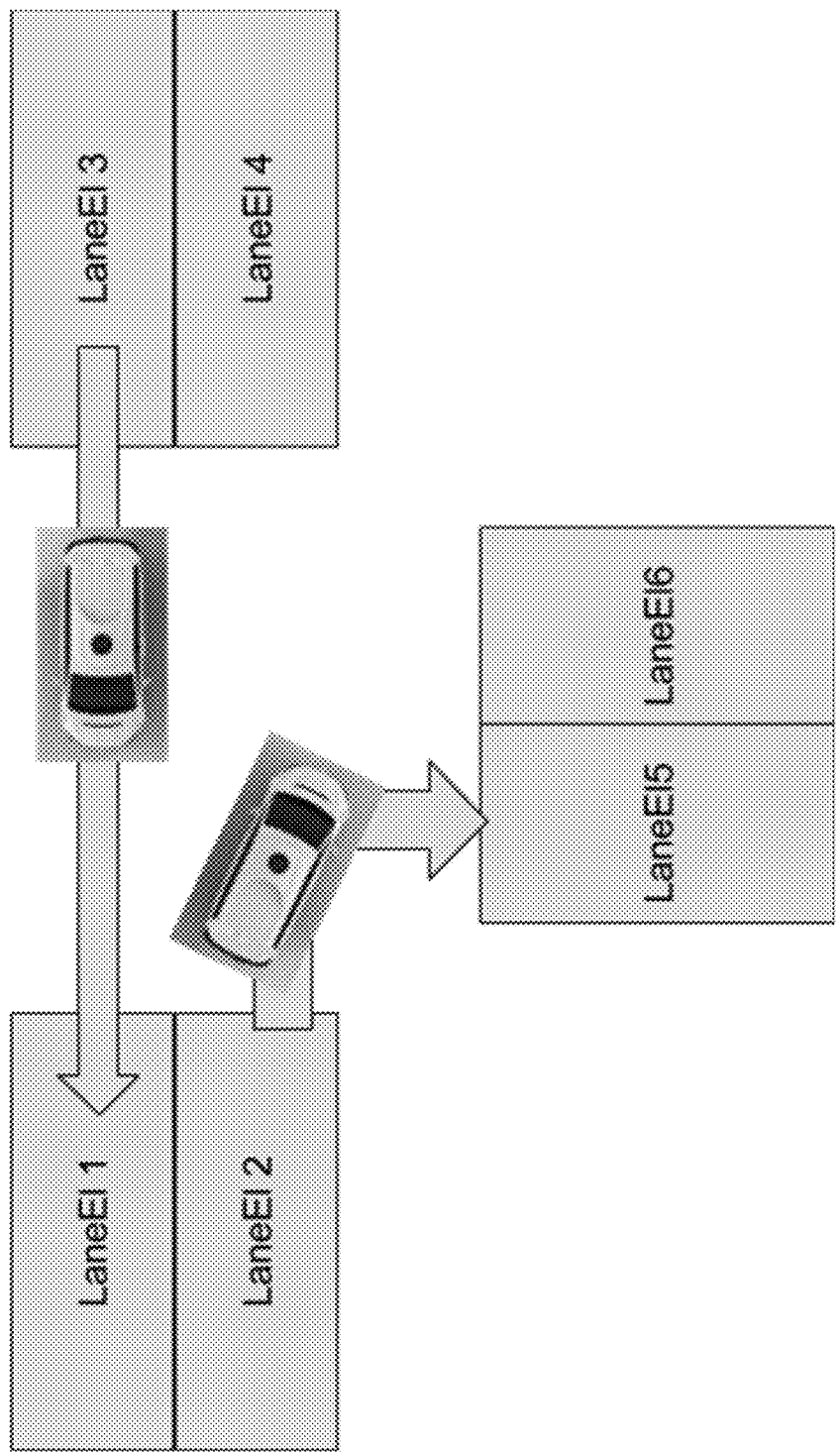
FIG. 43 shows an example of a T-intersection with two data collecting trips from a vehicle.

FIG. 43 shows an example of a T-intersection with two data collecting trips from a vehicle. The T-intersection includes six lane elements LaneEl1 to LaneEl6. In one data collecting trip, the vehicle traveled from LaneEl3 to LaneEl1. In another data collecting trip, the vehicle traveled from LaneEl2 to Lane El5. From the tracked trajectories, the lane connectors from laneEl3 to laneEl1 and from laneEl1 to laneEl5 can be derived. However, not all the lane connectors can be derived using tracked trajectories since not all lane elements were traveled in during the two data collecting trips. At this stage, a matching method to a known intersection configuration may be used to complete the remaining lane connectors in the intersection (e.g., identify best match to a known intersection configuration of a collection of known intersection configurations).

Traffic Restrictions Association

In one embodiment, another type of primary feature, an association link is used to annotate a lane element. Similar to the lane connector, the association link may connect a traffic light to a lane element that it controls. In one embodiment, the system can infer which lane elements are controlled by a traffic light from the geometric relationship of the lane element to the traffic light. For example, this may be based on traffic light orientation and distance. The association link may also connect a traffic sign to a lane element it controls. Traffic signs like yield signs, stop signs and speed limits are similar to traffic lights. However, traffic signs do not always control all lanes in the same direction. The association link is used to specify which lane element is controlled by the traffic sign.

Other Considerations for Lane Cut Generation

In one embodiment, lane cuts are automatically generated. When lane cuts are automatically generated, lane cuts are not derived from raw image pixels or lidar points (e.g., lane boundaries and navigable boundaries may be derived from these features), but from lower level features such as lane lines and navigable boundaries. Having feature vectors instead of higher level features as input greatly reduces the complexity of detecting changes in road topology. However, the quality of input features has a greater impact on the quality of detected lane cuts as opposed to other automation tasks (e.g., lane lines, traffic signs that use raw image pixels or lidar points). If input lane line features are not well aligned to the road, have missing segments, or have extra pieces that do not exist, the output lane cuts will likely not be useful for generating a network graph.

In one embodiment, lane cut generation occurs after all input features (i.e., explicit/implicit lane lines and navigable boundaries) have been curated. Although more complexity is added to the feature review workflow, as there are dependencies among feature types (lane lines and navigable boundaries are reviewed before lane cuts become available), the detection of topological changes in road network can be done with more confidence and detected lane cuts are more likely to be correct.

Topological changes in road network are generally accompanied with termination of lane lines, either explicit or implicit. The altitude of features does not affect the topology of road network. The computation is simplified by projecting all the input features to 2D by removing the altitude dimension from each control point. The altitude information for each control point is typically not discarded. It can be kept separately, with a mapping between each 2D control point to its altitude value. This information may become useful upon output, when 2D lane cut features are projected back into the 3D OMap. Navigable boundaries terminate the lane cut. The connected intersections form a candidate lane cut.

For each lane cut in the final set, an altitude is computed for each control point. Each control point on a lane cut is an intersection with input features, whose altitude information is known. An intersection falls between two control points on an input feature. The intersection may include a parameter t which measures how close the intersection is to one control point vs. the other (i.e., if the intersection is on the first control point, t=0; if the intersection is on the second control point, t=1; otherwise the range of t is between (0, 1)). An interpolated altitude can be computed at t based on an interpolation method associated with each input feature (e.g., bezier curve) and the altitude information for both control points. Thus, an altitude at each lane cut control point can be calculated.

Rays are not cast from navigable boundaries. Navigable boundaries are used to intersect (and terminate) lane cuts. The use of navigable boundaries is to ensure that a lane cut does not extend to adjacent roads, which can happen if two roads are right next to each other.

To speed up this computation, for each feature, a latitude/longitude bounding box is precomputed that fully contains the feature. The system may only include a feature for intersection computation if ray origin is close to (or contained by) its bounding box. Since the process is done over a large region, this can filter out a majority of the features for intersection computation.

Other Considerations

A roundabout can be cut into segments with a lane cut to break it into several intersections. For example, a four-way roundabout will be cut into 4 T-intersections. Lane connectors can be drawn for each of the T-intersections.

There may be other traffic marks painted on the road surface, some examples are 'bus lane', 'slow', 'keep clear' etc. A polygon feature can be created for each of these traffic marks such that it can be geometrically inferred which lane elements are affected by them.

Roads can terminate in many ways, driveway, parking lot, cul de sac, dead end. For these cases, a final lane cut can be drawn in front of such road terminations and this lane cut may be marked with a special flag 'road_termination'.

Alternative Embodiments

In alternate embodiments the lane line generation process identifies lane lines from photographic images using deep learning techniques and merges the lane lines from multiple images into a single lane. Mapping between the two-dimensional representations of lane lines and the three-dimensional representations is performed by implementing triangulation techniques using stereo images. In some embodiments, lane line merging in instances resembling an intersection is performed during the process of generating a single lane line rather than in reference to the generation of a complete route. Additionally, in some embodiments, information used to facilitate lane line generation in real-time as a car travels along a path.

Computing Machine Architecture

Figure 44:
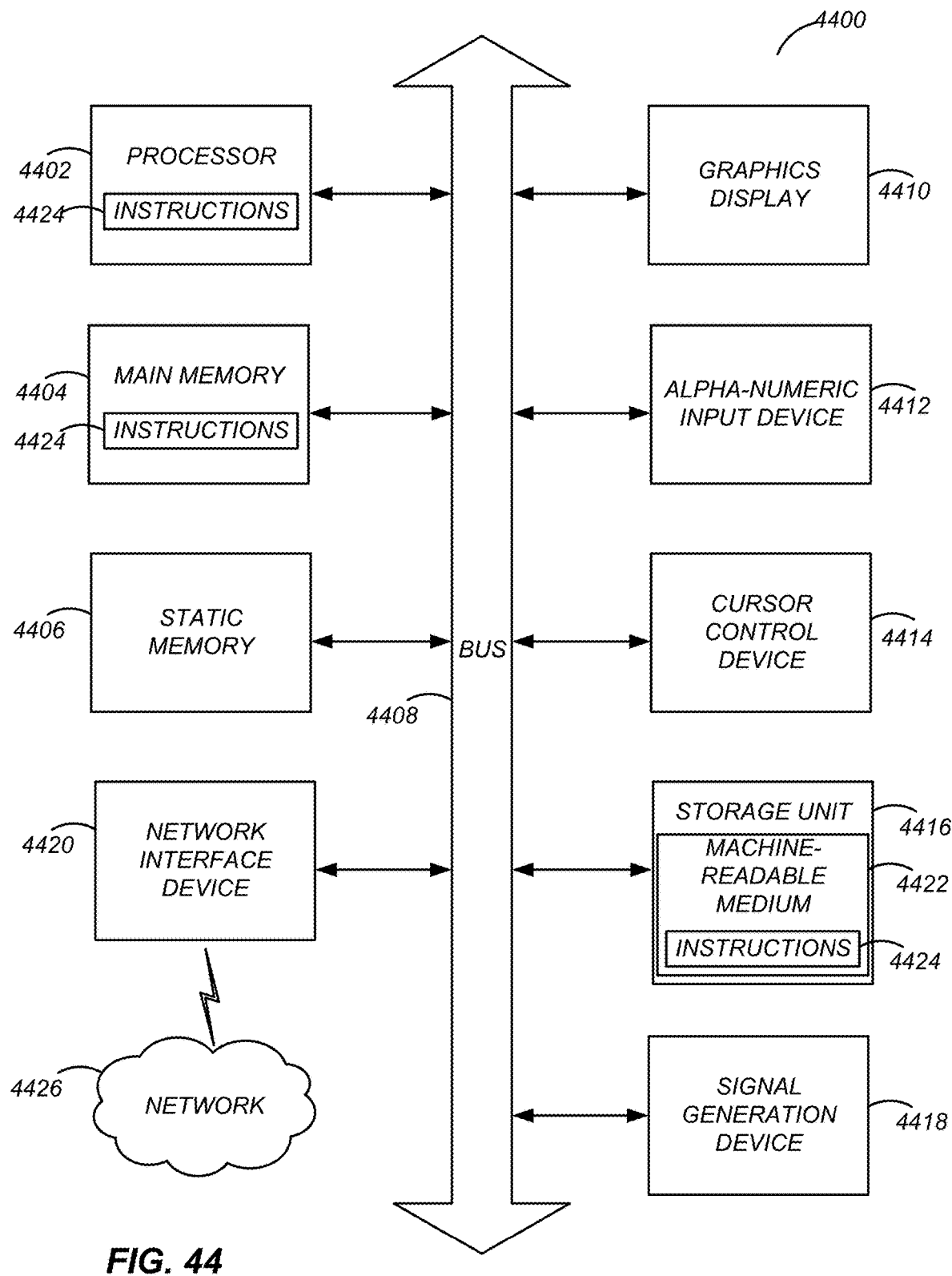
FIG. 44 illustrates an embodiment of a computing machine that can read instructions from a machine-readable medium and execute the instructions in a processor or controller.

FIG. 44 is a block diagram illustrating components of an example machine able to read instructions from a machine-readable medium and execute them in a processor (or controller). Specifically, FIG. 44 shows a diagrammatic representation of a machine in the example form of a computer system 4400 within which instructions 4424 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 4424 (sequential or otherwise) that specify actions to be taken by that machine. Further, while only a single machine is illustrated, the term "machine" shall also be taken to include any collection of machines that individually or jointly execute instructions 4424 to perform any one or more of the methodologies discussed herein.

The example computer system 4400 includes a processor 4402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 4404, and a static memory 4406, which are configured to communicate with each other via a bus 4408. The computer system 4400 may further include graphics display unit 4410 (e.g., a plasma display panel (PDP), a liquid crystal display (LCD), a projector, or a cathode ray tube (CRT)). The computer system 4400 may also include alphanumeric input device 4412 (e.g., a keyboard), a cursor control device 4414 (e.g., a mouse, a trackball, a joystick, a motion sensor, or other pointing instrument), a storage unit 4416, a signal generation device 4418 (e.g., a speaker), and a network interface device 4420, which also are configured to communicate via the bus 4408.

The storage unit 4416 includes a machine-readable medium 4422 on which is stored instructions 4424 (e.g., software) embodying any one or more of the methodologies or functions described herein. The instructions 4424 (e.g., software) may also reside, completely or at least partially, within the main memory 4404 or within the processor 4402 (e.g., within a processor's cache memory) during execution thereof by the computer system 4400, the main memory 4404 and the processor 4402 also constituting machine-readable media. The instructions 4424 (e.g., software) may be transmitted or received over a network 4426 via the network interface device 4420.

While machine-readable medium 4422 is shown in an example embodiment to be a single medium, the term "machine-readable medium" should be taken to include a single medium or multiple media (e.g., a centralized or distributed database, or associated caches and servers) able to store instructions (e.g., instructions 4424). The term "machine-readable medium" shall also be taken to include any medium that is capable of storing instructions (e.g., instructions 4424) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A method comprising:
receiving, from an imaging system mounted on a vehicle, a plurality of image frames, each image frame associated with a local area surrounding the vehicle at a particular point in time;
generating a lane element graph including lane elements and connections between lane elements, each lane element being a portion of a lane with associated traffic restrictions, wherein generating the lane element graph comprises:
identifying lane cuts from lane lines and navigable boundaries, wherein the lane lines and the navigable boundaries are based at least in part on the plurality of image frames and lane cuts that occur at changes in roads,
breaking the lane cuts into lane cut segments, wherein each lane cut segment cuts across a single lane,
for each lane cut segment, determining boundaries of a lane element, wherein the boundaries of the lane element include at least the lane cut segment as a bottom edge of the lane element, a right and left edge of the lane element, and a top edge of the lane element, and
for each lane element, identifying successor lane elements; and
generating a high definition map of the local area including the lane element graph based the plurality of image frames, the high definition map for use in driving by one or more autonomous vehicles.

2. The method of claim 1, wherein determining the boundaries of the lane element comprises:
identifying two lane lines the lane cut segment intersects, wherein the two lane lines are the right and the left edge of the lane element; and
identifying a corresponding lane cut segment that the two lane lines intersect, wherein the corresponding lane cut segment is the top edge of the lane element.

3. The method of claim 1, wherein determining the boundaries of the lane element comprises:
identifying two lane lines the lane cut segment intersects, wherein the two lane lines are the right and the left edge of the lane element; and
identifying two lane cut segments that the two lane lines intersect, wherein the two lane cut segments are joined to form the top edge of the lane element.

4. The method of claim 1, wherein determining the boundaries of the lane element comprises:
identifying one lane line the lane cut segment intersects, wherein the one lane line is one of the right or the left edge of the lane element;
identifying a neighboring lane cut segment where the lane cut segment does not intersect a lane line;
identifying a neighboring lane line the neighboring lane cut segment intersects, wherein the neighboring lane line is a remaining one of the right or left edge of the lane element;
identifying a corresponding lane cut segment that the one lane line and the neighboring lane line intersect, wherein the corresponding lane cut segment is the top edge of the lane element; and
joining the lane cut segment with the neighboring lane cut segment to form a bottom edge for a lane element.

5. The method of claim 1, wherein identifying the successor lane elements comprises:
tracking trajectory information of a data-collecting vehicle; and
connecting lane elements based on tracked trajectory information.

6. The method of claim 5, wherein identifying the successor lane elements comprises:
creating a collection of directed graphs from known intersection configurations with nodes being lane elements and edges being lane connectors;
matching an intersection configuration of lane elements to a single directed graph out of the collection, wherein the matching is at least based in part on the lane elements of the intersection configuration including some identified successor lane elements based on the tracked trajectory information; and
connecting lane elements of the intersection configuration based on the known intersection configuration in the directed graph.

7. The method of claim 1, wherein identifying the lane cuts comprises:

for each lane line:
  for each head and tail control point of a lane line:
    creating a ray perpendicular to a line segment of the lane line from an origin, wherein the origin is a head or tail control point;
    computing one or more intersections of the ray to other lane lines and navigable boundaries;
    responsive to an intersection being within a threshold distance of a head or tail control point of an intersected lane line, snapping the intersection to the head or tail control point of the intersected lane line;
    collecting qualified intersections for each ray;
    sorting the qualified intersections from ascending distance to the origin;
    generating candidate lane cuts by iterating through the sorted intersections starting from the origin of the ray and connecting intersections that are within a threshold distance to a previous intersection;
  sorting the candidate lane cuts; and
  selecting final lane cuts from the sorted candidate lane cuts.

8. The method of claim 7, wherein:
creating the ray perpendicular to the line segment of the lane line comprises creating the ray in a first and a second direction of the origin,
sorting the qualified intersections from ascending distance to the origin comprises sorting the qualified intersections in the first direction and the second direction of the ray, an intersection in the first direction having a positive distance to the origin and an intersection in the second direction having a negative distance to the origin, and
iterating through the sorted intersections comprises iterating in the first direction and the second direction starting from the origin of the ray.

9. The method of claim 7, wherein an intersection with a navigable boundary terminates the lane cut.

10. The method of claim 7, wherein sorting the candidate lane cuts comprises sorting the candidate lane cuts based on one or more of:
a number of intersections snapped to head or tail control points of the candidate lane cuts,
a number of intersections in the candidate lane cuts, or
a curvature of the candidate lane cuts.

11. The method of claim 7, wherein selecting the final lane cuts comprises selecting a candidate lane cut as a final lane cut if it has no overlap with a previously selected final lane cut.

12. A non-transitory computer readable storage medium having instructions encoded thereon that, when executed by a processor, cause the processor to perform steps including:
  receiving, from an imaging system mounted on a vehicle, a plurality of image frames, each image frame associated with a local area surrounding the vehicle at a particular point in time;
  generating a lane element graph including lane elements and connections between lane elements, each lane element being a portion of a lane with associated traffic restrictions, wherein generating the lane element graph comprises:
    identifying lane cuts from lane lines and navigable boundaries, wherein the lane lines and the navigable boundaries are based at least in part on the plurality of image frames and lane cuts that occur at changes in roads,
    breaking the lane cuts into lane cut segments, wherein each lane cut segment cuts across a single lane,
    for each lane cut segment, determining boundaries of a lane element, wherein the boundaries of the lane element include at least the lane cut segment as a bottom edge of the lane element, a right and left edge of the lane element, and a top edge of the lane element, and
    for each lane element, identifying successor lane elements; and
  generating a high definition map of the local area including the lane element graph based the plurality of image frames, the high definition map for use in driving by one or more autonomous vehicles.

13. The non-transitory computer readable storage medium of claim 12, wherein the instructions for determining the boundaries of the lane element comprise instructions for:
identifying two lane lines the lane cut segment intersects, wherein the two lane lines are the right and the left edge of the lane element; and
identifying a corresponding lane cut segment that the two lane lines intersect, wherein the corresponding lane cut segment is the top edge of the lane element.

14. The non-transitory computer readable storage medium of claim 12, wherein the instructions for determining the boundaries of a lane element comprise instructions for:
identifying two lane lines the lane cut segment intersects, wherein the two lane lines are the right and the left edge of the lane element; and
identifying two lane cut segments that the two lane lines intersect, wherein the two lane cut segments are joined to form the top edge of the lane element.

15. The non-transitory computer readable storage medium of claim 12, wherein the instructions for determining the boundaries of a lane element comprise instructions for:
identifying one lane line the lane cut segment intersects, wherein the one lane line is one of the right or the left edge of the lane element;
identifying a neighboring lane cut segment where the lane cut segment does not intersect a lane line;
identifying a neighboring lane line the neighboring lane cut segment intersects, wherein the neighboring lane line is a remaining one of the right or left edge of the lane element;
identifying a corresponding lane cut segment that the one lane line and the neighboring lane line intersect, wherein the corresponding lane cut segment is the top edge of the lane element; and
joining the lane cut segment with the neighboring lane cut segment to form a bottom edge for a lane element.

16. The non-transitory computer readable storage medium of claim 12, wherein the instructions for identifying the successor lane elements comprise instructions for:
tracking trajectory information of a data-collecting vehicle; and
connecting lane elements based on tracked trajectory information.

17. A computer system comprising:
a processor; and
non-transitory computer readable storage medium having instructions encoded thereon that, when executed by a processor, cause the processor to perform steps comprising:
  receiving, from an imaging system mounted on a vehicle, a plurality of image frames, each image frame associated with a local area surrounding the vehicle at a particular point in time;

generating a lane element graph including lane elements and connections between lane elements, each lane element being a portion of a lane with associated traffic restrictions, wherein generating the lane element graph comprises:
  identifying lane cuts from lane lines and navigable boundaries, wherein the lane lines and the navigable boundaries are based at least in part on the plurality of image frames and lane cuts that occur at changes in roads,
  breaking the lane cuts into lane cut segments, wherein each lane cut segment cuts across a single lane,
  for each lane cut segment, determining boundaries of a lane element, wherein the boundaries of the lane element include at least the lane cut segment as a bottom edge of the lane element, a right and left edge of the lane element, and a top edge of the lane element, and
  for each lane element, identifying successor lane elements; and
generating a high definition map of the local area including the lane element graph based the plurality of image frames, the high definition map for use in driving by one or more autonomous vehicles.

18. The computer system of claim 17, wherein the instructions for determining the boundaries of the lane element comprise instructions for:
  identifying two lane lines the lane cut segment intersects, wherein the two lane lines are the right and the left edge of the lane element; and
  identifying a corresponding lane cut segment that the two lane lines intersect, wherein the corresponding lane cut segment is the top edge of the lane element.

19. The computer system of claim 17, wherein the instructions for determining the boundaries of the lane element comprise instructions for:
  identifying two lane lines the lane cut segment intersects, wherein the two lane lines are the right and the left edge of the lane element; and
  identifying two lane cut segments that the two lane lines intersect, wherein the two lane cut segments are joined to form the top edge of the lane element.

20. The computer system of claim 17, wherein the instructions for determining the boundaries of the lane element comprise instructions for:
  identifying one lane line the lane cut segment intersects, wherein the one lane line is one of the right or the left edge of the lane element;
  identifying a neighboring lane cut segment where the lane cut segment does not intersect a lane line;
  identifying a neighboring lane line the neighboring lane cut segment intersects, wherein the neighboring lane line is a remaining one of the right or left edge of the lane element;
  identifying a corresponding lane cut segment that the one lane line and the neighboring lane line intersect, wherein the corresponding lane cut segment is the top edge of the lane element; and
  joining the lane cut segment with the neighboring lane cut segment to form a bottom edge for a lane element.

* * * * *